United States Patent
Guttman et al.

(10) Patent No.: US 6,988,241 B1
(45) Date of Patent: Jan. 17, 2006

(54) CLIENT SIDE, WEB-BASED SPREADSHEET

(75) Inventors: Steven Guttman, Oakland, CA (US); Joseph Ternasky, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 09/714,024

(22) Filed: Nov. 15, 2000

Related U.S. Application Data

(60) Provisional application No. 60/241,083, filed on Oct. 16, 2000.

(51) Int. Cl.
*G06F 17/00* (2006.01)

(52) U.S. Cl. ......... 715/503; 715/513; 715/504
(58) Field of Classification Search ........ 715/503, 715/504, 514, 513; 705/26, 19
See application file for complete search history.

(56) References Cited

U.S. PATENT DOCUMENTS

| | | | | | |
|---|---|---|---|---|---|
| 5,893,123 | A | * | 4/1999 | Tuinenga | 715/504 |
| 5,926,822 | A | * | 7/1999 | Garman | 715/503 |
| 6,341,292 | B1 | * | 1/2002 | Cho et al. | 707/203 |
| 6,473,738 | B1 | * | 10/2002 | Garrett | 705/26 |
| 6,631,497 | B1 | * | 10/2003 | Jamshidi et al. | 715/514 |
| 6,632,249 | B2 | * | 10/2003 | Pollock | 715/513 |

OTHER PUBLICATIONS

Hallberg et al., "Using Microsoft Excel 97", 1997, pp 596–601.*
Shadoff, "JavaScript Spreadsheet", 1997, text and source code downloaded from http://www.websorcerer.com/h12/h12.html.*
Flanagan, "JavaScript, The Definitive Guide, 3rd Edition", 1999, pp 244–246.*
Harvey, S., Excel 2000 for Windows for Dummies. Copyright 1999.
Screen Print of Help Menu of Microsoft Excel 2000 Hyperlink pages [captured Oct. 29, 2000] 3 pages.
Tidestone.com web pages [online]. Tidestone.com [retrieved Oct. 30, 2000]. Retrieved from the Internet: <URL: http://www.tidestone.com/> 10 pages.
The–Ciba.com web pages [online]. The–Ciba.com [retrieved Feb. 26, 2001]. Retrieved from the Internet: <URL: http://www.the–ciba.com/> 1 page, Building Windows Applications from Spreadsheets.

(Continued)

*Primary Examiner*—Joseph Feild
*Assistant Examiner*—James H. Blackwell
(74) *Attorney, Agent, or Firm*—Laura A. Majerus; Rimma Budnitskaya; Janet M. Skafer

(57) ABSTRACT

A method and system that that allows a designer to create "spreadsheet" web pages, which can then be viewed and used by the designer and/or by other users. The described embodiments of the present invention allow people to collaborate and to share spreadsheets over the web. The described embodiment allows a user of the spreadsheet to email the spreadsheet to others and to embed the spreadsheet into web pages owned by the designer or by third parties. A described embodiments of the web-based spreadsheet allowed the designer to specify both web data and real-time data in the cells of the "spreadsheet." The web data includes a URL of an image that is to be placed in a cell. The web data includes a link to a web page in a cell. The real-time data includes stock quotes and currency conversion information in the cells of the spreadsheet. Such data reflects a current (or specified) day's stock quote or a current (or specified) currency conversion value.

64 Claims, 27 Drawing Sheets

OTHER PUBLICATIONS

The–Ciba.com web pages [online]. The–Ciba.com [retrieved Feb. 26, 2001]. Retrieved from the Internet: <URL: http://www.the–ciba.com/> 6 pages, What is Visual Baler.

Tidestone.com web pages [online]. Tidestone.com [retreived Feb. 26, 2001]. Retrieved from the Internet: <URL: http://www.tidestone.com/> 3 pages, Press Releases and Announcements.

DevX.com web pages [online]. DevX.com [retrieved Feb. 26, 2001]. Retrieved from the Internet: <URL: http://www.devx.com/> 3 pages, Formula One for Java 5.5.

Tidestone.com web pages [online]. Tidestone.com [retreived Feb. 26, 2001]. Retrieved from the Internet: <URL: http://www.tidestone.com/> 2 pages, Press Release.

Tidestone.com web pages [online]. Tidestone.com [retreived Feb. 26, 2001]. Retrieved from the Internet: <URL: http://www.tidestone.com/> 2 pages, Press Release.

Tidestone.com web pages [online]. Tidestone.com [retreived Feb. 26, 2001]. Retrieved from the Internet: <URL: http://www.tidestone.com/> 1 page, How to Contact Tidestone Technologies.

Tidestone.com web pages [online]. Tidestone.com [retreived Feb. 26, 2001]. Retrieved from the Internet: <URL: http://www. tidestone.com/> 3 pages, Press Release.

Thinkfree.com web pages [online]. Thinkfree.com [retrieved Feb. 26, 2001]. Retrieved from the Internet: <URL: http://www.thinkfree.com/> 1 page, Thinkfree Office.

Thinkfree.com web pages [online]. Thinkfree.com [retrieved Feb. 26, 2001]. Retrieved from the Internet: <URL: http://www.thinkfree.com/> 2 pages, Thinkfree Office: Find Out More.

About Us Factsheet, [online] [Retrieved on Feb. 19, 2001]. Retrieved from: <URL://www.thinkfree.com/about_us/about_us_factsheet.html>, 2 pages.

ThinkFree Office, [online] [retrieved on Feb. 19, 2001]. Retrieved from <URL: http://www.thinkfree.com/landing.jsp>, 1 page.

ThinkFree Office, [online] [retrieved on Feb. 19, 2001]. Retrieved from <URL: http://www.thinkfree.com/find_out_more/find_general_.html>, 1 page.

iReporting for eBusiness—Formula One iReporting Platform—Tidestone Technologies, [online]. [retrieved on Feb. 19, 2001] Retrieved from:<URL: http://www.tidestone.com/home/default.jsp>, 1 page.

Tidestone Technologies—What is iReporting?, [online][retrieved on Feb. 19, 2001]. Retrieved from: <URL: http://www.tidestone.com/products/default.jsp>, 2 pages.

* cited by examiner

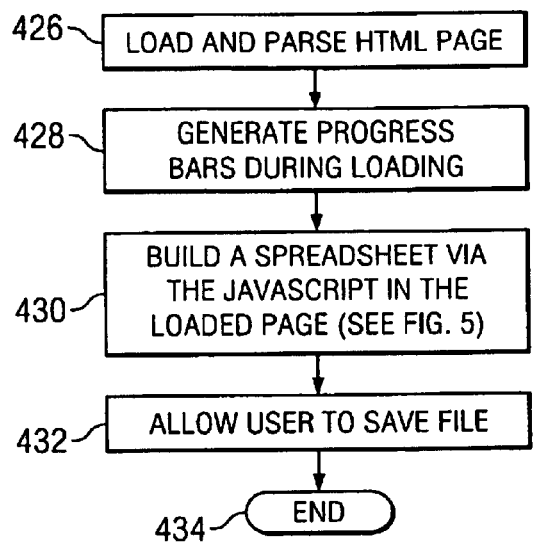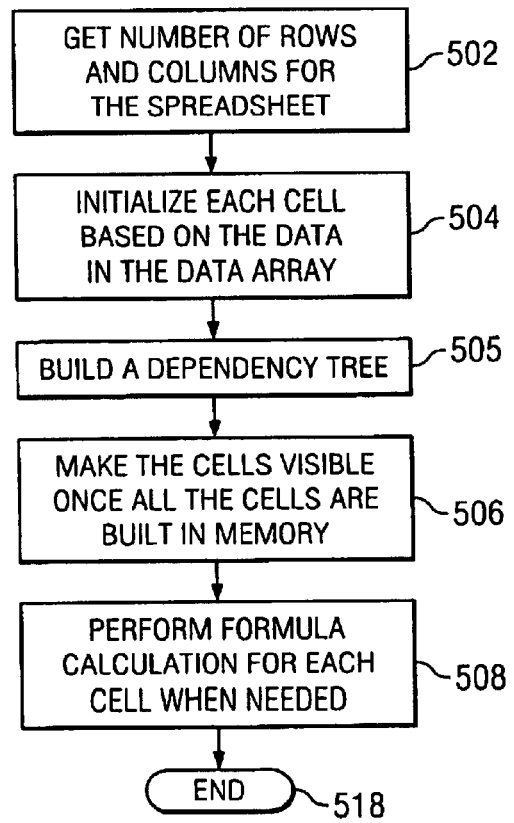

*FIG. 14b*

```
Macros jump to function...  [▼]

var g = new Object () ;
function init ()
{
    g.noteArray = ["A", "A#", "B", "C", "C#", "D", "D#", "E", "F", "F#",
    g.flatArray = ["A", "Bb", "B", "C", "Db", "D", "Eb", "E", "F", "Gb",
    g.modeArray = [
// blues scale
    1, 0, 0, 1, 0, 1, 1, 1, 0, 0, 1, 0,
// Dorian
    1, 0, 1, 1, 0, 1, 0, 1, 0, 1, 1, 0,
// Harmonic Minor
    1, 0, 1, 1, 0, 1, 0, 1, 1, 0, 0, 1,
// Locrian
    1, 1, 0, 1, 0, 1, 1, 0, 1, 0, 1, 0,
// Lydian
    1, 0, 1, 0, 1, 0, 1, 1, 0, 1, 0, 1,

[ OK ]   [ CANCEL ]   [ HELP ]
```

```
// theNote: figures out if the current note belongs in the mode,
// key and scale
function TheNote (gstring, fret, key, modeIndex, displayIndex)
{
    var noteName = call.mod (gstring+fret-1, 12);
    var inMode = g.modeArray [modeIndex*12 + call.mod (key+fret
    if (inMode == 1)
        if (displayIndex == 1)
            return (g.noteArray [noteName]);
        else if (displayIndex == 2)
            return (g.flatArray [noteName]);
        else
            return ("*");
    else
        return ("");

[ OK ]   [ CANCEL ]   [ HELP ]
```

FIG. 14c

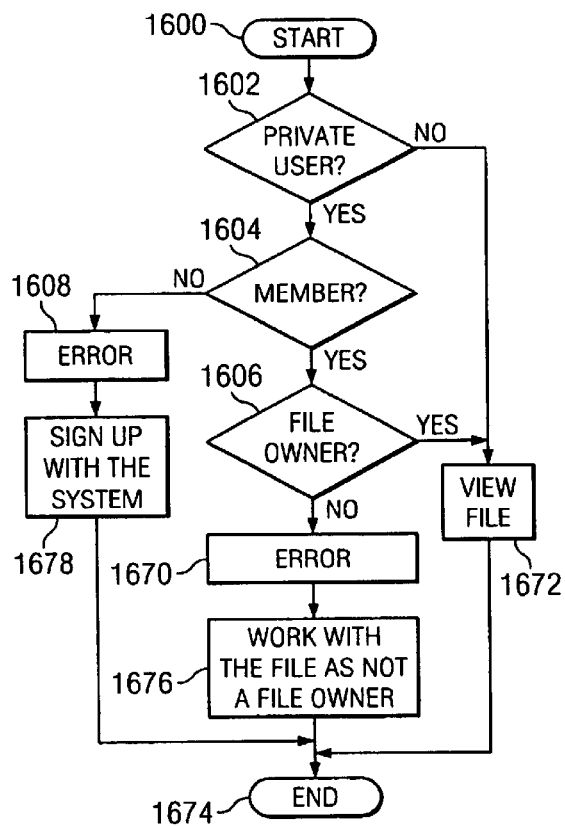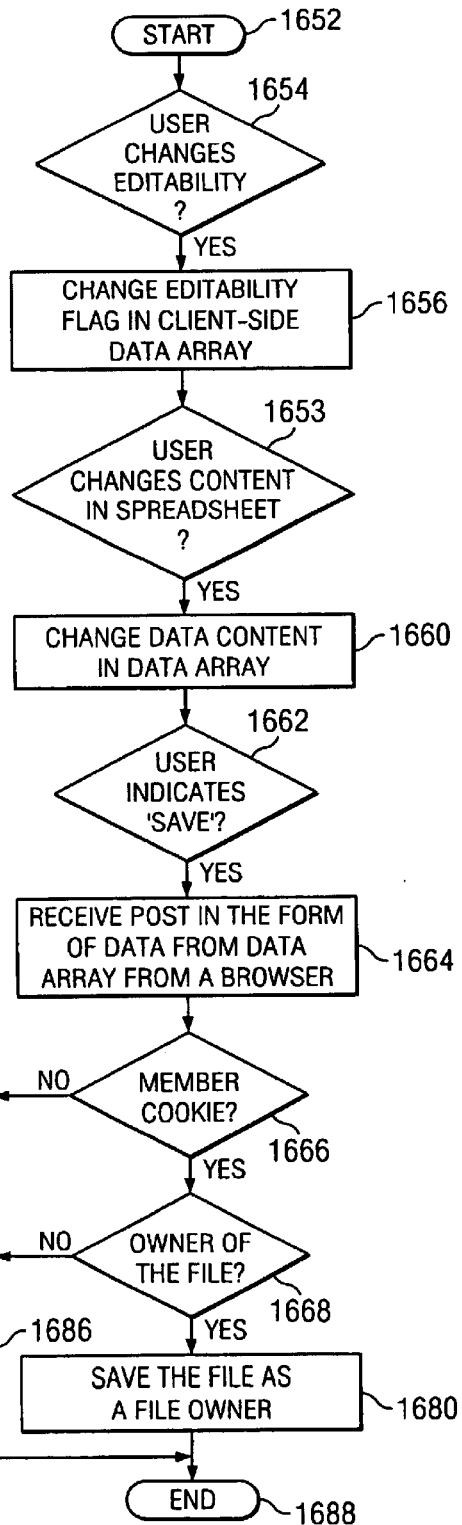

CLIENT SIDE, WEB-BASED SPREADSHEET

RELATED APPLICATIONS

This application claims priority under 35 U.S.C. § 119(e) to U.S. Provisional Application No. 60/241,083, entitled: Client Side, Web Based Calculator" of Steve Guttman and Joe Ternasky, filed Oct. 16, 2000, which is herein incorporated by reference.

This application is related to U.S. application Ser. No. 09/714,683, entitled "Client Side, Web-Based Calculator" of Steve Guttman and Joe Ternasky, filed Nov. 15, 2000, which is herein incorporated by reference.

BACKGROUND OF THE INVENTION

The present invention relates generally to dynamic hypertext markup language (DHTML) web pages and, more specifically, to a method for creating and viewing a spreadsheet web page.

Traditional spreadsheets and ledgers are large sheets of paper with columns and rows that accountants use to detail sets of business transactions such as expenses and revenues. A spreadsheet lays out a comprehensive set of numerical values and calculations on a single sheet of paper.

Conventional electronic spreadsheets are implemented as a standalone program executed on a data processor. A desktop electronic spreadsheet is a spreadsheet that executes on a standalone desktop computer and organizes information into columns and rows within an electronic ledger. Like its physical counterpart, a desktop electronic spreadsheet can add and view data to help explore business issues. An advantage of the electronic version of a spreadsheet is that data can be added by "formula" instead of by hand. Thus, when a number is changed in an electronic spreadsheet cell, the effect on the entire scenario can be seen immediately.

Ever since early electronic spreadsheets, such as VisiCalc, desktop electronic spreadsheets have been used to organize and tabulate data. A currently popular spreadsheet is Microsoft's Excel 2000 spreadsheet, which allows the user to enter data into "cells" of the spreadsheet and to tabulate and organize those cells. While Excel 2000 allows the user to enter, for example, a link to the World Wide Web ("the web") into a cell, Excel and most desktop spreadsheet applications are not designed with the web in mind. What is needed is a spreadsheet that allows users to make full use of the capabilities of the web and to include data only available via the web. This invention allows the spreadsheet to be displayed or edited in a web browser, without installing a specific application program.

SUMMARY OF THE INVENTION

A described embodiment of the present invention allows a designer to create "spreadsheet" web pages, which can then be viewed and used by the designer and/or by others. Many people want to use spreadsheets, but only a small percentage actually want to create them. It will be understood that, in the paragraphs that follow, the term "designer" is generally used to refer to the person who created and designed a web-based spreadsheet, while the term "user" generally refers to a person who views or uses the web-based spreadsheet. Some people can be both designer and user. The described embodiments of the present invention allow people to collaborate and to share spreadsheets over the web. The described embodiments allow a user of the spreadsheet to email the spreadsheet to others and to embed the spreadsheet into web pages owned by the user or by third parties.

An embodiment of the web-based spreadsheet allows the user to specify both web data and real-time data in the cells of the spreadsheet. A described embodiment of the present invention allows the spreadsheet designer to enter a URL of an image stored on a network, such as the Internet. The image is then fetched and placed in a cell. The described embodiment also allows the spreadsheet designer to enter a URL of a web page into a cell. Furthermore, the described embodiment allows the spreadsheet designer to specify real-time data, such as stock quotes or currency conversion information, in the cells of the spreadsheet. Such a cell will reflect a current (or specified) day's stock quote or a current (or specified) currency conversion value.

Moreover, the described embodiment allows the user to specify "macros" that enlarge the functionality of the web-based spreadsheet.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, show several embodiments of the invention and, together with the description, serve to explain the principles of the invention.

FIG. 4 is a flow chart showing a method performed on a client of FIG. 1 to obtain spreadsheet data from the server of FIG. 1.

FIG. 5 is a flow chart showing a method performed on the client of FIG. 1 to display a web-based spreadsheet.

FIGS. 14(a)–14(d) show an example spreadsheet created and viewed in accordance with the present invention and including macros.

FIG. 16(a) is a flow chart showing a log in process.

FIG. 16(b) is a flow chart showing a process of saving data into "My Files."

DETAILED DESCRIPTION OF EMBODIMENTS

Reference will now be made in detail to several embodiments of the present invention, examples of which are shown in the accompanying drawings. Wherever practicable, the same reference numbers will be used throughout the drawings to refer to the same or like parts.

1. System

A described embodiment of the present invention allows a spreadsheet designer to include web data and real-time data in a web-based spreadsheet. The data used in the web-based spreadsheet is preferably stored on a server data processing system and is sent to a user's browser in response to a user request. Thus, a web-based spreadsheet in accordance with the present invention can be viewed from any computer or device having browser capability. The user does not have to be tied to a spreadsheet stored on a desktop. The described embodiment of the present invention is written entirely in Dynamic HTML and thus does not require any special downloads, plug-ins or Java. After loading, the spreadsheet will execute equally fast with a 28.8 KBPS connection or a T3 line. In the described embodiment, a user will always have the most current version of the program—just as he always has the most recent version of any web page he chooses to view. Because it is web-based, the described embodiment will not cause any installation problems and cannot create DLL conflicts. The files describing the web-based spreadsheet are stored on secure servers, so a user never needs to worry about backing up data, and can access his files from any web-connected computer.

Figure 1:
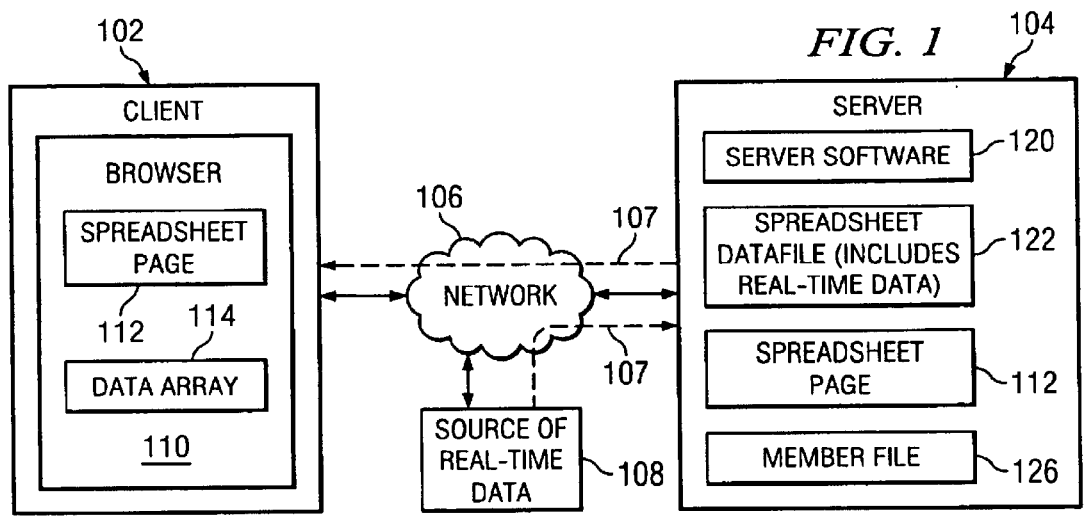
FIG. 1 is a block diagram of a network environment in which the present invention can be implemented.

FIG. 1 is a block diagram of a network environment in which the present invention can be implemented. The figure includes a client device 102, such as a computer, data processing system network appliance, television-based browsing device, wireless telephone, or other wireless device. The figure also shows a server data processing system 104. In the described embodiment, a web-based spreadsheet is created and displayed from within a user's browser 110 on client device 102 using functionality carried in a spreadsheet page 112 received from the server data processing machine 104. The contents of Data Array 114 is also included within the spreadsheet web page 112.

Server data processing system 104 includes server software 120, which implements functionality of the server, and a spreadsheet datafile 122 that contains information needed to create spreadsheet page 112. In some implementations, spreadsheets of multiple users are stored in a central repository on server 104. In such embodiments, server 104 also includes a member file 126 listing all the designers who have created and stored web-based spreadsheets and listing all users who have registered to gain access to the web-based spreadsheets. Certain other embodiments do not include a central repository and do not require or use member files.

The member file 126 includes information for all members who have an account with the system. Initially, when a user logs into the system, he is asked whether he has an account. If the user is a member, he is allowed to access the system. In the alternative, if the user is not a member, he is prompted to enter his identifying information, which might include a password and user ID.

FIG. 1 includes a source of real-time data 108, which is coupled to network 106. Dotted line 107 indicates a path of real-time data from source 108, to server 104, to client 102.

A Member file includes information for all members who have an account with the system. Initially, when a user logs into the system, he is asked whether he is a member who has an account with the system. If the user is a member, he is allowed to access the system. In the alternative, if the user is not a member, he is offered to enter his identifying information, which might include a password and email address. The Spreadsheet/Calculator data file contains information related to spreadsheets and calculators. Such information may include a data ID, which refers to a file name, and information for each individual cell of a spreadsheet/calculator. In particular, the cell information related to each individual cell includes, but is not limited to, the information related to cell dependency, formatting, content, and editability. The server software manages the files and communicates with the browser. The server software handles opening, saving, and incorporating live data (such as stock quotes) into the files. In addition, the server software returns the HTML page and calculator page in response to a request received from the client system, via a browser. The client system includes browser software and a Data Array. The user, via the browser, sends a request to the server for an HTML page. The server software reviews the parameters received with the request. If the parameters include a "spreadsheet" mode, a spreadsheet HTML page is returned to the client. In the alternative, if the parameters include a "calculator" mode, the server returns the calculator HTML page. If the parameters include an "embed" mode, the server returns a fully formed calculator web page. The Data Array is an array of cell descriptions whose values are loadable from JavaScript in the HTML page. The Data Array contains information related to each individual cell, which includes, but is not limited, to cell dependency, formatting, content, and editability. When the designer/creator saves a file, client turns the definition of each cell into a string. The concatenated cell strings define the entire spreadsheet. Client sends the concatenated string to the server. The server takes the string and writes it into the Spreadsheet/Calculator Data File. Thus, a client-format Data Array is translated into Spreadsheet/Calculator Data File in the server file format.

The browser is software effecting the requesting and displaying of HTML web pages. The browser software can be standalone or integrated within other software products. It should be understood that each of clients and web servers in the described embodiment preferably includes a processor and a memory. The memory includes instructions capable of being executed by the processor to perform the functions described below. The server can also include a computer readable medium for storing the instructions. The server system communicates with the client system via any appropriate communication mechanism, including but not limited to, a network, an intranet, the Internet, wireless communications, telecommunications, cable modems, and satellite communications.

Figure 17A:
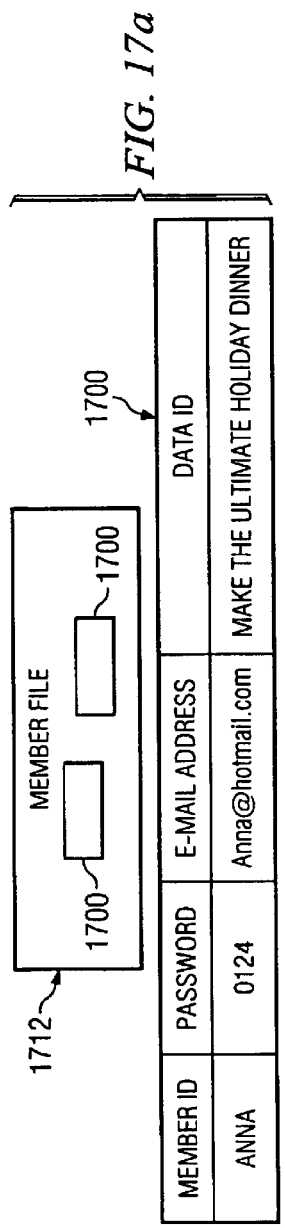
FIG. 17(a) shows a format of a member file.

FIG. 17(a) shows a block diagram showing a Member file 1712 and an example member record 1700. The Member file 1712 keeps member information in the form of member records 1700. The member record 1700 identifies a particular member. In one embodiment of the present invention, the example member record may have the following fields: a member ID, a password, an email address, and a data ID, which refers to a file name. The example record 800 features a member ID equal to ANNA, 0124 as a password, ANNA@HOTMAIL.COM as an email address, and "Make the Ultimate Holiday Dinner" as a file name. When a user initially signs up with the system, all user information is stored in the member file 1712.

Referring to FIG. 1, server 104 creates spreadsheet page 112 in response to a request from browser 110. The spreadsheet page 112 is sent across a network 106 and stored in the user's browser 110. Thus, no special software, aside from standard browser 110, is required to execute the functionality of the web-based spreadsheet. The Spreadsheet data file 122 contains information related to spreadsheets. Such information may include a data ID, which refers to the name of a spreadsheet, and information for each individual cell of a spreadsheet. In particular, the cell information related to each individual cell includes, but is not limited to, the information related to cell dependency, formatting, content, and editability. The server software 120 manages the files and communicates with the browser. The server software 120 also handles opening, saving, and incorporating live data (such as stock quotes and currency conversion information) into the files. In addition, the server software 120 returns the spreadsheet page 112 in response to a request received from the client system's browser 110.

In the described embodiment, the functionality of the spreadsheet is implemented using JavaScript included in spreadsheet web page 112. The use of Javascript ensures that the spreadsheet will be usable in any browser 110 that is capable of executing Javascript. Use of Javascript also ensures that the spreadsheet web page 112 will pass though any firewall and also avoids the problems inherent in upgrading to a newer version of the spreadsheet functionality, since the functionality is re-loaded with each spreadsheet web page 112.

Figure 17B:
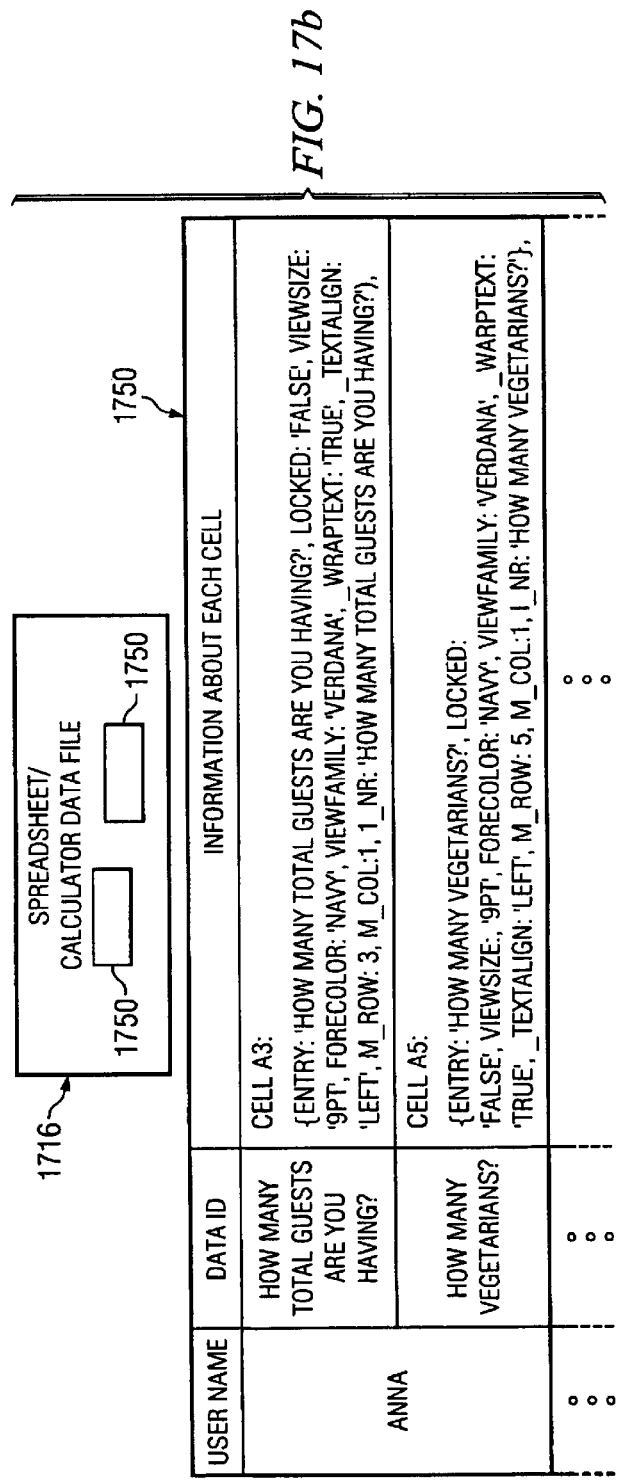
FIG. 17(b) shows a format of a data file.

FIG. 17(b) is a block diagram showing a Spreadsheet data file 1716 and an example record 1750. The Spreadsheet data file 1716 keeps spreadsheet data. The same data file is used to generate spreadsheet page 112. In particular, data file 1716 contains a user name or ID, a data ID (for example, a file name) and information about each cell in the spreadsheet. The information for every cell may include, for example, value, formula, formatting, editability, and borders. Each data array file 114 and spreadsheet data file 122 includes an editability flag for each cell, which is assigned a "FALSE" or "TRUE" logic value. This value indicates whether a certain cell is editable or not. If the cell has a "TRUE" value, i.e., if it is locked, a user cannot edit that cell when viewing the spreadsheet. Alternatively, if the cell has a "FALSE" value, i.e., if it is unlocked, that cell can be edited when viewing the spreadsheet. FIG. 17(b) features the example record 1750 having the following fields: User Name=ANNA, Data ID="Make the Ultimate Holiday Dinner," and information about each cell. In particular, cell A3 which includes the text "HOW MANY TOTAL GUESTS ARE THE USER HAVING?" is described by the following parameters: {ENTRY:'HOW MANY TOTAL GUESTS ARE THE USER HAVING?', LOCKED:'FALSE',VIEWSIZE:'9PT', FORECOLOR:'NAVY',VIEWFAMILY:'VERDA NA',__WRAPTEXT:'TRUE',__TEXTALAIGN:'LEFT',M__ROW:3,M__COL:1,I__NR:'HOW MANY TOTAL GUESTS ARE THE USER HAVING?'}. According to these parameters, cell A3 is the intersection of a third row and a first column and is referenced with a Column letter Row number notation A3. The text in cell A3 is aligned to the left, the text color of the cell is navy, and the font size of the cell is 9pt. The datafile 122 also includes real-time data, web data, and macros.

Figure 2:
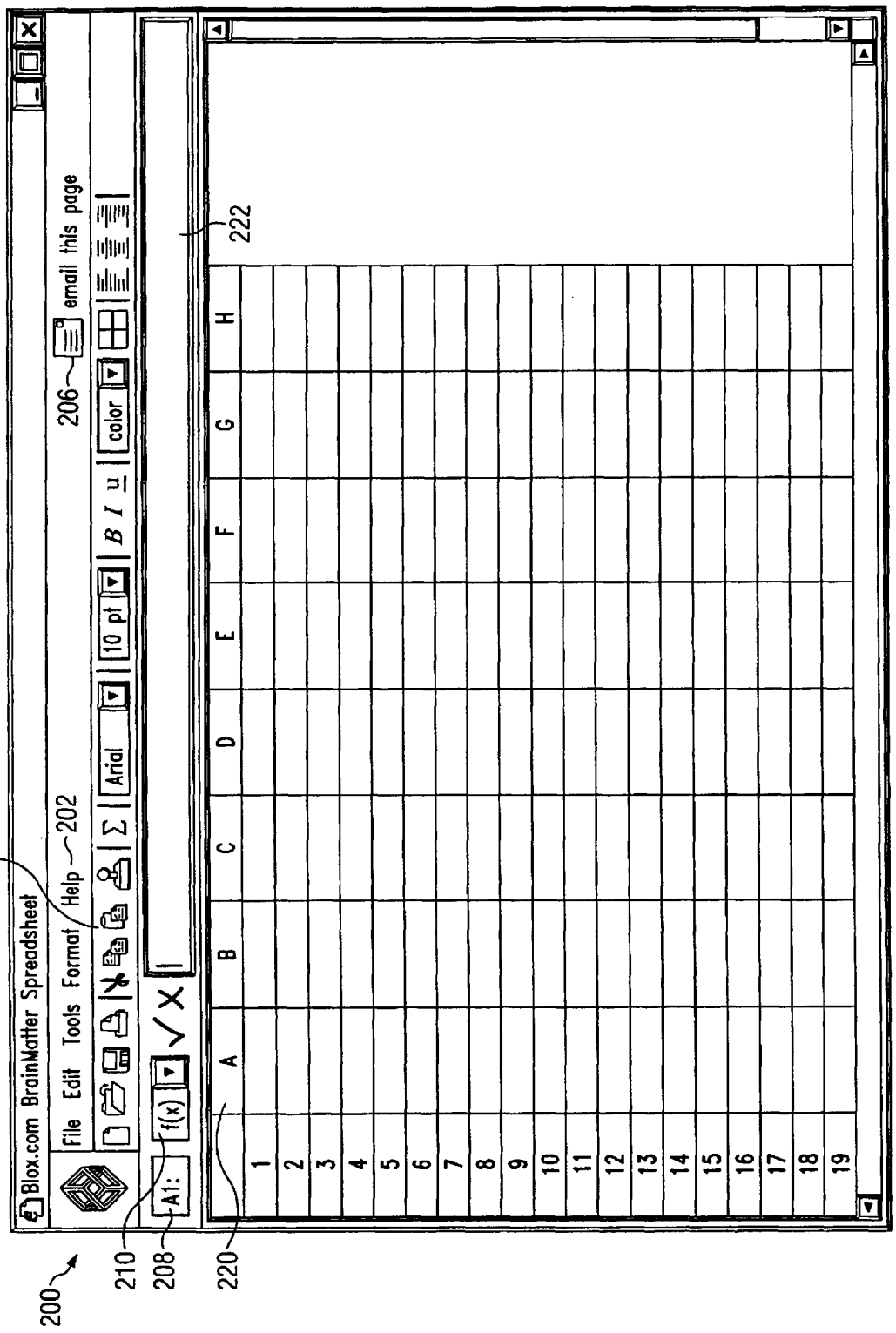
FIG. 2 shows an empty web-based spreadsheet in accordance with a described embodiment of the present invention.

FIG. 2 shows an embodiment of a web-based spreadsheet 200. In this embodiment, web-based spreadsheet 200 includes a tool bar 202, various icons 204, and an icon 206 to allow the user to email the spreadsheet 200. The spreadsheet 200 contains columns and rows in which all of the spreadsheet calculations are performed. Each row has a number and each column has a letter. A cell is the intersection of a row and a column and is referenced with a Column letter, Row number notation, such as A1 or C3. The example spreadsheet 200 has at least 27 rows (numbered 1 through 27) and 8 columns (labeled A through H). More rows can be viewed with the scroll bar. The designer can reset the number of rows and columns in the spreadsheet with the "Set Size" command discussed below. In addition, the designer can add or delete columns with the "Insert/Delete Rows or Columns" commands. A cell can contain labels, numbers, test (strings), dates/times or formulas. (Other embodiments may have additional types of data in their cells.) A string is a text entry, such as "Sales targets." A number is an integer or decimal value. Numbers can be formatted, for example, as currency, as integers (whole numbers), as decimal numbers, or as percentages. Users can define arbitrary formulas.

Formulas are often used to express mathematical relationships between cells. For example, if the formula =B2+B3 is entered into cell B4, then the number displayed in cell B4 will always be the sum of those two cells. If the values in either B2 or B3 change, B4 will be automatically updated to reflect the change. In the described embodiment, formulas are always preceded with an "=" sign. Other formula formats may be used. In addition, cells that contain formulas can, themselves, be used in formulas. If the formula =B4*1.08 is placed in cell C4, then both B4 and C4 will change accordingly when values in B2 and B3 are changed.

Formulas can be written with simple arithmetic operators, such as "+", "−", "*", and "/," and they can also use functions. Functions let the designer perform more sophisticated calculations. For example, the SUM() function lets the designer add the contents of all the cells within the parentheses. For example, =SUM(B3,B4) is the same as B3+B4. =SUM(A6:K6) adds the values in all the cells between A6 and K6, inclusive. The notation A6:K6 is called a range and is shorthand for expressing all the cells between the two (e.g. A6, B6, C6, D6, E6, F6, G6, H6, I6, J6, K6). A more complete list of all the available functions is in the Function Reference section below.

Figure 6:
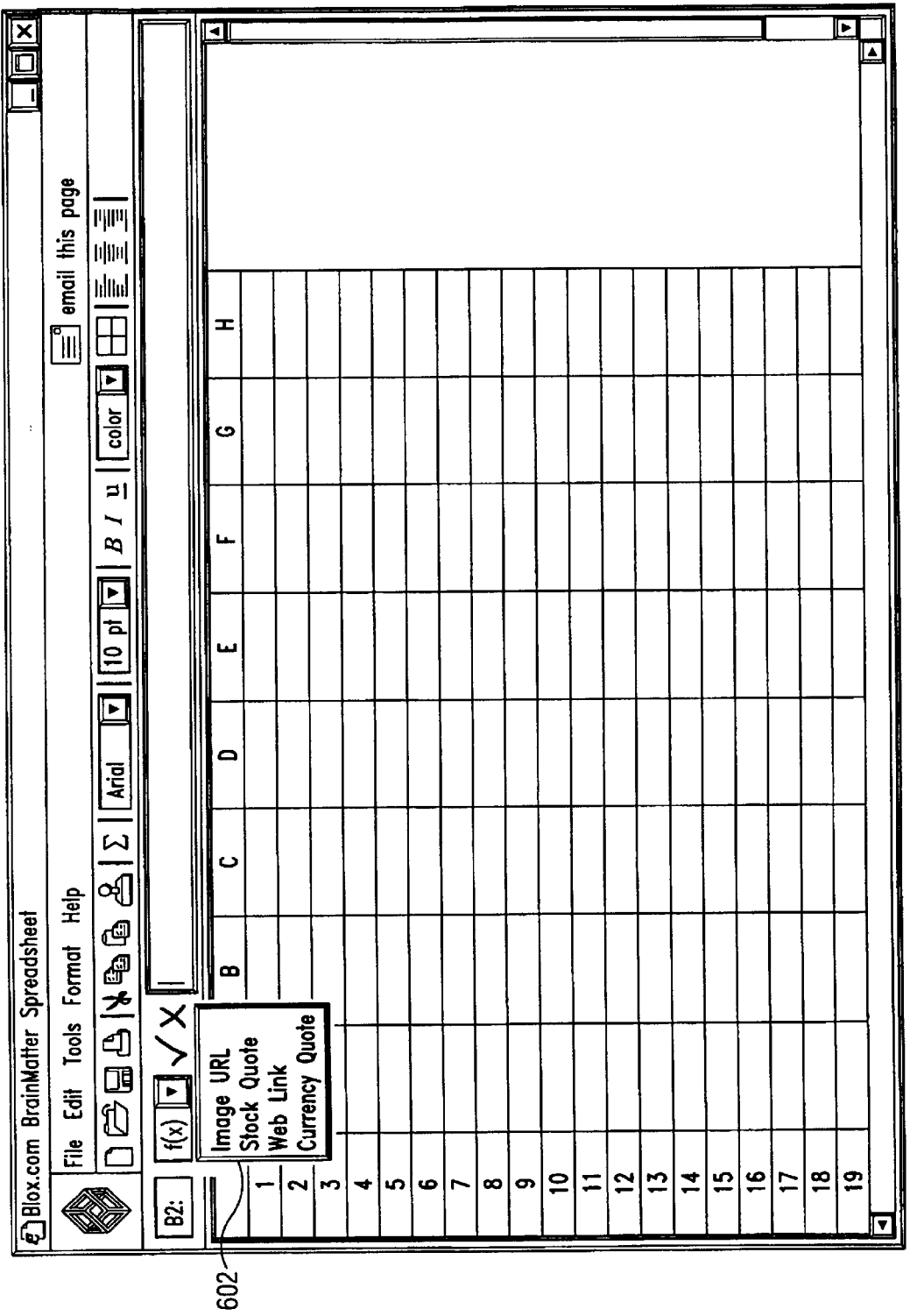
FIG. 6 shows the web-based spreadsheet of FIG. 2 showing a drop down menu of web data and real-time data that can be inserted in the web-based spreadsheet.
Figure 7A:
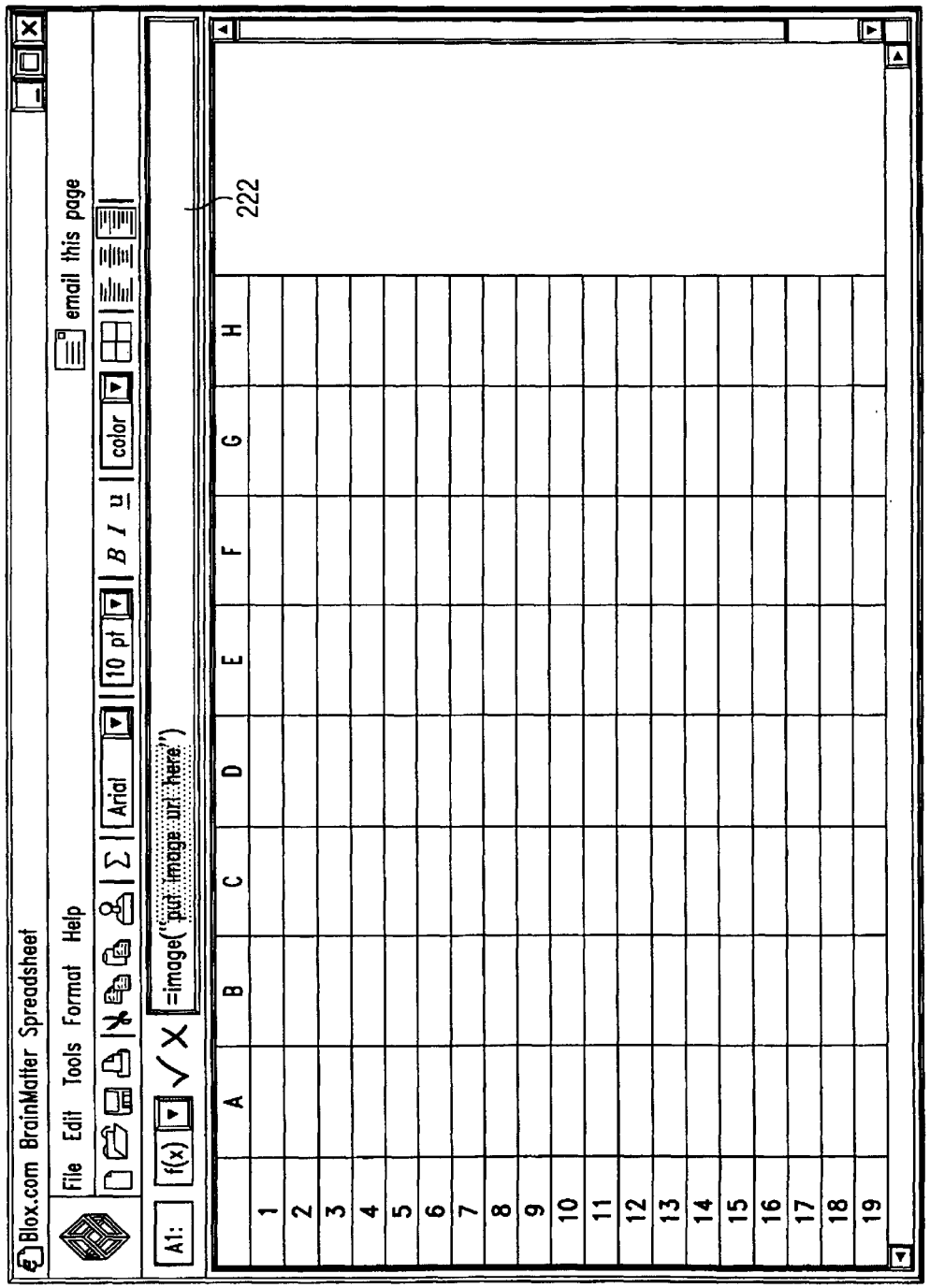
FIG. 7(a) shows an example of adding a web-based image to the web-based spreadsheet.
Figure 7B:
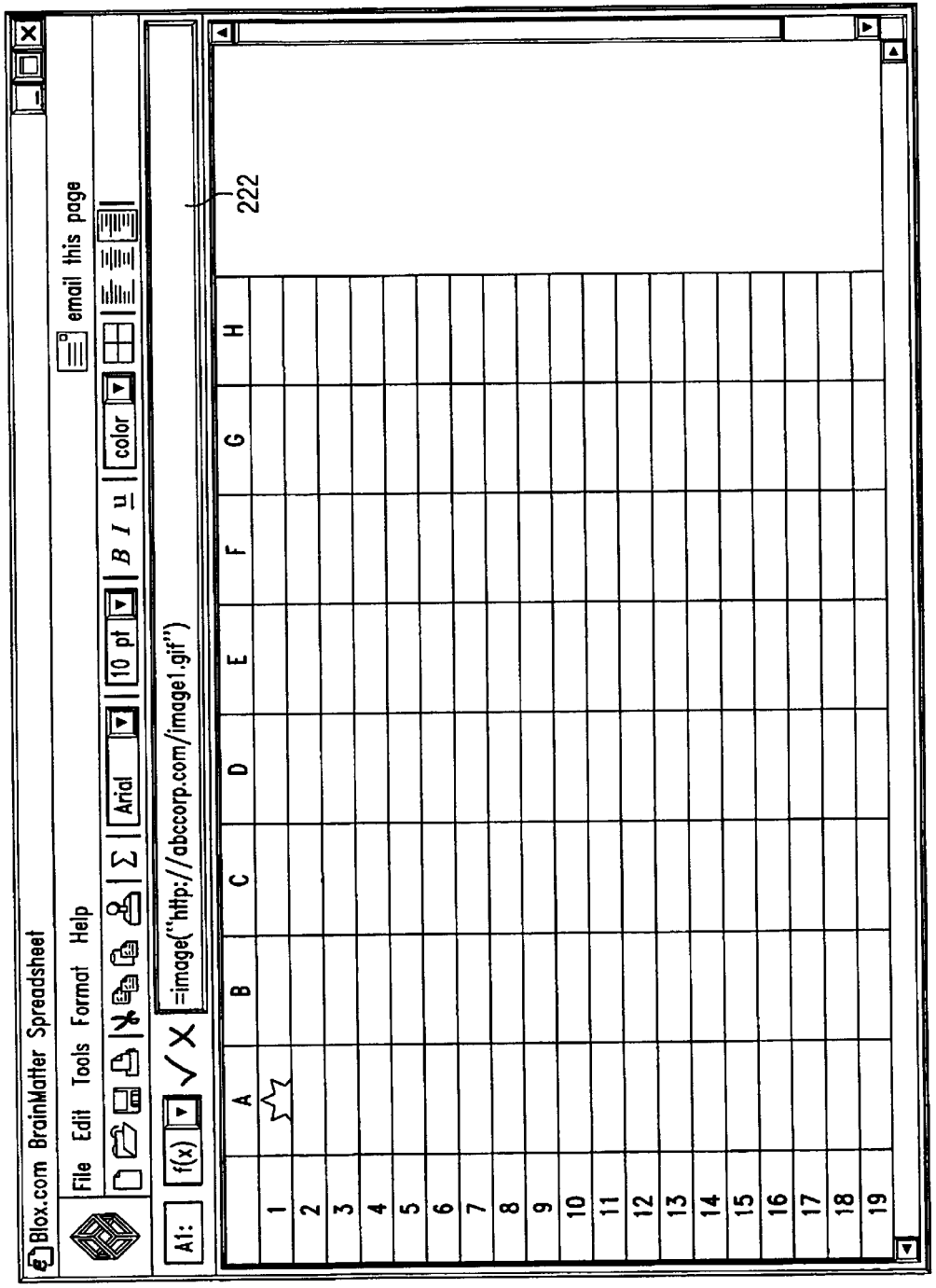
FIG. 7(b) shows the result of adding a web-based image to the web-based spreadsheet.
Figure 7C:
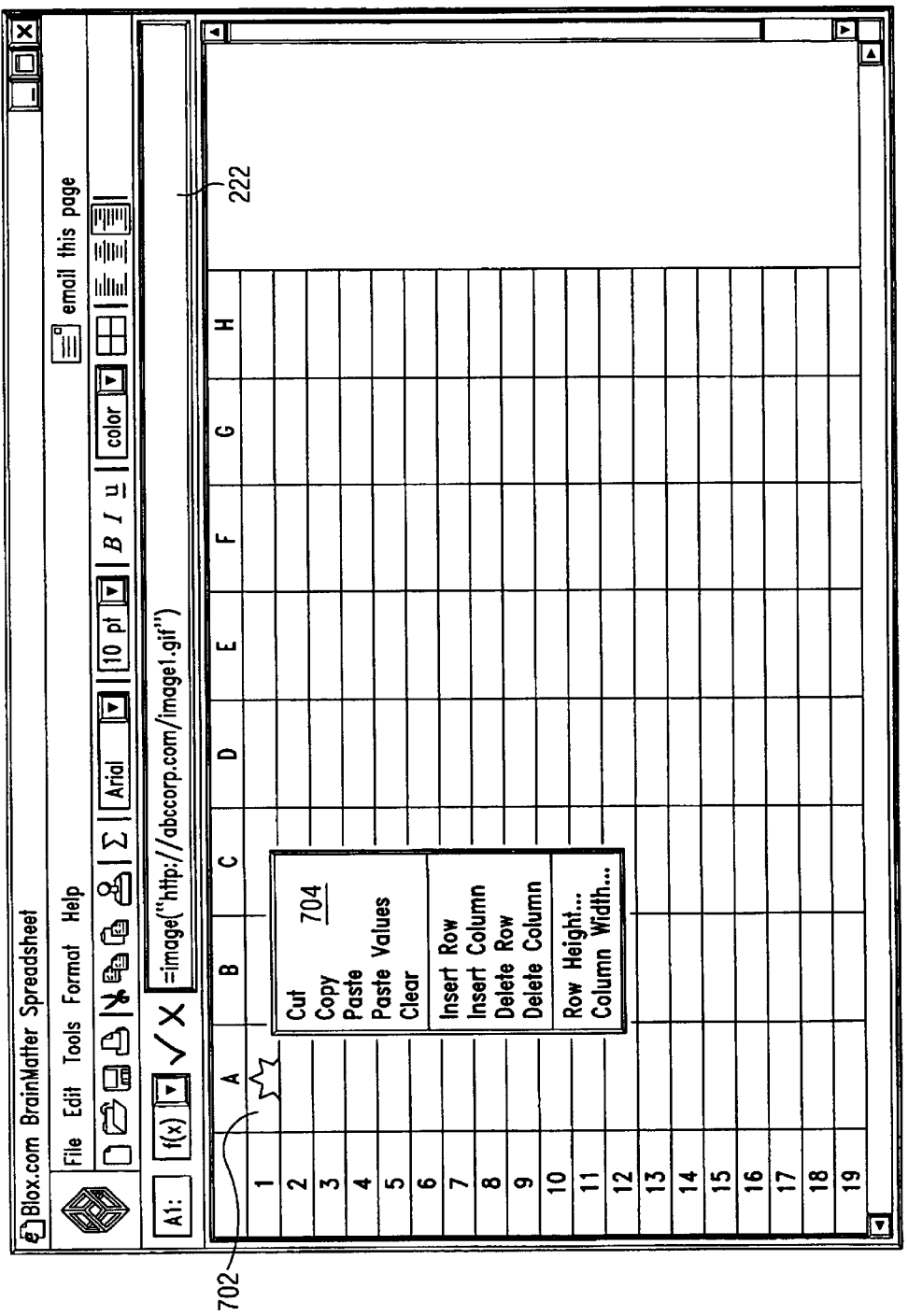
FIG. 7(c) shows the result of right clicking on a cell containing the web-based image.
Figure 7D:
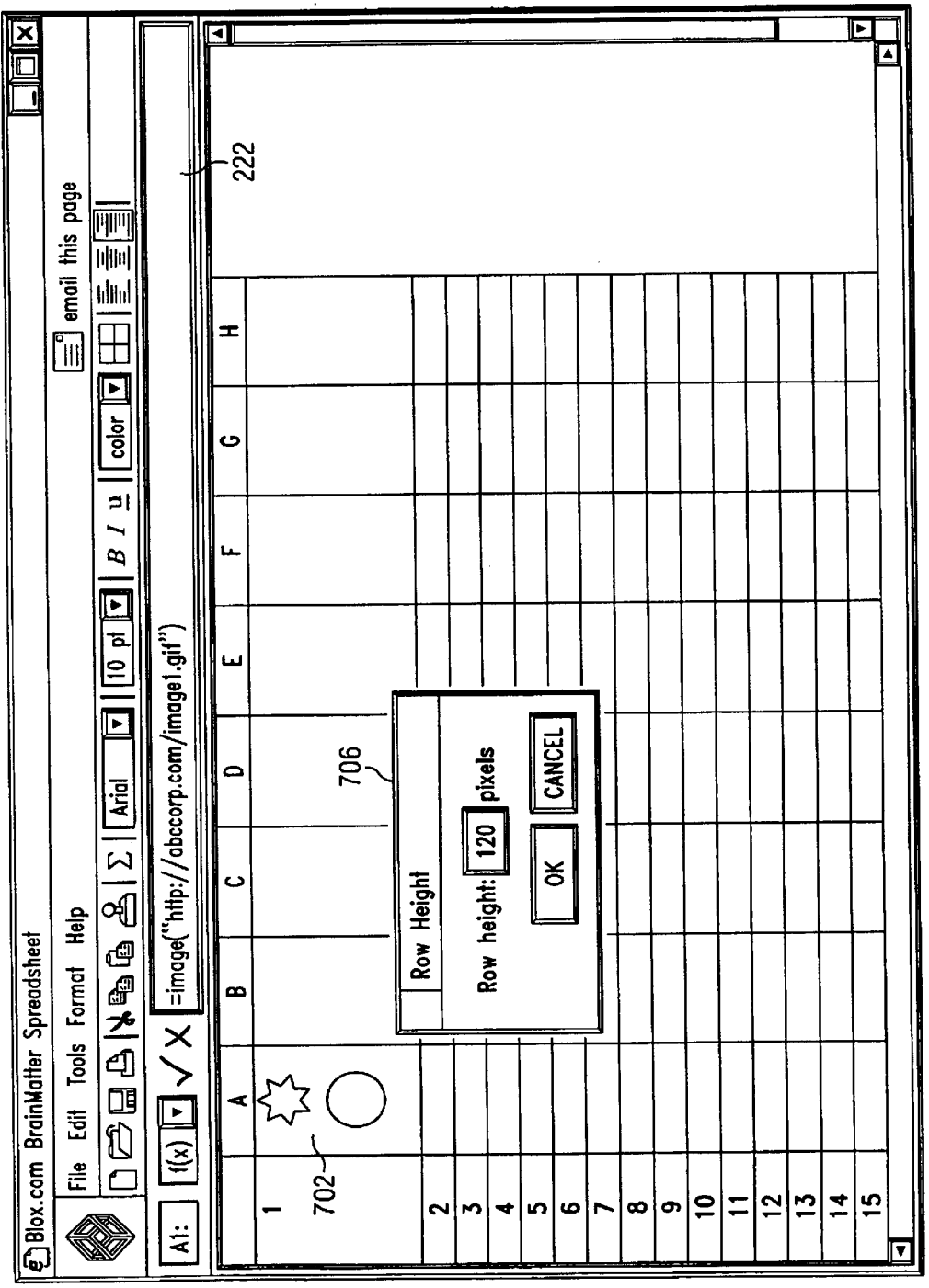
FIG. 7(d) shows an example in which the vertical size of the cell containing the web-based image is increased.

A current cell area 208 contains the name of a currently selected cell in the spreadsheet (such as cell A1 220). Area 210 is preferably a drop down function menu, although any appropriate user interface can be used. The drop down function menu 210 allows the designer to select web data and real-time data to be placed in a cell of the spreadsheet as shown in FIG. 6. The designer can change information for any specific cell in the spreadsheet. To do so, the designer has to click on that cell to highlight it. The command line 222 is the area of the spreadsheet 200 where a designer enters and edits cell values and formulas. To change information for a specific cell, a designer clicks on that cell to highlight it. Then, the designer types the value, text or formula for that cell into the command line field 222. If the cell already has an entry, that entry will appear in the command line. If the designer makes a mistake while typing, he can discard his entry by clicking the "X" button at the end of the command line. To accept his entry, the designer clicks the check mark, or hits the Enter key.

The designer can set or reset the number of rows and columns in his spreadsheet with the Set Size command. The designer can add or delete columns with the Insert/Delete Rows or Columns commands. The format bar 204 contains clickable icons and drop down menus used to format numbers and text within cells. These controls will be comfortable to most users of standard word processors and spreadsheets. They include font family and size controls, font style (bold, italic, underline), text alignment, text color, and cell background color (among others).

All spreadsheets can be accessed in two ways. In Spreadsheet Mode, the designer works with a full-featured, web-based spreadsheet. The designer can create formulas, add and delete columns and format cells. Certain designers may also allow other users to use the spreadsheet in full spreadsheet mode. A spreadsheet can also be used in Calculator Mode. When the user views a spreadsheet as a Calculator, he is working with the spreadsheet as a fill-in-the-blanks, text application. The user is not allowed to view any formulas or spreadsheet controls. He merely enters data, and sees what the spreadsheet calculates.

Figure 3:
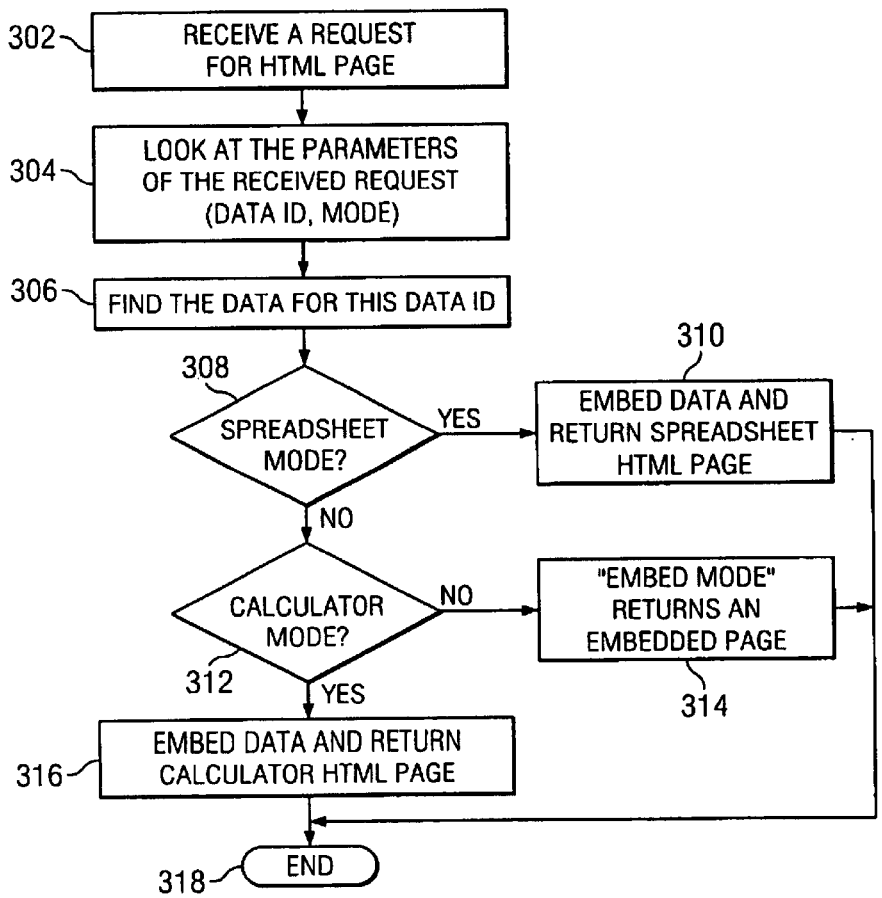
FIG. 3 is a flow chart showing a method performed by a server of FIG. 1.

FIG. 3 is a flow chart showing a method performed by server 104 of FIG. 1. When this method is performed, a user or other entity (such as a computer program) has requested a particular web-based spreadsheet from server 104. This request may, for example, take the form of an http request sent to the server:

http://server.com/mycalc&dataID=1231231&mode=spreadsheet

When the server receives 302 this request, it looks at the parameters of the request (here, dataID and mode) 304. The dataID parameter identifies 306 a file containing the data for the web-based spreadsheet. If the mode indicates a spreadsheet mode 308, the data needed to create a web-based spreadsheet on the client device is embedded in spreadsheet web page 112 and returned 310 to client 102. If the mode indicates a calculator mode 312, the user wishes to view the spreadsheet in a "fill in the blank" mode and does not wish to modify the format or layout of the spreadsheet. In this case, calculator data is added 318 to web page 112, which is returned to the client 102. If the mode is not spreadsheet and is not calculator, it may be "embedded mode." In this case, the spreadsheet is returned 314 in a form that can be embedded in a web page. Both calculators and embedded mode are discussed in the copending application "Client Side, Web-Based Calculator" of Guttman et al.

The spreadsheet page 112 contains script tags, spreadsheet data, and an HTML user interface. For example, in the case of a spreadsheet page 112, the script tag states href="/css/spreadsheet_ie4_eda7fc0b.cssx"/. Cells in spreadsheet page 112 have different parameters than cells in a calculator page. Specifically, cells in a spreadsheet are unlocked and the editability flag has a "FALSE" value, whereas most cells in a calculator are locked and the editability flag has a "TRUE" value. If the designer requested data in the Embed mode, a loaded fully formed HTML element is returned, in element 316. This HTML element does not include HTML script tags, unlike the spreadsheet pages returned in steps 310 and 314. The embedded HTML page dynamically returns the HTML page. This is accomplished using "JavaScript include" tags. The "JavaScript include" tags return dynamically created JavaScript reflecting the current change in the spreadsheet or spreadsheet file. The process ends in 318 once the HTML page is returned.

FIG. 4 is a flow chart showing the steps performed by a browser 110 in accordance with the present invention. Once the browser 110 sends a request for an HTML page, as was discussed with reference to FIG. 3, the server 104 reviews the parameters received with the request and returns the HTML page accordingly. Once the browser parses the page in element 426, it might send additional requests to the server 104 for data, which were referred to in the HTML page. In element 428, loading progress bar reports are generated and displayed informing the user about the status of the progress of program execution. In particular, the progress bar may indicate the following: "Loading a Spreadsheet" or "Loading a Calculator." In element 430, the spreadsheet is built (as shown in FIG. 5). In element 432, the designer has the option of saving the file he is currently working with if the data was modified since the last time the file was saved. The process ends in element 434. Building the spreadsheet 430 is discussed below.

FIG. 5 is a flow chart illustrating the process of building a spreadsheet in accordance with a described embodiment of the present invention. Initially, a client system 102 receives the number of rows and columns to build a particular spreadsheet, in element 502. As shown in connection with FIG. 2, an example spreadsheet has columns and rows. A two-dimensional array of cell elements is built. In element 504, each cell is initialized and dynamic HTML is evaluated for each cell. This step includes obtaining information about a particular cell from a Data Array file 114. This information includes, but is not limited to, cell dependency, formatting, content, and editability. Thus, as shown in FIG. 17(b), cell A3 which includes the text "HOW MANY TOTAL GUESTS ARE YOU HAVING?" is described by the following parameters, as shown in Table 1: {ENTRY:'HOW MANY TOTAL GUESTS ARE YOU HAVING?', LOCKED:'FALSE',VIEWSIZE:'9PT', FORECOLOR:'NAVY',VIEWFAMILY:'VERDA NA',__WRAPTEXT:'TRUE',__TEXTALIGN:'LEFT',M__ROW:3,M__COL:1,I__NR:'HOW MANY TOTAL GUESTS ARE YOU HAVING?'}. According to these parameters, cell A3 is the intersection of a third row and a first column and is referenced with a Column letter, Row number notation A3. Cell A3 is an editable cell because the editability flag is set to "FALSE" (the spreadsheet was so-designed by its designer), the text in the cell is aligned to the left text, the color of the cell is navy, and the font size of the cell is 9pt.

Once dynamic HTML is specified for each cell, the browser executes Javascript in the page to build a dependency tree in step 505. The dependency tree is part of the Data Array 114. Any spreadsheet has at least two types of cells: the ones that depend on a particular cell and the ones on which a particular cell depends. Some cells in the Data Array 114 contain the field "i__rt" and others contain the field "i_tb". The fields are lists of other cells that a given cell depends on (i_rt) and a list of cells that depend on this cell (i_tb). "I_tb" stands for "initialize the referred to by cell" and "i_rt" stands for "initialize refers to cell. If, for example, cell B13 is a dependent cell, the following is the list in Data Array 114 of other cells upon which cell B13 depends: I_RT:'[E[7][2],E[3][2],E[5][2]]', LOCKED:'FALSE',VIEWSIZE:'9PT',_ WIDTHCLUE:'80',_TEXTALIGN:'RIGHT',M_ ROW:13,M_COL:2,I_NR:'12.5'}. Accordingly, cell B13, which is the intersection of row 13 and column 2, depends on cells B7 ([7][2]), B3 ([3][2]) and B5 ([5][2]).

Once all cells are built, they become visible, in element 506. This is done with a combination of HTML that is generated on the fly using JavaScript and by JavaScript itself. In element 508, calculations are performed for each cell, when needed.

Once all calculations are made, the determination is made whether a particular cell is editable (whether it is locked) (not shown). If a cell is non-editable, that cell is locked and the user is not allowed to enter data into that cell in spreadsheet mode. For example, according to 114 description, cells A13–A23 are locked and the user cannot change their content. In the alternative, if the cell is editable (unlocked) (for example, cells B3 and B5, as described in the Data Array 114), an input box is built around that cell. The user can type in the value in that cell because it is unlocked in spreadsheet mode. Thus, the user can type in "12" in cell B3 and "2" in cell B5.

2. User Interface

The following section discusses the user interface for an example web-based spreadsheet. The functionality described herein is implemented using Javascript. When necessary, reference is made to FIG. 2.

FIG. 6 shows the web-based spreadsheet of FIG. 2 with a drop down menu 602 of web data and real-time data. In the described embodiment, the image URL and the Web link are web data and the Stock Quote and Currency Quote are real-time data.

Image URL: Inserts the image function (which places a reference picture in the cell)

Stock Quote: Automatically inserts the Quote() function, which provides access to 20 min delayed stock quotes.

Web link: Inserts the link function (text which opens up a new browser window with a specified URL, when clicked)

Currency Quote: Automatically inserts the Currency() function, which provides access to 20 min delayed currency quotes.

These functions, described in Table 2, give the designer the ability to draw live, real-time information from the Web and incorporate it into his spreadsheets. For the standard set of functions, see Table 4.

TABLE 2

| | |
|---|---|
| quote( symbol, data ) | Returns the 20-min delayed stock price for a given security. Both symbol and data should be enclosed in quotes (e.g. "HBRN").<br>symbol = stock symbol<br>data = optional data type requested. Choices are, "Price", "date", "time", "change", "open", "high", "low", "volume", "name". If data is omitted, quote( ) returns the price. |

TABLE 2-continued

| | |
|---|---|
| image( url ) | Displays a web-hosted image within a spreadsheet cell. url is the URL where the image is located, and should be enclosed within quotes. |
| link( url, text ) | Creates a link to url from the words text displayed within a cell. If text is omitted, the url name is displayed.<br>Note that any text preceded by "http://" will automatically be turned into a link by the application. |
| currency( from, to, date, option ) | Converts from one currency to another.<br>from = currency units to convert from. Should be enclosed in quotes. See the currency code table<br>to = currency units to convert to. Should be enclosed in quotes. See the currency code table<br>date = (optional) date for conversion information. If omitted uses today's information.<br>option = (optional) conversion code, "bid", "ask", "min_bid", "min_ask", "max_bid", "max_ask". If omitted, "bid" is assumed. |

FIG. 7(*a*) shows an example of adding a web-based image to the web-based spreadsheet. The designer selects "Image URL" from the drop down menu 602, which places "=image ("put image url here")" in the function area 222. The designer then enters a URL (e.g., "http://abccorp.com/image1.gif"). At this point, the functionality of the spreadsheet page 112 (e.g., JavaScript in the page) sends an HTTP request to network 106, which routes the request to the web server referenced by the domain name (e.g., "abccorp.com"). The web server returns an image (e.g., "image.1.gif"), which is displayed inside the cell associated with the Image function.

FIG. 7(*b*) shows the result of adding a web-based image to the web-based spreadsheet. In the described embodiment, if the image is larger than the cell, only a part of the image 702 that will fit in the cell will be displayed.

FIG. 7(*c*) shows the result of right clicking on a cell containing the web-based image (or of right clicking on any cell). Right clicking causes a menu to be displayed, which includes the following functions: Cut, Copy, Paste, Paste Values, Clear, Insert Row, Insert Column, Delete Row, Delete Column, Row Height, and Column Width.

FIG. 7(*d*) shows an example in which the vertical size of the cell containing the web-based image is increased to 120 pixels. As can be seen in the example, increasing the size of the row causes more of the image "image1.gif" to be displayed FIG. 8(*a*) shows an example of adding a real-time stock quote to the web-based spreadsheet. The designer selects "Stock Quote" from the drop down menu 602, which places "=quote("put stock symbol here")" in the function area 222. In the example, the user then enters a stock symbol (e.g., "SUNW"). At this point, the functionality of the spreadsheet page 112 (e.g., JavaScript in the page) sends an http get request to server 104 via network 106. The web server 104 returns a stock quote for the symbol entered (e.g., "SUNW"). The returned stock quote is displayed inside the cell associated with the Quote function.

Figure 8A:
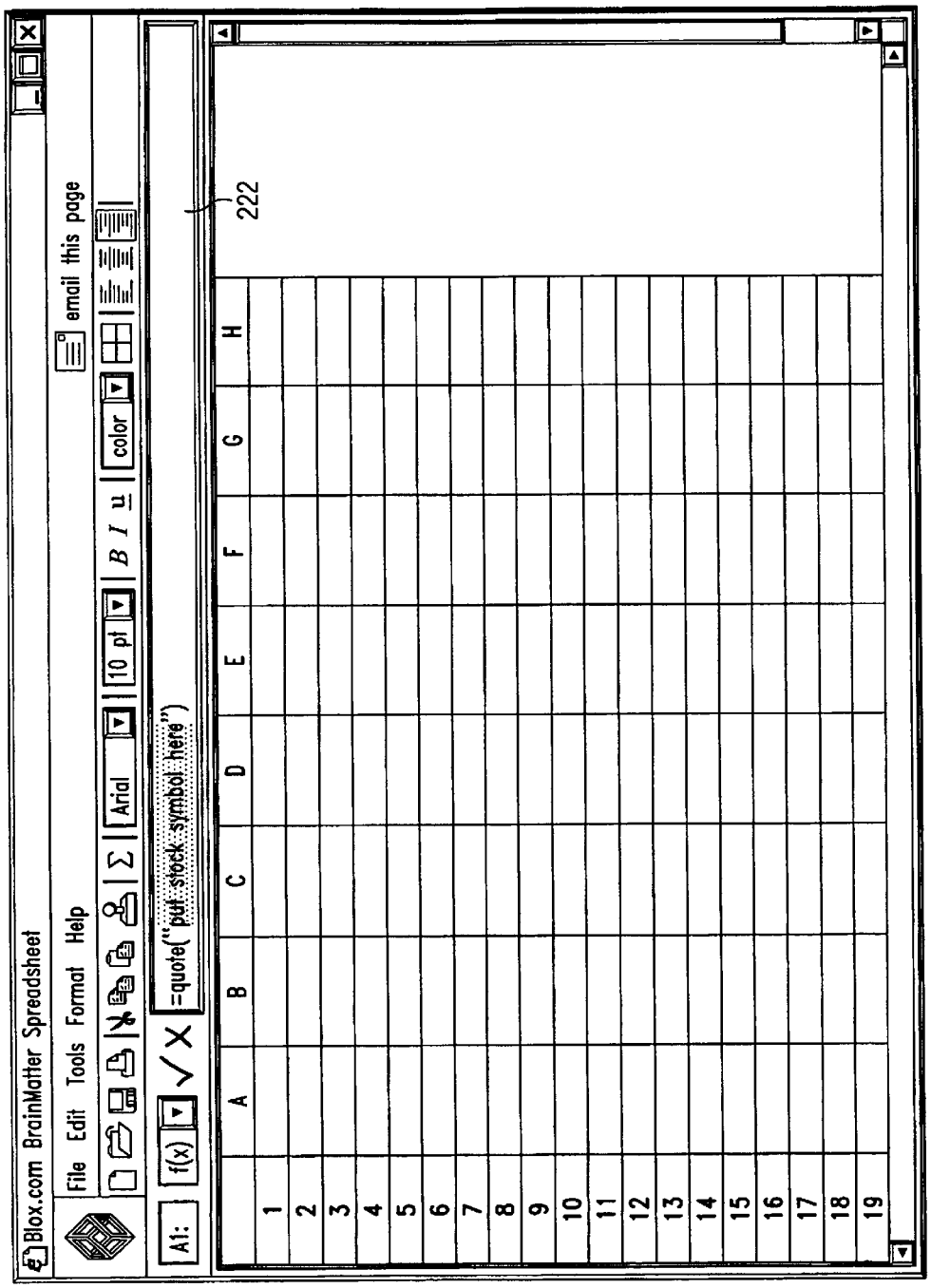
FIG. 8(a) shows an example of adding a real-time stock quote to the web-based spreadsheet.
Figure 8B:
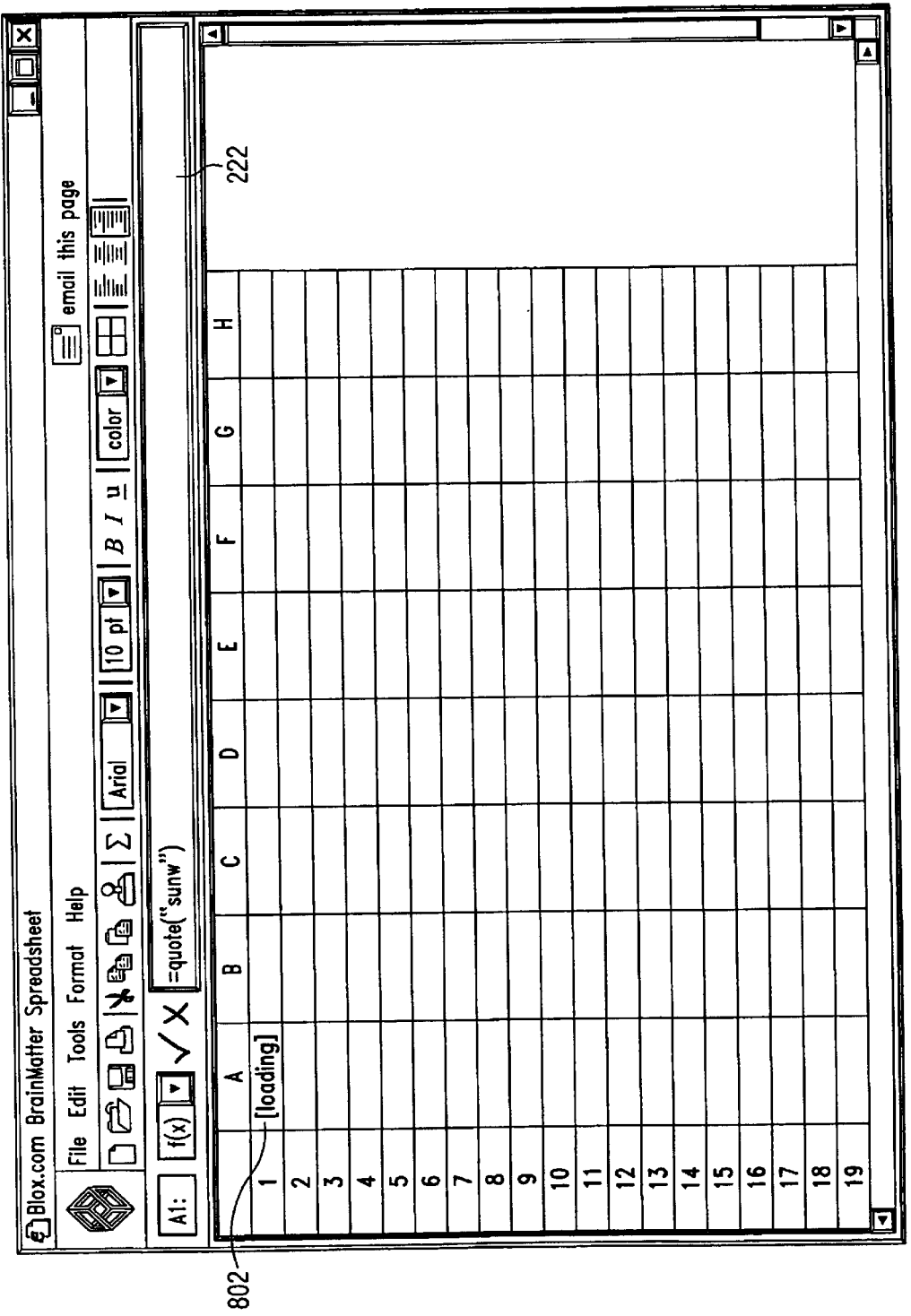
FIG. 8(b) shows an intermediate step while the real-time stock quote data is being loaded.
Figure 8C:
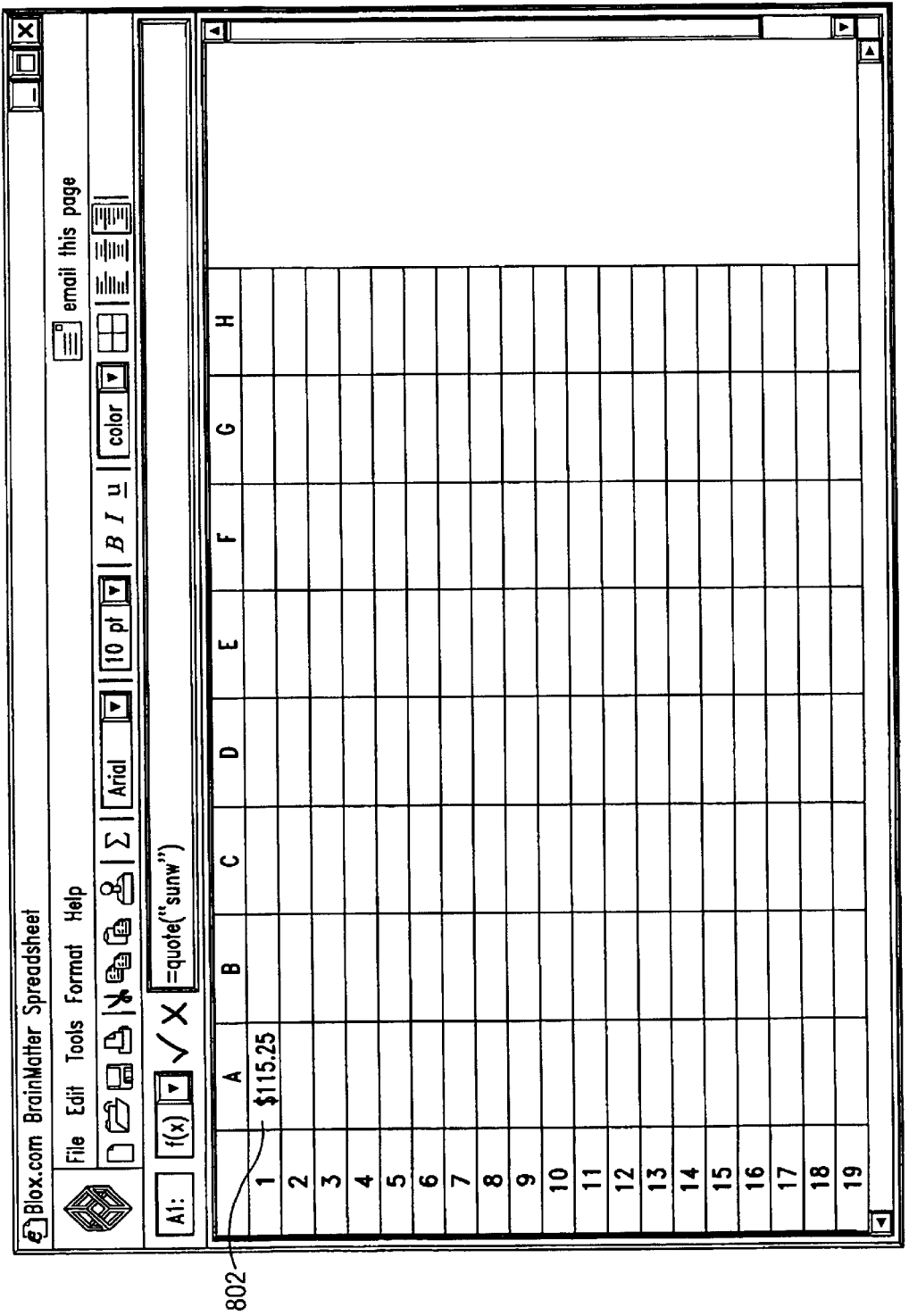
FIG. 8(c) shows the result of adding real-time stock quote data to the web-based spreadsheet.

FIG. 8(*b*) shows an intermediate step while the real-time stock quote data is being loaded. After the user has entered a stock symbol, but before a stock quote has been received, the functionality of page 112 displays a legend "loading."

FIG. 8(*c*) shows the result of adding real-time stock quote data to the web-based spreadsheet. After a stock quote (e.g., "$115.25") has been received, it is displayed in the cell 902 associated with the Quote function.

In the described embodiment, the server 104 obtains real-time data such as stock quotes or currency conversion information in any appropriate manner. For example, server 104 may contract with a third party, which supplies stock and/or currency information periodically. As another example, server 104 may obtain data from a third party's web page (screen scraping) periodically. The described embodiment currently obtains its stock quotes from a Yahoo service that returns textual stock information when an http get request is sent to the Yahoo server, although any appropriate source could be used.

If, for example, stock information is provided or obtained every fifteen minutes, the information supplied to the designer's web-based spreadsheet is no more than fifteen minutes old when it is received. The data is called real-time data because its value depends on the time it was requested and sent. In addition, certain embodiments allow the user to periodically request new real-time information and update the cell relying on that real-time information as discussed below in connection with macros. If, for example, new data is requested every fifteen minutes, the data in the spreadsheet is never older than fifteen minutes old.

It will be understood by persons of skill in the art that, whenever real-time data is updated, all cells that depend on the updated cell also are recalculated and redisplayed if needed. Thus, if a cell depends on a cell containing real-time data, that cell would also be updated every time the real-time data cell is changed. The described embodiment keeps track of which cells depend from other cells and, when new data is received for a cell, all cells depending from that cell are also checked to see if they need updating.

Figure 9A:
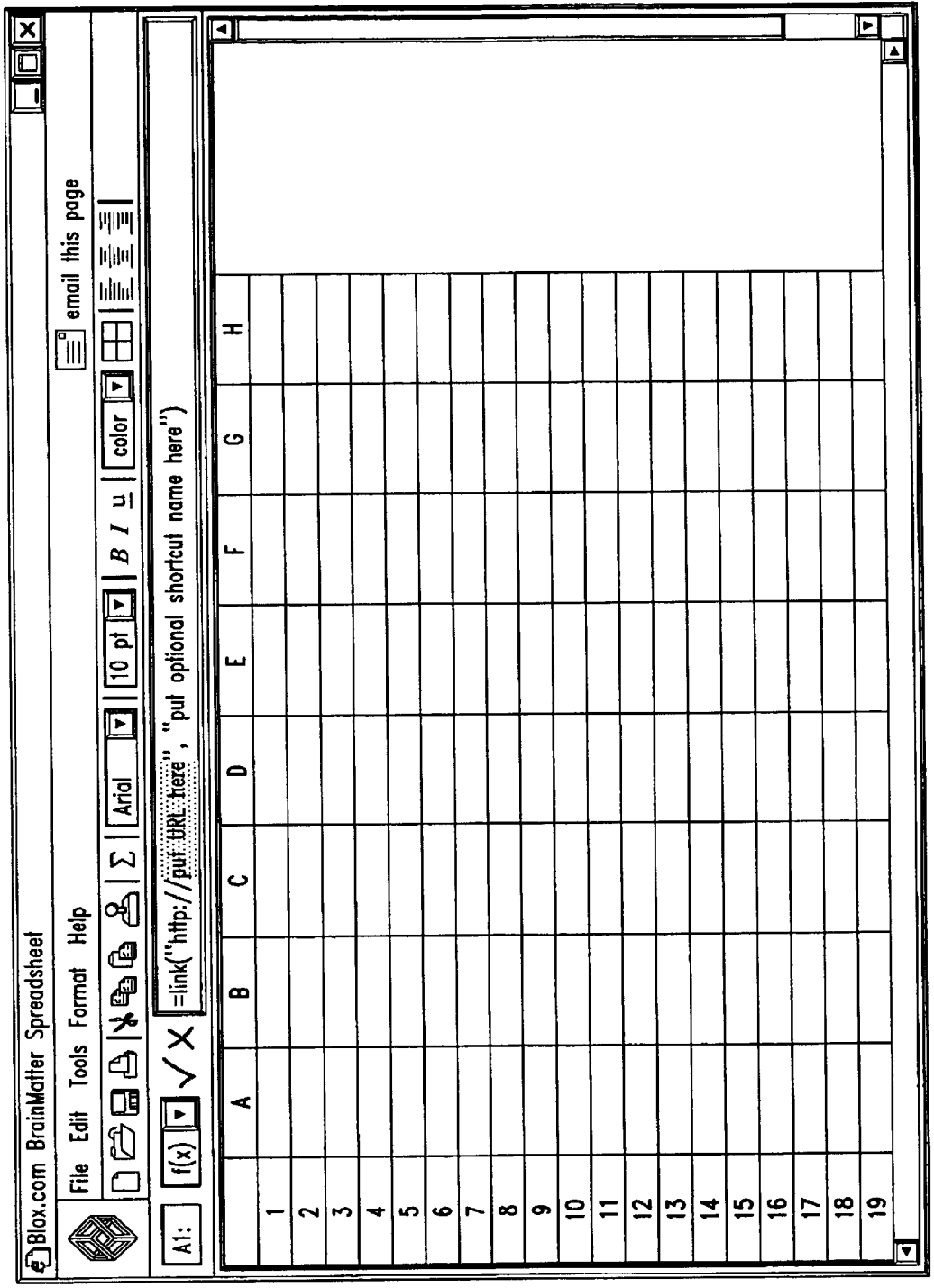
FIG. 9(a) shows an example of adding a hypertext link to the web-based spreadsheet.
Figure 9B:
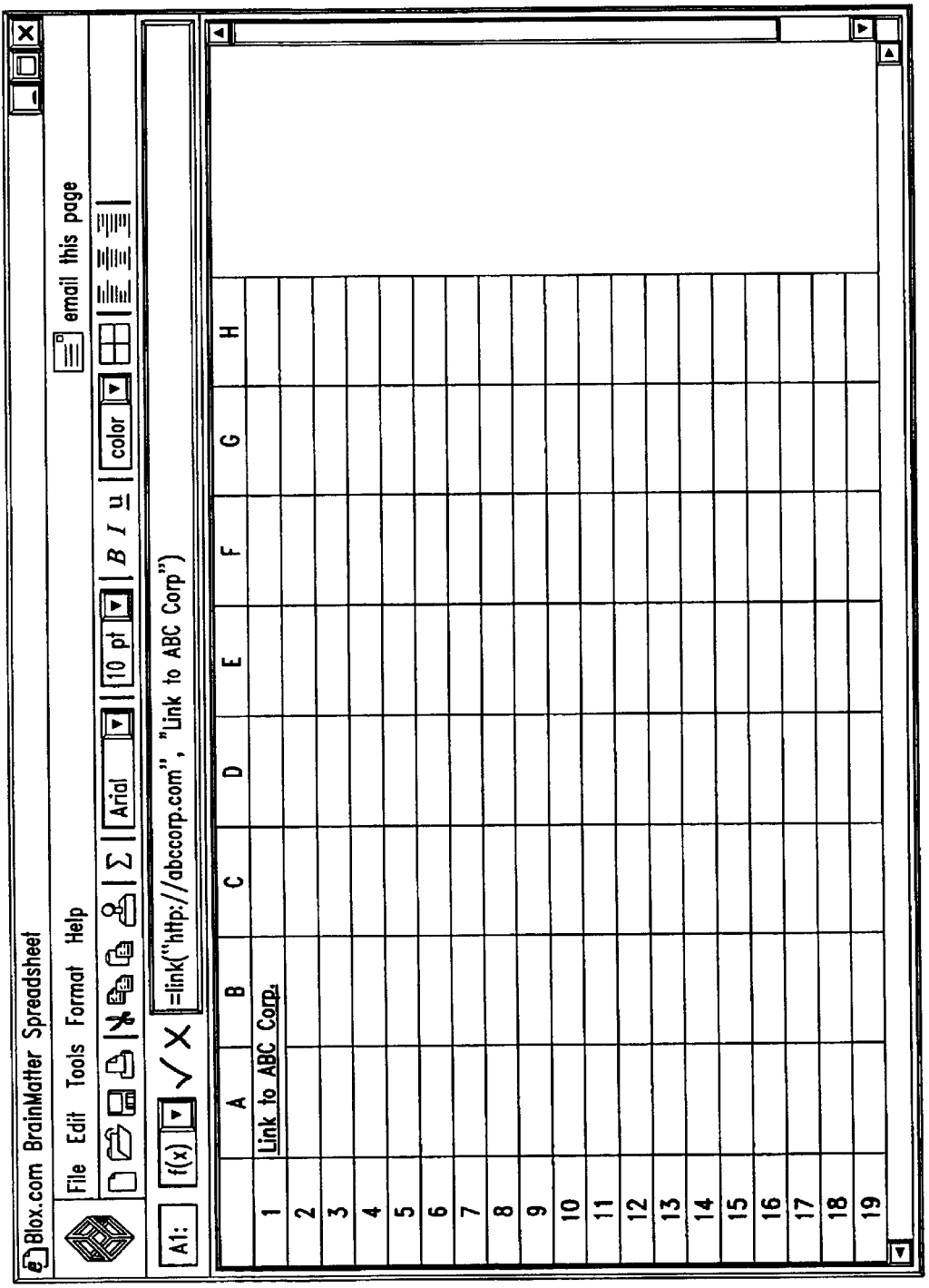
FIG. 9(b) shows the result of adding the hypertext link to the web-based spreadsheet.

FIG. 9(*a*) shows an example of adding a hypertext link to the web-based spreadsheet. The designer selects "Web Link" from the drop down menu 602, which places "=link("put URL here", "put optional shortcut name here")" in the function area 222. In the example, the designer then enters a URL (e.g., "http://abccorp.com") and a shortcut (e.g., "Link to ABC Corp"). At this point, the functionality of the spreadsheet page 112 (e.g., JavaScript in the page) inserts a link in the cell associated with the Web Link function. The link contains the shortcut specified by the designer. When the shortcut is clicked, the functionality of the spreadsheet page 112 (e.g., Javascript in the page) sends an http request to network 106, which passes the request to the appropriate server. Web server 104 returns the data (such as a web page) associated with the address/URL. The returned data is displayed inside a new browser window (not shown).

FIG. 9(*b*) shows the result of adding the hypertext link to the web-based spreadsheet. It will be understood that other parameters can be used for web data and real-time data. It will also be understood that other web functions and real-time functions can be used in conjunction with the present invention. For example, real-time data might include interest rate information, financial data, or engineering data corporate sales, customer complaints, HR expenses, benefits, trading exchange stats, and manufacturing monitoring data.

Figure 10A:
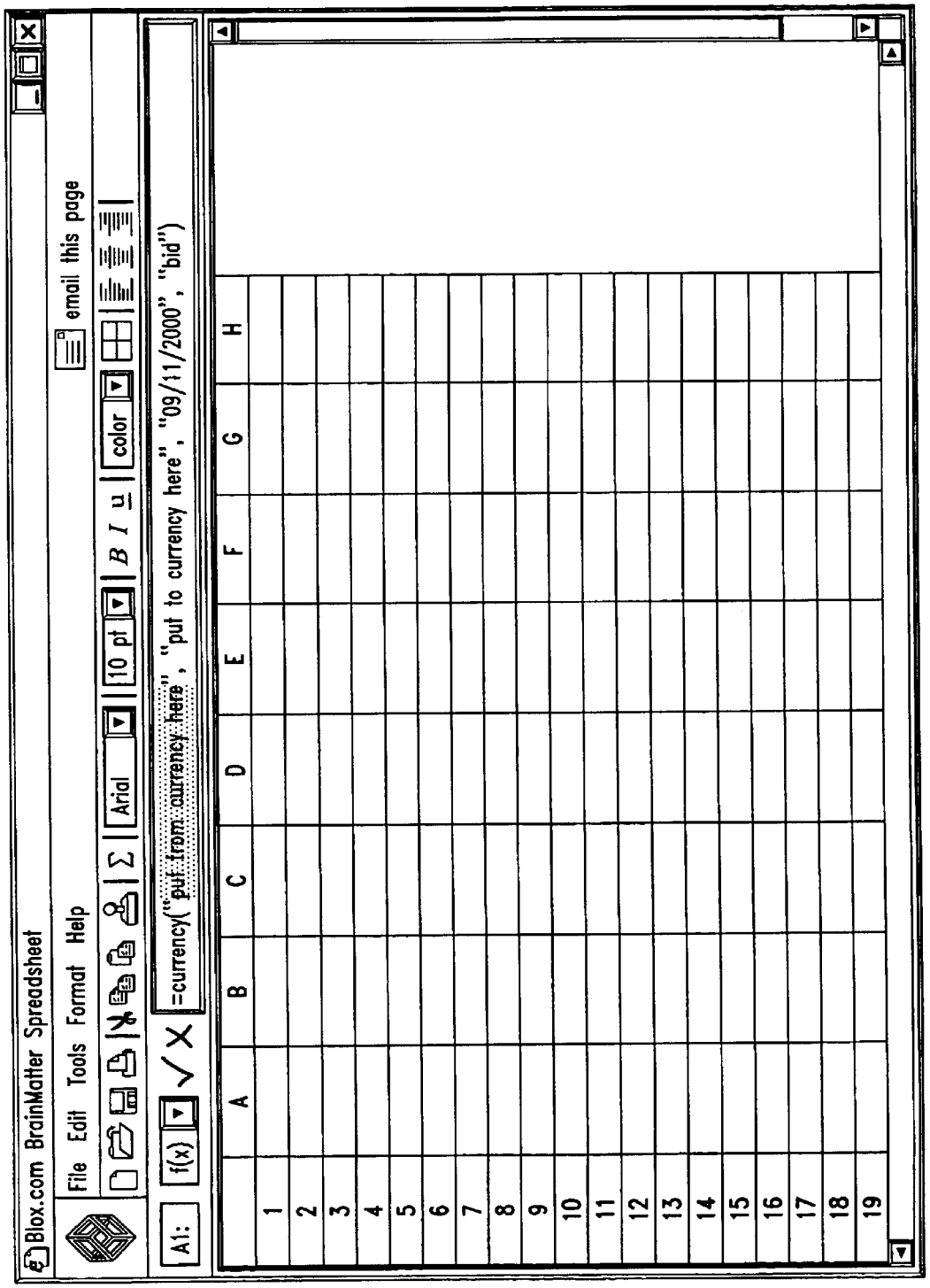
FIG. 10(a) shows an example of adding a real-time currency value to the web-based spreadsheet.
Figure 10B:
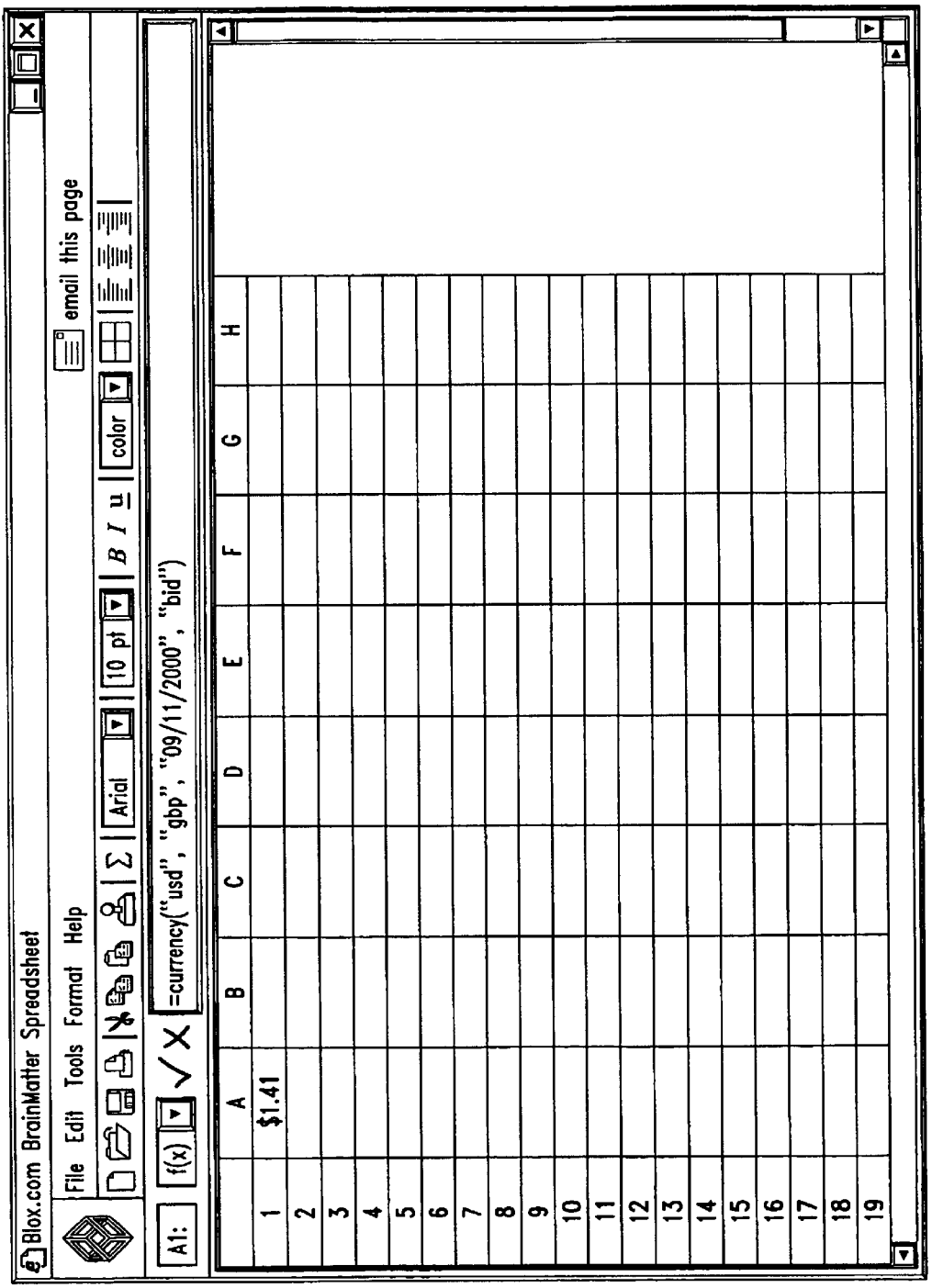
FIG. 10(b) shows the result of adding the real-time currency value to the web-based spreadsheet.

FIG. 10(*a*) shows an example of adding a real-time currency value to the web-based spreadsheet. The designer selects "Currency Quote" from the drop down menu 602, which places "=currency("put from currency here", "put to currency here", 09/11/2000", "bid")" in the function area 222. Currency conversion is performed from the FROM currency to the TO currency using the conversion rate of the date specified (default is today's date). "Bid" is an example of the conversion option, which is described in more detail in FIG. 5. In the example, the designer then enters a TO currency symbol (e.g., "usd" for U.S. dollars) and a FROM currency ("gbp" for Great Britain pound). The designer enters that day's date and "bid." At this point, the functionality of the spreadsheet page 112 (e.g., JavaScript in the page) sends an HTTP request to server 104 via network 106. The web server 104 returns a currency conversion quote for the values entered. The returned currency conversion quote (e.g., "$1.41") is displayed inside the cell associated with the Quote function.

FIG. 10(*b*) shows the result of adding real-time currency conversion quote data to the web-based spreadsheet. After a currency conversion quote (e.g., "$1.41") has been received, it is displayed in the cell 1002 associated with the Quote function.

Table 3 lists currency codes for use with the currency (from, to, date, option) function.

TABLE 3

| Currency | Code |
| --- | --- |
| U.S. Dollar | USD |
| Afghanistan Afghani | AFA |
| Albanian Lek | ALL |
| Algerian Dinar | DZD |
| Andorran Franc | ADF |
| Andorran Peseta | ADP |
| Angolan New Kwanza | AON |
| Argentine Peso | ARS |
| Aruban Florin | AWG |
| Australian Dollar | AUD |
| Austrian Schilling | ATS |
| Bahamanian Dollar | BSD |
| Bahraini Dinar | BHD |
| Bangladeshi Taka | BDT |
| Barbados Dollar | BBD |
| Belgian Franc | BEF |
| Belize Dollar | BZD |
| Bermudian Dollar | BMD |
| Bhutan Ngultrum | BTN |
| Bolivian Boliviano | BOB |
| Botswana Pula | BWP |
| Brazilian Real | BRL |
| British Pound | GBP |
| Brunei Dollar | BND |
| Bulgarian Lev | BGL |
| Burundi Franc | BIF |
| CFA Franc BCEAO | XOF |
| CFA Franc BEAC | XAF |
| Cambodian Riel | KHR |
| Canadian Dollar | CAD |
| Cape Verde Escudo | CVE |
| Cayman Islands Dollar | KYD |
| Chilean Peso | CLP |
| Chinese Yuan Renminbi | CNY |
| Colombian Peso | COP |
| Comoros Franc | KMF |
| Costa Rican Colon | CRC |
| Croatian Kuna | HRK |
| Cuban Peso | CUP |
| Cyprus Pound | CYP |
| Czech Koruna | CSK |
| Danish Krone | DKK |
| Djibouti Franc | DJF |
| Dominican R. Peso | DOP |
| Dutch Guilder | NLG |
| ECU | XEU |
| Ecuador Sucre | ECS |
| Egyptian Pound | EGP |
| El Salvador Colon | SVC |
| Estonian Kroon | EEK |
| Ethiopian Birr | ETB |
| Euro | EUR |
| Falkland Islands Pound | FKP |
| Fiji Dollar | FJD |
| Finnish Markka | FIM |

TABLE 3-continued

| Currency | Code |
|---|---|
| French Franc | FRF |
| Gambian Dalasi | GMD |
| German Mark | DEM |
| Ghanaian Cedi | GHC |
| Gibraltar Pound | GIP |
| Gold (oz.) | XAU |
| Greek Drachma | GRD |
| Guatemalan Quetzal | GTQ |
| Guinea Franc | GNF |
| Guyanese Dollar | GYD |
| Haitian Gourde | HTG |
| Honduran Lempira | HNL |
| Hong Kong Dollar | HKD |
| Hungarian Forint | HUF |
| Iceland Krona | ISK |
| Indian Rupee | INR |
| Indonesian Rupiah | IDR |
| Iranian Rial | IRR |
| Iraqi Dinar | IQD |
| Irish Punt | IEP |
| Israeli New Shekel | ILS |
| Italian Lira | ITL |
| Jamaican Dollar | JMD |
| Japanese Yen | JPY |
| Jordanian Dinar | JOD |
| Kazakhstan Tenge | KZT |
| Kenyan Shilling | KES |
| Kuwaiti Dinar | KWD |
| Lao Kip | LAK |
| Latvian Lats | LVL |
| Lebanese Pound | LBP |
| Lesotho Loti | LSL |
| Liberian Dollar | LRD |
| Libyan Dinar | LYD |
| Lithuanian Litas | LTL |
| Luxembourg Franc | LUF |
| Macau Pataca | MOP |
| Malagasy Franc | MGF |
| Malawi Kwacha | MWK |
| Malaysian Ringgit | MYR |
| Maldive Rufiyaa | MVR |
| Maltese Lira | MTL |
| Mauritanian Ouguiya | MRO |
| Mauritius Rupee | MUR |
| Mexican Peso | MXP |
| Mongolian Tugrik | MNT |
| Moroccan Dirham | MAD |
| Mozambique Metical | MZM |
| Myanmar Kyat | MMK |
| NL Antillian Guilder | ANG |
| Namibia Dollar | NAD |
| Nepalese Rupee | NPR |
| New Zealand Dollar | NZD |
| Nicaraguan Cordoba Oro | NIO |
| Nigerian Naira | NGN |
| North Korean Won | KPW |
| Norwegian Kroner | NOK |
| Omani Rial | OMR |
| Pakistan Rupee | PKR |
| Palladium (oz.) | XPD |
| Panamanian Balboa | PAB |
| Papua New Guinea Kina | PGK |
| Paraguay Guarani | PYG |
| Peruvian Nuevo Sol | PEN |
| Philippine Peso | PHP |
| Platinum (oz.) | XPT |
| Polish Zloty | PLZ |
| Portuguese Escudo | PTE |
| Qatari Rial | QAR |
| Romanian Leu | ROL |
| Russian Rouble | RUB |
| Samoan Tala | WST |
| Sao Tome/Principe Dobra | STD |
| Saudi Riyal | SAR |
| Seychelles Rupee | SCR |
| Sierra Leone Leone | SLL |
| Silver (oz.) | XAG |
| Singapore Dollar | SGD |
| Slovak Koruna | SKK |
| Slovenian Tolar | SIT |
| Solomon Islands Dollar | SBD |
| Somali Shilling | SOS |
| South African Rand | ZAR |
| South-Korean Won | KRW |
| Spanish Peseta | ESP |
| Sri Lanka Rupee | LKR |
| St. Helena Pound | SHP |
| Sudanese Dinar | SDD |
| Sudanese Pound | SDP |
| Suriname Guilder | SRG |
| Swaziland Lilangeni | SZL |
| Swedish Krona | SEK |
| Swiss Franc | CHF |
| Syrian Pound | SYP |
| Taiwan Dollar | TWD |
| Tanzanian Shilling | TZS |
| Thai Baht | THB |
| Tonga Pa'anga | TOP |
| Trinidad/Tobago Dollar | TTD |
| Tunisian Dinar | TND |
| Turkish Lira | TRL |
| Uganda Shilling | UGS |
| Ukraine Hryvnia | UAH |
| Uruguayan Peso | UYP |
| U.S. Dollar | USD |
| Utd. Arab Emir. Dirham | AED |
| Vanuatu Vatu | VUV |
| Venezuelan Bolivar | VEB |
| Vietnamese Dong | VND |
| Yugoslav Dinar | YUN |
| Zambian Kwacha | ZMK |
| Zimbabwe Dollar | ZWD |

Figure 11:
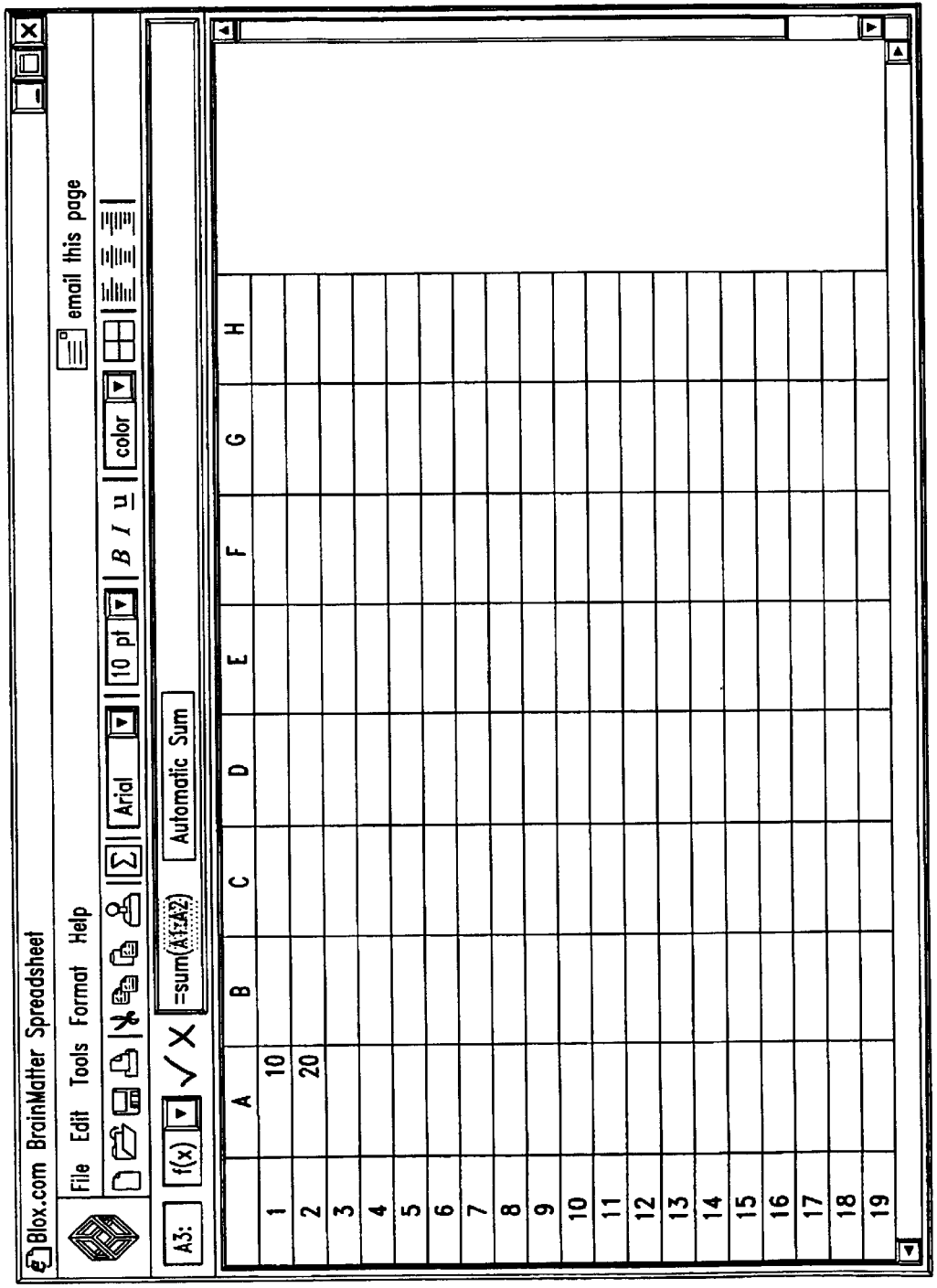
FIG. 11 shows an example of a cell that contains the sum of two other cells.

FIG. 11 shows an example of a cell A3 that contains the sum of two other cells (A1 and A2).

Moving and Selecting Cells

To navigate within a worksheet, the designer clicks the cursor on the cell that the designer is interested in editing. The chosen cell will be highlighted with a different color background. The designer can also select multiple cells by clicking and dragging the cursor across several cells. This is useful when the designer wants to apply a format to several cells at once. When the designer has selected multiple cells, the "target" cell is highlighted with a darker color than other cells in the selection. Note that while the designer can simultaneously format all the cells in a selection, the designer can only edit the value (or formula) of the target cell.

The designer can select an entire row or column by clicking on the row or column header within the worksheet (e.g. "A" or "5"). The designer can also select the entire worksheet by clicking on the single cell at the intersection of the row and column headers (to the left of "A" and above "1"). This is useful for applying global formatting, such as changing the font, to the entire sheet.

The arrow keys can also be used to navigate through the spreadsheet. The Tab key moves the selection one cell to the right; Shift-Tab moves it one cell to the left. Enter moves the active cell down.

Entering Data

To enter data into a spreadsheet, the designer highlights the cell of interest and begins typing. The typed data will replace any information currently contained within the cell. The designer can edit a cell's data by highlighting the cell of interest and moving the cursor to the command line. The designer locates the cursor wherever the designer wants to insert or replace data and begins typing.

Types of Cell Data

Several kinds of data that can be displayed in a spreadsheet cell:

Labels: Labels are simply strings of text that appear within a cell. They are typically used to name rows or columns of numbers, and for descriptive text introducing or explaining a spreadsheet. Text can also be used within formulas, but they must be enclosed in quotes (i.e. "text"). The "&" operator lets the designer create a long text string by "adding" together a number of smaller components.

Numbers: The designer can input numbers with or without a decimal point, and these numbers can be expressed as currency, as integers, as decimal numbers or as percentages (note, when using percentages 0.01= 1%, 0.30=30%, etc).

Dates and Times: also supports the input and display of date and time data. Use a "/" to separate the parts of a date; for example, type 10/6/1996. When entering a time, use the colon, ":" to separate hours and minutes. To enter a time based on the 12-hour clock, type a space, then an "A" or "P" to indicate AM or PM.

Formulas: Formulas are mathematical expressions that let the user perform a calculation within a spreadsheet cell. Formulas are always preceded with the "=" symbol. These formulas can be simple numerical expressions like, "=34*67/12." However, the real power of spreadsheet lies in using cell references as parts of formulas. Each cell has an address that is expressed as the intersections of its column and row. For example, the cell in column 5, row 3, is E3. Instead of using absolute numbers in formulas, the designer can use a cell reference to employ the number within a given cell as part of a formula. The formula, "=B3*C4" multiplies the values within the cells B3 and C4, and displays the result in the cell containing the formula.

Absolute and Relative References

One of the most useful things about using cell references within formulas is that the designer can easily duplicate those formulas in other cells using the copy and paste commands. For example, if the designer is creating a spreadsheet that describes his monthly expenses, and the designer has summed all expenses for January into cell B8, the designer can copy and past that formula into cell C8 for February, D8 for March, etc. To accomplish this without making a mistake, however, the designer needs to understand absolute and relative cell references.

Relative references are written in the notation introduced above, column letter, row number. When the designer copies and pastes a relative reference, it is automatically adjusted, based on the number of cells between where it is copied from, and where it is being copied to. In the example above, say the formula in cell B8 is, "=sum(B5:B7)," which simply adds all the numbers in cells B5 through B7. If the designer copies this formula from B8 and pastes it into C8, it will automatically be adjusted from "=sum(B5:B7)" to read, "=sum(C5:C7)." If it was pasted into D8, the formula in that cell would read, "=sum(D5:D7)," and so on.

Note that either the number or letter in a cell reference, or both can be relative or absolute. In other words, the designer can write, A2, $A2, A$2, or $A$2. The described embodiment checks to see which letters or numbers the $-sign applies to, when the designer is doing a copy/paste, and adjusts formulas accordingly.

Functions

The described embodiment contains a wide variety of built-in functions that can perform sophisticated analysis.

Currently, the functions are broken down into the following categories:

Math: Such as SUM(), which adds the contents of listed cells.

Financial: Such as PMT(), which calculates the payment on a loan.

Logical: Such as IF(), which lets the designer display one of two outcomes, based on whether an expression is true or false.

Lookup functions: Such as HLOOKUP(), which lets the designer look up a value in a row full of data.

Date and Time: Such as DAY(), which extracts the day of the month from a date string.

Text: Like CONCATENATE(), which creates a text string by putting several other strings together.

Web: Like QUOTE(), which provides a 20 min delayed quote for a given stock.

Functions are used in formulas, just like numbers or cell values (e.g. =A3+B7+SUM(C12,C14,H17)). For a complete listing of functions, see Table 4.

Because the program is dynamically delivered, the user always gets the newest version with the latest functionality.

TABLE 4

Math Functions

| | |
|---|---|
| abs( number ) | Returns the absolute value of the number |
| acos( number ) | ArcCosine of a value (angle returned in radians). If the designer wants the angle in degrees, combine acos( ) with the degrees( ) function. For example, degrees(acos(0.5)) = 60. |
| asin( number ) | ArcSine of a value (angle returned in radians). If the designer wants the angle in degrees, combine asin( ) with the degrees( ) function. For example, degrees(asin(0.5)) = 30. |
| atan( number ) | ArcTangent of a value (angle returned in radians). If the designer wants the angle in degrees, combine atan( ) with the degrees( ) function. For example, degrees(atan(1.0)) = 45. |
| atan2( x-coord, y-coord ) | ArcTangent of the angle between the x-axis and a line between the origin (0,0) and a point with the coordinates (x-coord, y-coord). The angle is returned in radians. If the user wants the angle in degrees, combine atan2( ) with the degrees( ) function. For example, degrees(atan2(3,3)) = 45. |
| average( number1, number2 . . . ) | Calculate the average of all numbers. |
| ceiling( number, round ) | Rounds a number up to the nearest multiple of round. For example, ceiling (2.25, 0.5) = 2.50 |
| cos( angle ) | Cosine of an angle (in radians). If his angle is in degrees, combine cos( ) with the radians( ) function. For example, cos(radians(30)). |
| degrees( radians ) | Converts an angle in radians to degrees. |
| e( ) | Returns the constant, e. |
| exp( exponent ) | Raises the constant e to the specified exponent |
| floor( number, round ) | Rounds value down to the nearest multiple of round. For example, floor (2.25, 0.5) = 2.00. |
| int( number ) | Returns the integer (or non-fractional) part of number. Note, int( ) does not round up or down. For example, int(3.765) = 3. |
| ln( number ) | Takes the natural logarithm (base e) of number. |

TABLE 4-continued

| | |
|---|---|
| log10( number ) | Takes the logarithm (base 10) of number. |
| max( number1, number2 . . . ) | Returns the maximum value of all numbers. |
| median( number1, number2 . . . ) | Returns the median (or middle) value of a set of numbers. |
| min( number1, number2 . . . ) | Returns the minimum value of all numbers. |
| mod( number, divisor ) | Returns the remainder of number/divisor. For example, mod(14,4) = 2. |
| pi( ) | Returns the constant, pi. |
| power( number, exponent ) | Raises number to the specified exponent. For example, power(3,2) = 9. |
| product( number1, number2 . . . ) | Multiplies all the number arguments together and returns the product. For example, product(3,2,5) = 30. |
| radians( degrees ) | Converts an angle in degrees to radians. |
| rand( number1, number2 ) | Returns a random number. Both arguments are optional. If number1 is included, rand(number1) returns a random number between 0 and number1. If number2 is included, then it returns a number between number1 and number2 |
| round( number, places ) | Rounds value up or down to the specified number of decimal place. For example, round(3.14159, 2) = 3.14. |
| sin( angle ) | Sine of an angle (in radians). If his angle is in degrees, combine sin( ) with the radians( ) function. For example, sin(radians(30)). |
| sqrt( number ) | Takes the square root of a number |
| sum( range ) | Adds the values of all the listed cells and ranges. Multiple cells addresses or ranges can be used. |
| tan( angle ) | Tangent of an angle (in radians). If the designer angle is in degrees, combine tan( ) with the radians( ) function. For example, tan(radians(30)). |
| trunc( number ) | Truncates a number to an integer. For example, trunc(12.893) = 12. |
| Financial Functions | |
| fv( r, nper, pay ) | The future value of a series of payments, at a specific interest rate, where:<br>r = the interest rate<br>nper = the number of periods of compounding<br>pay = the payment amount<br>Note: Make sure the designer is using consistent values for r and np. If payments are made monthly, the interest rate must be monthly (annual rate/12), as well. For monthly payments, nper = number of years × 12. |
| ipmt( r, per, np, pv ) | Returns the interest portion of a payment for a specified period, where:<br>r = the interest rate<br>per = the number of the period of interest<br>nper = the total number of compounding periods.<br>pv = the value of the series of payments, today.<br>Note: Make sure the designer is using consistent values for r and np. If payments are made monthly, the interest rate must be monthly (annual rate/12), as well. For monthly payments, nper = number of years × 12. |
| nper( r, pay, pv ) | Generates the number of periods needed to pay off loan, pv, based on constant periodic payments and a constant interest rate.<br>r = the interest rate<br>pay = period payment amount (note: this is normally a negative number).<br>pv = the value of the series of payments, today.<br>Note: Make sure the designer is using a consistent value for r. If payments are made monthly, the interest rate must be monthly (annual rate/12). |
| npv( r, pay1, pay2 . . . ) | Returns the net present value of a series of payments, where:<br>r = the interest rate per period.<br>pay1 . . . payn = payment amounts (note: payments must be equally spaced in time)<br>Note: Make sure the designer is using a consistent value for r. If payments are made monthly, the interest rate must be monthly (annual rate/12). |
| pmt( r, nper, pv ) | Returns the payment amount for a loan of amount pv, where:<br>r = the interest rate<br>nper = the total number of compounding periods<br>pv = the loan amount |
| ppmt( r, per, nper, pv ) | Returns the principle portion of a payment for a specified period, where:<br>r = the interest rate<br>per = the number of the period of interest<br>nper = the total number of compounding periods.<br>pv = the value of the series of payments, today.<br>Note: Make sure the designer is using consistent values for r and np. If payments are made monthly, the interest rate must be monthly (annual rate/12), as well. For monthly payments, nper = number of years × 12. |
| pv( r, nper, pay ) | Returns the present value of a series of payments, where:<br>r = the interest rate<br>nper = the total number of compounding periods.<br>pay = the amount paid each period (note: this is normally a negative number)<br>Note: Make sure the designer is using consistent values for r and nper. If payments are made monthly, the interest rate must be monthly (annual rate/12), as well. For monthly payments, nper = number of years × 12. |
| Logical and Information Functions | |
| iserror( cell ) | Returns true (the value 1) if the cell contains an error value. Otherwise, it returns 0 (false). |
| isblank( cell ) | Returns true (the value 1) if the cell is blank. Otherwise, it returns 0 (false). |
| isstring( cell ) | Returns true (the value 1) if the cell contains a string value. Otherwise, it returns 0 (false). |
| isvalue( cell ) | Returns true (the value 1) if the cell contains a numeric value. Otherwise, it returns 0 (false). |
| and( arg1, arg2 . . . ) | Returns true (the value 1) if all arguments are true. |
| or( arg1, arg2 . . . ) | Returns true (the value 1) if any or all of the arguments are true |
| xor( arg1, arg2 . . . ) | Returns true (the value 1) if only one of the arguments is true. |
| not( logical ) | Returns false (the value 0) if true; true (the value 1) if false |
| if( test, trueval, falseval ) | Returns trueval if test returns true, falseval if test returns false |

TABLE 4-continued

| | |
|---|---|
| false( ) | Returns false (the value 0). |
| true( ) | Returns true (the value 1). |
| Lookup Functions | |
| select( index, val1, val2 . . . ) | Selects value number index, from a set of values, or from a range. For example, select( 3, apple, baker, charlie, david) = charlie |
| hlookup( val, range, row ) | Does a lookup for a value within a horizontal range of cells, and returns a cell value from the column in which the looked-up value was found. val = number or text value to be looked-up. range = range of cells containing both the row of values to do look-up in, as well as the row of values containing return values. row = number of the row within "range" containing return values. |
| vlookup( val, range, col ) | Does a lookup for a value within a vertical range of cells, and returns a cell value from the row in which the looked-up value was found. val = number or text value to be looked-up. range = range of cells containing both the row of values to do look-up in, as well as the column of values containing return values. col = number of the column within "range" containing return values. |
| Date and Time Functions | |
| date( year, month, day ) | Returns the serial number (the internal date and time representation) for a specified date, where. year = a four-digit number from 1900 to 9999. month = a number from 1 (January) to 12 (December). day = a number from 1 to 31. |
| datevalue( datestring ) | Returns the serial number (the internal date and time representation) for a date string in the day/month/year format. |
| day( serialnumber ) | Returns the day of the month corresponding to the supplied serial number. |
| hour( serialnumber ) | Returns the hour corresponding to the supplied serial number. Hours are returned in military format ranging from 0 to 23. where 0 = 12 AM and 23 = 11 PM. |
| minute( serialnumber ) | Returns the minute corresponding to the supplied serial number. Minutes range from 0 to 59. |
| month( serialnumber ) | Returns the month of the year corresponding to the supplied serial number. Months range from 1 (January) to 12 (December). |
| now( ) | Returns the serial number (the internal date and time representation) for the date and time, combined. Use today( ) if the designer only wants the date value returned. |
| second( serialnumber ) | Returns the second corresponding to the supplied serial number. Seconds range from 0 to 59. |
| time( hour, minute, second ) | Returns the serial number (the internal date and time representation) for a specified date, where: hour = a two-digit number ranging from 0 (12 AM) to 23 (11 PM). minute = the minute of the hour ranging from 0 to 59. second = a number ranging from 0 to 59. |
| timevalue( timestring ) | Returns the serial number (the internal date and time representation) for a specified time, where timestring is in the format, hour:minute:second. hour = a two-digit number ranging from 0 (12 AM) to 23 (11 PM). minute = the minute of the hour ranging from 0 to 59. second = a number ranging from 0 to 59. |
| today( ) | Returns the serial number (the internal date and time representation) for the date. Use now( ) if the designer wants both the date and time returned. |
| weekday( serialnumber/ datestring ) | Returns the day of the week ranging from 1 (Sunday) to 7 (Saturday). The argument can be supplied either as an internal date-time serial number or as a date string in the format month/day/year. |
| year( serialnumber/datestring ) | Returns the 4-digit year. The argument can be supplied either as an internal date-time serial number or as a date string in the format month/day/year. |
| Text Functions | |
| concatenate( string1, string2 . . . ) | Joins all the strings supplied as arguments. The designer can also use the "&" operator to do concatenation. |
| User Interface Functions | |
| menu( key1, value1, key2, value2 . . . ) | Builds a popup menu within a cell. key = text to be displayed in the popup menu. value = value that is seen by other cells, and used in calculations when "key" is chosen. |
| Spreadsheet Linking Functions | |
| scell( row, col, "filename@membername" ) or scell( "filename@membername!cell" ) | Returns the last saved value of a cell contained within another spreadsheet. If the member is logged in, any spreadsheet within their "My Files" directory may be referenced. Otherwise, any public file may be referenced. row, col = row and column number of referenced cell. cell = cell reference in "a1" format. Note: entire fn@mn!cell string must be enclosed in quotes. filename = file name from "My Files" membername = member name. Note that "filename@membername" can be replaced by the fileID retrieved using sfind( ). |
| svlookup( val, filename@membername!range", col ) | val = number or text value to be looked-up. filename = file name from "My Files" membername = member name. For gallery files use the "gallery member name. range = range of cells containing both the column of values to do look-up in, as well as the column of values containing return values. Note: entire fn@mn!range string must be enclosed in quotes. col = number of the column within "range" containing return values. Note that "filename@membername" can be replaced by the fileID retrieved using sfind( ). |

TABLE 4-continued

| | |
|---|---|
| shlookup( val, file-name@membername!range", row ) | val = number or text value to be looked-up.<br>filename = file name from "My Files"<br>membername = member name. For gallery files use the "gallery member name."<br>range = range of cells containing both the row of values to do look-up in, as well as the row of values containing return values. Note. entire fn@mn!range string must be enclosed in quotes.<br>row = number of the row within "range" containing return values.<br>Note that "filename@membername" can be replaced by the fileID retrieved using sfind( ) |
| slist( membername ) | slist( ) returns a vector of filenames and fileIDs for use with the menu( ) function.<br>For example, = menu(slist( "smarty"))) would return a list of the public files for member "smarty". If the member is logged in, slist( ) will return a list of all "My Files" spreadsheets. Otherwise, it will build a list of public files for a referenced member. |
| sfind( "filename", "membername" ) or sfind ( "filename@membername" ) | sfind( ) returns the fileID of a file given its name (from "My Files") and membername.<br>Use sfind( ) when the designer has to make multiple references to cells in another spreadsheet. Put "=sfind("fn@mn")" in a spreadsheet cell, and reference that cell in scell( ) and svlookup( )function in other cells. Using the fileID instead of the filename@membername combination in scell( ) and svlookup( ) functions can make linked cell references much faster. |

Cell Ranges

Cell ranges are shorthand notation for describing a group of contiguous cells. The cell range expression, "D3:D7," is equivalent to "D3, D4, D5, D6, D7." Thus, the expression, SUM(D3:D7), is the same as D3+D4+D5+D6+D7. Many of the functions that take multiple arguments can use range values as well as single cell references.

Error Messages

When the described embodiment detects and error—either in a formula the designer has input, or within the spreadsheet itself, it will normally report an "[error]" (or similar) message in the appropriate cell. A couple of the common mistakes that generate error messages are unbalanced parentheses, and referring to a cell that has an invalid value. For example, the formula, "=IF(A3>0,0, SUM (A2:C2)," will generate an error because it is missing a closing parenthesis. Similarly, the expression, "=A2+B2," will display an error if either A2 or B2 contains an invalid value (such as a text label), instead of a number.

3. EDITING THE SPREADSHEET

Setting the Spreadsheet Size

Figure 12A:
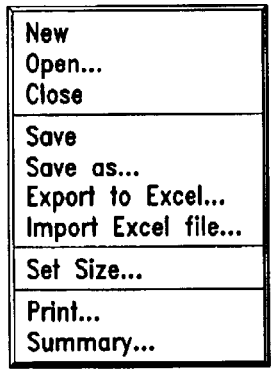
FIGS. 12(a)–12(e) show examples of drop down menus used in a described embodiment of a web-based spreadsheet in accordance with the present invention.

FIGS. 12(a)–12(e) show examples of drop down menus used in a described embodiment of a web-based spreadsheet in accordance with the present invention. FIG. 12(a) is the drop down file menu.

New: Opens a new browser window with a blank spreadsheet.

Open: Brings up a list of the members files and lets them select an open a file.

Close: Closes the current spreadsheet window. If the current document hasn't been saved, the member is prompted to save it.

Save: Saves the current document.

Save As: Saves the current document with a new, designer-prompted name.

Export to Excel: Exports the currently active spreadsheet into Excel format and asks the designer to save on to their computer.

Import Excel file: Prompts designer to select an Excel file to import as a new spreadsheet.

Set Size: Brings up a dialog letting the designer change the number of rows and columns in the spreadsheet. If the data will be cropped (resulting in data loss) a warning is displayed.

Print: Opens a static view of the spreadsheet in a new window as a preview of how the spreadsheet will be printed, and then prints the active spreadsheet.

The following paragraphs describe some of the commands on this menu. When the designer creates a new spreadsheet, it is automatically created in the default dimensions. After initializing a spreadsheet, there are several ways that the designer can change the size of the spreadsheet. The Set Size command, found in the FILE menu lets the designer immediately adjust the number of rows and columns in his spreadsheet. Increasing the number of rows or columns will add cells onto the edge of the spreadsheet. Decreasing the number of rows or columns will crop cells from the edge of the sheet. The designer should be careful when removing rows or columns not to delete any needed data.

Figure 12B:
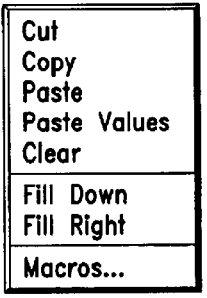
Figure 12C:
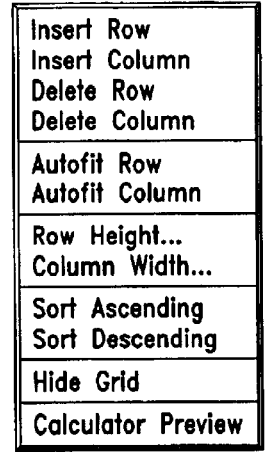

FIG. 12(c) describes the drop down Tools menu. The TOOLS menu has a variety of operations that affect the display, contents and ordering of spreadsheet cells. The tools menu includes;

Insert Row/Column: Adds rows or columns, shifting highlighted rows or columns, down or to the right.

Delete Row/Column: Deletes rows or columns containing the currently highlighted cell or range of cells.

Autofit Row/Column: Automatically resizes rows or columns to accommodate the size of the content in highlighted cells.

Sort Ascending/Descending: Sorts a cell range by row, based on the leftmost column of cells.

Hide Grid: Suppresses the display of the light blue grid around spreadsheet cells.

Calculator Preview: Lets the designer simulate the look of a spreadsheet in Calculator mode, and adjust which cells can be edited when viewed as a calculator.

Summary & Instructions: Brings up a dialog box that lets designers type in a file description and instructions on how to use the spreadsheet. These instructions are accessible when the document is opened in Calculator Mode.

The following paragraphs describe some of the commands on this menu. The Insert Column, Insert Row, Delete Column and Delete Row commands, found under the TOOLS menu, perform the corresponding operations. To delete a column or row, the designer clicks on the row number or column letter (e.g. "3" or "D"), to highlight that row or column. Or, the designer selects cells within the row(s) and column(s) that he wants to delete and then selects the Delete Column or Delete Row command from the menu. Alternatively, the designer can simply select a cell or cells within the row or column the designer wants to delete before issuing the command. The designer can also right click on the selected cells to choose Insert/Delete Row or Column from the Tools menu that appears for the selected cells. The designer can delete multiple columns or rows in the same operation by highlighting all the rows or columns the designer wants to delete, at once. If the designer wants to delete multiple rows or columns simultaneously, they must be contiguous. To insert columns or rows, the designer selects the column or row immediately after the location where the designer wants the new column or row to be added. The new column or row will be added before the highlighted cells. The designer can insert multiple columns or rows by highlighting multiple columns or rows before the designer executes Insert Column/Row. New rows or columns will increase the total size of the spreadsheet.

Resizing Rows and Columns

The designer can modify the width of a row or column by clicking in the row or column header next to the dividing line between the columns or rows the designer wants to change, and then dragging to the right, left, up or down. The resizing mechanism is sensitive to exactly where the designer clicks. If the designer has clicked in an appropriate location, a gray outline will appear around the column or row that the designer is about to resize.

The designer can resize multiple columns or rows simultaneously by highlights all the rows or columns the designer wants to resize, clicking on the edge of one of these rows or columns, and then dragging the border accordingly. All the rows or columns will be sized to the width of the one the designer set.

Clearing and Deleting Data

FIG. 12(b) is the drop down Edit menu. The Edit menu includes the commands:

Cut, Copy, Paste: When used in combination, these commands let the designer duplicate a cell or cell range elsewhere on the spreadsheet, or to move that cell or range to a new location within the sheet.

Clear: Erases cell contents

Fill Down/Right: Takes the highlighted range and fills blank cells with either a number or series of numbers determined by the topmost or leftmost cells in the range.

Using, Cut, Copy and Paste

Cut, Copy and Paste are found on the EDIT menu, and work the same way in as they do in most software applications. To cut or copy a group of cells, first select the "source" cells by clicking on the first cell of interest and dragging to highlight the cell range. Choose Cut or Copy from the EDIT menu, or click on the corresponding icon, on the Formula Bar. The cell range will be enclosed with a black border.

The designer selects the destination cell or cell range in the same manner, and then chooses Paste, or clicks on the Paste icon. If the designer initially chooses Copy, a duplicate of the source cells will appear in the destination location. As in most software applications, the keyboard shortcuts for Cut, Copy and Paste (Ctrl-X, Ctrl-C, Ctrl-V) and the right-click menu options for these actions are available for selected source cells. The formula in these cells will be adjusted based on whether their cell references were relative or absolute. If the designer initially chooses Cut, the selected cells will be moved to the new location. The references in formulas within this range will continue to point to the original cells.

Filling and Sorting

The Fill Down and Fill Right commands on the EDIT menu let the designer fill a section of cells with a set of numbers or a series of numbers. To use the Fill Down command, the designer selects a range of cells, making sure that the topmost cell in the range contains the value the designer wants to use for the fill. Choose Fill Down to populate the range with that value. The Fill Right command works the same as Fill Down except it propagates its values along rows instead of columns.

The Sort Ascending and Sort Descending commands on the TOOLS menu let the designer reorder a rectangular selection by the values in the first column of the range. The Sort commands will only reorder the selection row-wise.

Formatting Numbers, Dates and Time with the Format Menu

Figure 12D:
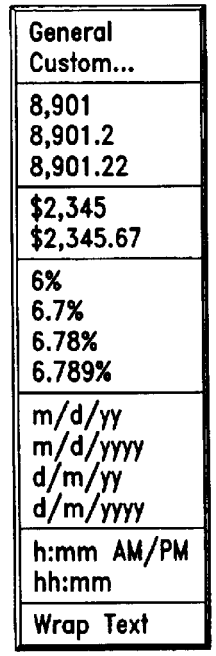

FIG. 12(d) is the drop down Format menu. The FORMAT menu contains formatting commands for numbers and dates. These commands include:

General: Removes any pre-determined format for highlighted cells. Most commonly used for cells containing text.

Custom: Brings up the Custom Format dialog, which gives access to a flexible system for setting the display of numbers and dates within cells.

8,901, 6% etc: Pre-built formats, which can instantly applied to a range of selected cells.

Wrap Text: Lets the designer wrap text within the right and left cell borders. The default behavior is to let text overrun the cell borders.

The described embodiment contains a flexible and powerful engine for formatting numbers, dates and times. Numbers can be expressed as currency (preceded by $), decimal values, integers, percentages, or dates. To format a number of range of numbers, the designer selects the cell or range of cells the designer wishes to format. He then clicks on the FORMAT menu and drags down to highlight the appropriate format style (FIG. 6a). The selected format will be applied to those cells.

Using the Custom Format Dialog

The FORMAT menu contains a variety of commonly used number, time and date formats. There will be occasions, however, when the designer will need a format that is unavailable on the FORMAT menu. The Custom . . . format control dialog, accessed from the FORMAT menu, lets the designer specify exactly how the designer would like a number, time or date to appear. The dialog lets the designer specify four sections of formatting: for positive numbers, for negative numbers, for zero and for errors.

Numbers: The dialog uses a set of special codes that tell how to show numbers. The symbol "#" is used as a placeholder for "optional" digits within a format (see examples below). The symbol "0" is used to indicate mandatory digits within a number format. When a "0" is specified within a format string, it means that the number will be padded with 0's if there are no digits in the appropriate place in the number, natively. For example, the number "0.3" formatted with the code, "0.00," will display as, "0.30." Table 5 has examples of number formats.

TABLE 5

| To display | Use the code |
|---|---|
| 1526.37 as 1,526.4 | #,###.# |
| 15.2 as 15.200 | ##,000 (or #,###.000) |
| .327 as 0.33 | 0.00 |
| 56.3 as $56.30 | $##.00 |
| −56.3 as ($56.30) | ($##.00) in the negative number field |

Note, that if the designer use symbols other than "#" or "0", those symbols are inserted as-is in the format. This is a useful way to include symbols for non-US currency. A quantity of 35 British pounds (£35), for example, could be expressed with the code, "£##".

Date: recognizes date strings by the combination of the letters, "m", "d", "y", with the delimiter. "/". The designer can use the "mm" or "dd" to insure that day or month numbers are always two digits (e.g. "2" is always "02"). Years are always expressed as either 2-digits or 4 (e.g. 95 or 1995). Table 6 has date formats.

TABLE 6

| To display | Use the code |
|---|---|
| April 5, 1989 as 4/5/89 | m/d/yy |
| April 5, 1989 as 5/4/1989 | d/m/yyyy |
| April 5, 1989 as 050/4/1989 | dd/mm/yyyy |

Time: recognizes times by the combination of letters, "h", "m", "s", with the delimiter. ":". The designer can use the "hh" or "mm" to insure that hours or minute numbers are always to digits (e.g. "6" is always "06"). Use the tag, "AP" or "ap" to indicate "AM/PM" formatting. Otherwise military (24 hr) formatting is assumed. Table 7 has time formats.

TABLE 7

| To display | Use the code |
|---|---|
| 9:25 PM as 9:25 PM | h:m AP or h:mm AP |
| 8:05 PM as 20:05 PM | h:mm |
| 9.25 PM as 09:25 PM | hh:m AP |

Using the Type, Color and Border Controls

Fonts can be selected, styled, sized, colored and aligned using the controls on the Format Bar. Like all formatting controls, type, color and border controls can be applied to a single cell or to a range of cells. These controls work identically to similar controls in standard desktop applications. Note that the designer can only apply this formatting to the entire text with a cell. The designer cannot select a piece of the text and apply type controls to only that piece.

The Color menu, accessed from the Format Bar, allows the designer to set the text color and background colors for a cell. The designer clicks on the color menu icon to pop-out the color selector, then chooses a swatch to change either text or cell color.

Figure 12E:
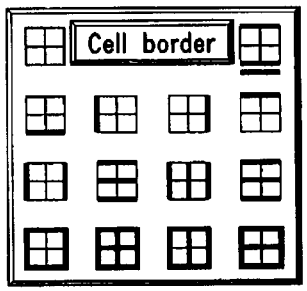

The Border menu, shown in FIG. 12(e), is also accessed from the Format Bar, and lets the designer control the outline style on the sides of spreadsheet cells. The designer can apply a variety of line styles to cell edges. To use the Border menu, the designer clicks on the menu icon to pop-out the available border styles. The designer can use the icon with no lines to erase all existing borders from a cell or range of cells. Some of these controls work differently depending on whether the designer has selected a single cell or a range of cells. This lets the designer apply a thin outline around the outside of a rectangular selection, instead of to every cell within a selection.

Adjusting Text Wrapping

By default, any text typed within a spreadsheet cell will flow across the cell border into adjacent cells—if it is too large to fit into its own cell (and if there is no text or number in the adjacent cell). The designer can change this behavior by turning text wrapping on. With text wrapping on, text within a cell will wrap at the cell edge to create multiple lines within the same cell. The designer can then adjust the row width so these multiple lines display correctly. To turn on text wrapping, the designer selects the Wrap Text command from the FORMAT menu.

Copying Cell Formats with the Format Stamp

The Format Stamp is used to apply a set of cell formats to a cell range. With the Format Stamp, the designer can adjust the font type, style, color, alignment and border for a single cell and then apply all those formats to other cells in a single operation. To use the Format Stamp, the designer selects the cell or cell range that has the formatting the designer wants to copy. The designer clicks the Format Stamp icon on the Format Bar, then highlights the cell or range to which the designer wants to apply the formatting.

The designer can also use the Format Stamp on column or row headers by choosing a column letter or row number, clicking the Format Stamp, and then clicking on the column or row the designer wants the format applied to. If the designer wants to copy a cell's formatting multiple times, double-click the Format Stamp icon (it will stay in the depressed state), then applies the formatting to all the relevant selections. When the designer is finished applying the formatting, click the Format Stamp icon again to turn it off.

Figure 13A:
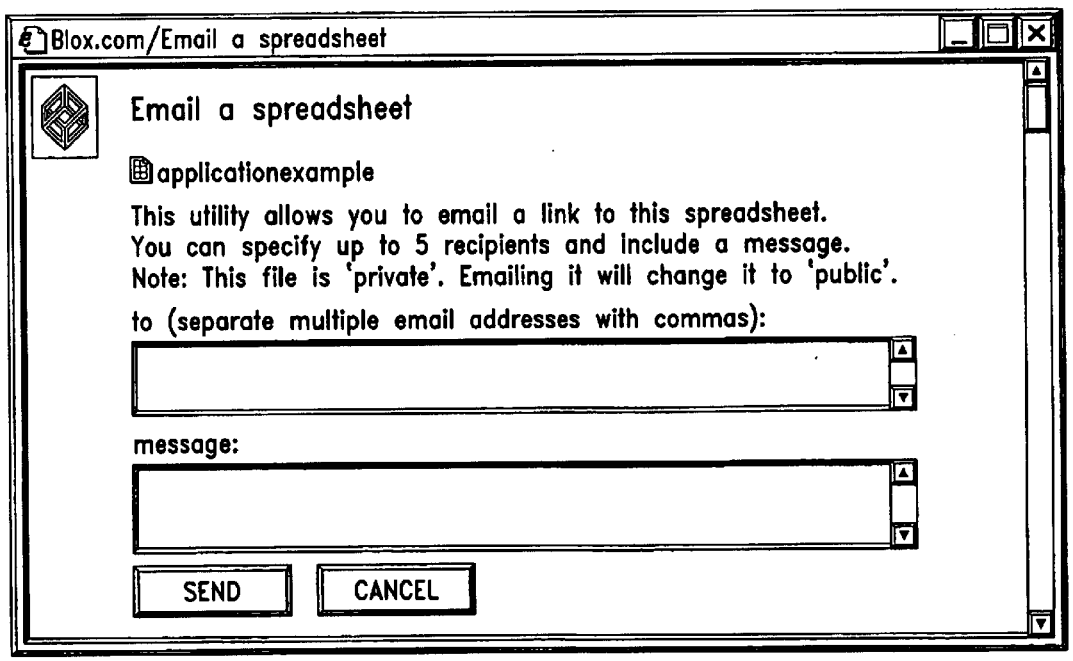
FIG. 13(a) shows an example window enabling a user to email a spreadsheet.

FIG. 13(a) shows an example window enabling a user to email a spreadsheet. This window is displayed when the user clicks on "Email this page" 206 (see FIG. 2). The window allows the user to specify a TO email address and a message. When the user presses the SEND button in the window, the window of FIG. 13(b) is displayed.

Figure 13B:
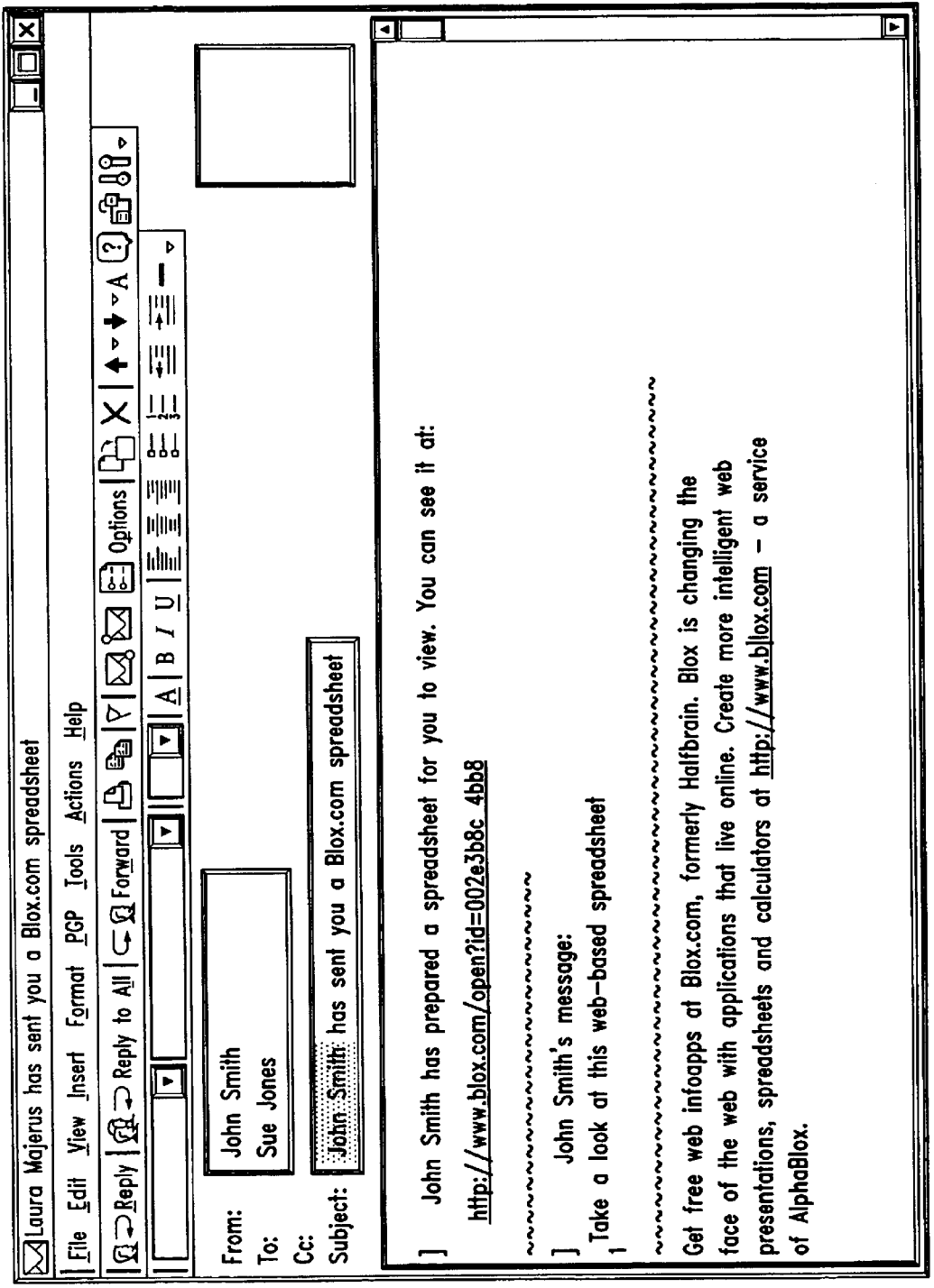
FIG. 13(b) shows an example email used to send a link to a spreadsheet.

FIG. 13(b) shows an example email used to send a link to a spreadsheet. In this example, John Smith has sent a web-based spreadsheet to Sue Jones. The email contains a link (http://www.blox.com/open?id=002e3b8c4bb8) to server 104 with an ID of the spreadsheet. When Sue Jones opens the email and clicks on it, a browser will open and display the spreadsheet.

4. MACROS

The described embodiments let designers enhance the program themselves using macros. Macros allow the designer to extend the built-in capabilities of the application by wiring his own JavaScript code. Certain embodiments will also feature a Macros Gallery where the designer can share the designer's own macro and reuse the code of others.

Custom Functions Using Macros

The described embodiment contains a rich library of built-in functions. As a spreadsheet author, the designer combines these functions into cell formulas to make his spreadsheets work. For most people, most of the time, the built-in function set is all that is needed.

Sometimes, however, the designer will find himself wishing that the system had a function that it doesn't. Maybe the designer needs to do arithmetic on dates, or find the volume of sphere, or do a search and replace operation on a bit of text. Or perhaps the designer needs to do a calculation specific to his company or business. In some of these cases, the designer might suffice with creating a complex cell formula. But even if the designer could, it would probably be difficult to reuse this formula in other cells or other spreadsheets.

Custom functions are the answer. Using JavaScript, the designer can invent a new spreadsheet function that does exactly what the designer wants. Here are the hallmarks of a custom function:

It is invoked as part of the cell formula

It accepts zero or more arguments, which can be literal values (like numbers) or cell references.

It returns a single value.

It does not internally set the value of other cells (see setcell() below).

It may internally call other built-in or custom functions.

In other words, a custom function is just like a built-in function: it returns a value based on passed-in arguments and internal logic.

Traditional Macros

A macro can:

get and set the value of multiple spreadsheet cells.

get and set the value of global variables.

use timers to conduct periodic processing.

call other macros or built-on functions.

This may sound simple, but the capabilities here are very powerful. By rewriting cell contents, the designer can change entire parts of his spreadsheet based on designer input or other factors. In fact, macros can effectively treat the spreadsheet grid as in an output device and dynamically present information in ways quite beyond the capabilities of a traditional spreadsheet.

Invoking a Macro

In the described embodiment, there are three ways to invoke a macro:

Enter it into a spreadsheet formula

Automatically invoke it at load time using the special init() macro.

Call it from another macro.

From a Spreadsheet Formula

The designer can enter a macro call into a cell formula just as the designer would be built-in function. Simply type its name following by opening and closing parenthesis (and any arguments). Keep in mind that all cell formulas (as opposed to literal values) must begin with an equal sign ("="). Here is a simple example of a cell formula using a macro:

=makeLowerCase(B3)

In keeping with the case-insensitive nature of formulas, capitalization is not important when referencing a macro in a formula.

A macro will execute whenever the cell is recalculated. This is most useful for custom functions that are designed to return a single value to the formula. However, with careful design, it is possible to invoke more far-reaching macros from a cell. See the Advanced topics section for more information.

The Init()function

If the designer creates a macro called "init()", it will be automatically executed when his spreadsheet loads from server 104 and before any cells start to recalculate. This provides an easy way for the designer to initialize the state of his application by setting up globals, updating cell contents, and starting timers.

From Another Macro

Naturally, the designer can call one macro from another. To do so, simply reference a macro name as the designer would any other function in JavaScript.

The Macro Editor

Figure 14A:
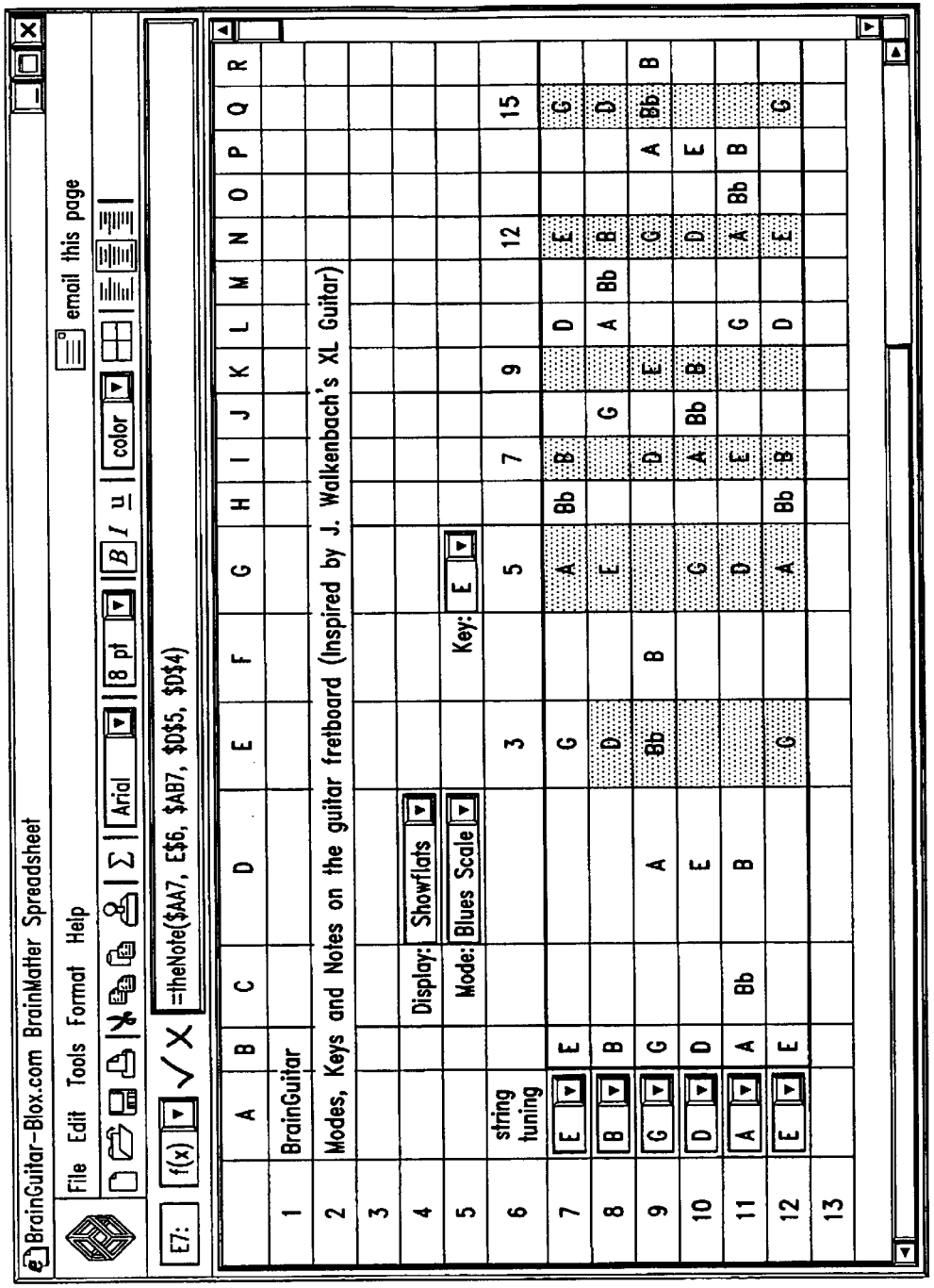

FIGS. 14(*a*)–14(*d*) show an example spreadsheet created and viewed in accordance with the present invention and including macros. In this example, the cell E7 has an associated macro "theNote," which has 5 inputs, as shown in function area 222.

FIG. 14(*b*) shows two examples of macro editor. The macro editor is used to allow the designer to create and modify his macros. To get there, choose Macros . . . from the EDIT menu in FIG. 12(*b*).

The macro editor is a very simple text editor with these main parts:

The text area. This is where the designer types in this macro code and perform basic editing operations like insert, delete, copy, cut, paste, and undo. When the designer first opens the macro editor, the text area contains an empty init() function to get the designer started.

The function jump menu. This menu contains the names of all the macro functions currently defined in the text area. To jump to a function, just select its name in the menu.

Clicking OK in the macro editor will save any edits you've made, execute his init() function (if any), and recalculate any cells in the spreadsheet that have macro calls in their formulas. In this sense, clicking OK in the macro editor is a lot like re-opening the spreadsheet.

Writing Macros

This section discusses the details of writing macro code. A basic discussion of JavaScript syntax and using JavaScript in web browsers is found in: JavaScript: The Definitive Guide (O'Reilly Press)

JavaScript vs. Macros

Macro code is, by and large, standard JavaScript code. It uses the same syntax, control structures, data types, built-in functions and objects, and so on.

This is not too surprising when the user considers that the described embodiment itself is written in JavaScript, and that the browser conveniently supplies a built-in JavaScript interpreter.

What is Included and What is Not

All the features of core JavaScript are available to a macro. In addition to the standard data types (scalars, arrays, objects), operators (like +, *, &&, ==,etc.) and statements (like if/else, switch, for, for/in, while, and return) the designer also has access to the core built-in objects like Math and Date Note that the core JavaScript language is defined separately from any context (like a web browser) in which it is used. This is an important distinction, because the entire DOM (document object model) that the designer may be accessing when scripting is not available in a browser. The DOM—including the window and document objects and their many sub-objects—are not available in macros. If they were, macro code could arbitrarily rewrite or delete portions of this page, which in this case is itself.

That is important enough to restate: if the designer macro code tries to access the window or document objects or other parts of the DOM, it will generate an error. These objects do not exist in the macro's scope, so do not try to use them.

There are a few parts of the DOM that are so generally useful that we've left them available. Here is a list of these objects and methods:

alert()
confirm()
prompt()
setTimeout(), clear Timeout()
setInterval(), clearInterval()
navigator
screen Note that although these objects and methods are normally properties of the window object, in the macro code they can only be accessed by calling them directly. So calling "screen" will work, while "window.screen" will cause an error.

The Structure of a Macro

A macro looks just like a regular JavaScript function. It begins with the "function" keyword, has an optional arguments list, and then has a body of one or more lines of JavaScript. Here is a simple example:

```
// returns an all-lowercase version of a string
function makeLowerCase(aString) {
    return aString.toLowerCase( );
}
```

A set of macros is just a series of these JavaScript function definitions.

Cell References as Arguments

Assume that we use the above macro in a cell formula:

```
=makeLowerCase( B7 )
```

If a cell reference is passed to the macro, the value of the "aString" argument in the macro code is what the designer might expect: the argument contains the value of cell B7. In other words, as a macro author the designer doesn't have to worry about whether a macro argument is a cell reference or a literal value. The spreadsheet engine takes care of translating cell references into cell values for you.

This statement also holds true for passing cell ranges (like A3:C5) into a macro, although the designer may have to do a little extra work to access all the values in the range.

Local and Global Variables

Local Variables

Inside a macro, local variables are declared in the standard fashion:

var schmoo:

var myVar, i, counter=0;

It is important that the designer uses the "var" statement to declare all variables. If the designer does not, he'll accidentally create a global variable that could, in some circumstances, interfere with the normal operation of the spreadsheet. Thus, declare all variables with "var". (The only exception is a named argument, which is implicitly declared as local by JavaScript.)

Global Variables and the "g" Object

In standard JavaScript, the designer creates a global variable by declaring it outside the scope of any function. Although this is possible in macro code, it is strongly discouraged Declaring global variables in this manner could, in some circumstances, result in conflicts with the spreadsheet application itself.

Instead, macros have access to a special global object named "g". Initially this object is empty. Macros can, at any time, read and write properties in this object. This allows the designer to create global values that can be shared across all macros in a spreadsheet.

Often, a designer will find it easiest to initialize globals in the special init( ) macro. This ensures that his globals are ready before any other macro code starts executing. Here is an example init( ) macro that sets several globals:

```
function init( ) {
    // set up globals
    g.inputCell = "B3";
    g.startPrompt = "Please enter a value to start.";
    g.lettersUsed = new Object( );
    // other code follows . . .
}
```

Note that the designer can also treat spreadsheet cells as "global variables" using the special getcell( ) and setcell( ) functions.

Calling Other Macros

To call one macro from another, the designer should call it directly as the designer would any other JavaScript function. Here is an example of a macro that relies on another:

```
// returns true if two strings are the same
// (the comparison is case-insensitive)
function compareNoCase(str1, str2) {
    var str1NoCase = makeLowerCase(str1);
    var str2NoCase = makeLowerCase(str2);
    return (str1NoCase == str2NoCase);
}
```

Just like any JavaScript function call, calls to macros are case-sensitive.

The Macro API and the Call Object

In addition to calling other macros and native JavaScript methods, macros can also access a simple API through a predefined global object named "call." The call object allows his macro code to take advantage of the built-in function set, as well as other special functions.

Calling Built-in Functions

All of the built-in functions of the described embodiment are also available for use in macros. To access a built-in function, preface its name with the "call" prefix. Here is an example of a macro accessing the built-in trunc( ) function:

```
// formats a floating-point number
// as a whole-dollar value
function asWholeDollar(num) {
    return "$" + call.trunc(num) + ".00";
}
```

Calls to built-in functions must be in all-lower or all-uppercase. For example, call.trunc( ) and call.TRUNC( ) are both allowed. A mixed case call such as call.Trunc( ) will cause a runtime error.

Note that not all of the built-in functions are useful to macros. For example, the menu( ) function (which formats a cell as a drop-down menu) and the image( ) function (which displays a picture inside a cell) would have no meaning if called directly from a macro.

Special care must be taken when calling web functions from macros. These functions, including quote( ), currency( ) and scell( ), load data over the network and therefore do not immediately return their final value.

getcell( )

Given a cell reference, the call.getcell( ) function returns the value of a single spreadsheet cell. Note that this function returns the cell's calculated value, not the cell formula (if any). It can accept several different argument formats:

call.getcell(cellRefString)

cellRefString is a string containing a cell address (like "B3" or "e32")

call.getcall(rowNum,colNum)

rowNum and colNum are integers specifying the cell's row and column location. Rows and columns are numbered starting with 1.

setcell( )

Given a cell reference, the call.setcell( ) function overwrites the value of a single spreadsheet cell. It returns null if successful, and an error object otherwise. It can accept several different argument formats:

call.setcell(cellRefString,value)

cellRefString is a string containing a cell address (like "B3" or "e32")

value is the new value for the cell call.setcell(rowNum, colNum,value)

rowNum and colNum are integers specifying the cell's row and column location. Rows and columns are numbered starting with 1.

value is the new value for the cell.

Currently, setcell( ) can only be used to write literal values (like numbers or strings) into a cell. It cannot be used to write formulas.

In calculator mode, empty cells do not "exist" from the point of view of a macro. If the designer ties to set the value of an empty cell in calculator mode, he will receive an error.

The workaround is to make sure all cells the designer plans to change with setcell( ) are saved with some kind of value.

Global Code

As mentioned above, macro code is composed of one or more function definitions. The designer may wonder if the designer can write code outside of any function—in other words, global code.

Although this is possible, it is not advisable. Although global code will execute, there are several potential problems with using global code. There is actually no reason to use global code anyway. If the designer wants to execute code at load time, use the init( ) macro. If the designer wants to declare global variables, he should use the predefined g object.

The exceptions to this rule are standard JavaScript comments.

Browser Compatibility

The described embodiment runs in the Windows versions of both Internet Explorer 4 or better and Netscape Navigator 4.5 or better (in calculator mode). Support for core JavaScript varies somewhat between these browsers. For example, Navigator 4 supports Array.push( ) and Array.pop( ) methods that don't exist in Internet Explorer.

It is the responsibility of a macro author to test his applications in all target browsers and versions. Code that runs correctly in one browser may generate errors in another. If the designer submits a spreadsheet to the macro gallery that contains macros, the designer must ensure that it runs correctly in all supported browsers. If the designer wants to use a feature that the designer knows is available in some— but not all—of the allowed browsers, he should write a browser detect function. Browser detection is a common task in JavaScript. However, it usually involves testing JavaScript's navigator.userAgent property and comparing against a set of known browsers.

Handling and Generating Errors

Like any JavaScript code, macros will sometimes contain errors. In addition, in some cases the built-in functions will return errors. Macro errors fall into one of two categories:

Syntax Errors

A syntax error occurs when the designer writes incorrect JavaScript. The described embodiment catches syntax errors automatically when the designer clicks "OK" in the Macro Editor dialog. In this case, you'll see an error message appear at the bottom of the dialog. The designer will need to correct the error before saving his macros.

Runtime Errors

A runtime error occurs when a running macro attempts to access a variable or object that doesn't exist, set a property on something that is not an object, and so on. These types of errors are automatically caught by only in Internet Explorer 5 and better. In this browser, the spreadsheet creates an error object as the macro's return value. This error object is returned to whatever called the macro in the first place:

If the offending macro was called directly from a cell formula, the error object "bubbles up" into the cell and is displayed as a [USER_FUNC!] error. Moving the mouse over the cell displays a ToolTip containing a more detailed error message.

If the offending macro is the special init( ) macro, the error object is converted into an error dialog displayed to the designer.

If the offending macro was called by another macro, the error object is simply returned to the calling macro, which is responsible for taking the correct action.

IMPORTANT: The error-handling described above only applies to Internet Explorer 5 and better. In other supported browsers, any runtime error in a macro will immediately be sent to the default browser error handler. In some browsers, this will result in an error dialog displayed to the designer. In other browsers, it may display an error message in the status bar. In either case, it is likely that the entire application (not just his macro) will stop functioning. The point here is that it is extremely important to test macro applications in all target browsers.

In addition to errors generated by macros, the built-in spreadsheet functions also sometimes return error objects. This usually occurs when the arguments the designer passes to the function do not match the function's expected arguments. If his macro calls a built-in function and there is a change the arguments will not be correct, the designer should test the return value for an error object (see the next section).

Error Objects and How to Recognize Them

An error object is a simple JavaScript object with two properties:

error—A short label for the error message (like "[USER_FUNC]").

tooltip—A more descriptive error message. If the error is allowed to bubble up into a cell, this message becomes the cell's ToolTip.

As described above, an error object is returned when:

1. An executing macro generates a runtime error in IE5 or better.

2. A built-in function encounters invalid arguments or another special condition.

3. A macro explicitly returns an error object using call.err( ).

A macro can easily test a value to determine if it is an error object. To do so, use the built-in spreadsheet function iserror( ), which returns true if its argument is an error object. Here is an example:

```
var result=aSpecialMacro(10, 4);
if (call.iserror(result))
    return result;
else
    // more code . . .
```

Error Bubbling

All built-in spreadsheet functions are designed to bubble up an error object. In other words, if a built-in function is passed an error object in one of its arguments, that function will immediately return the same error object. In this way, an error somewhere in a cell formula will always bubble up into the cell itself, where it is displayed to the designer.

A well-behaved macro will do the same. If there is any chance that a macro's arguments might contain an error object, that macro should take the time to test for this case and return the error object if found. Here is a sample macro that tests all its arguments using the predefined JavaScript "arguments" object and bubbles up any error that is present:

```
function smartAboutErrors(arg1, arg2) {
    for (var i=0; i < arguments.length; i++)
        if (call.iserror( arguments[i] ) )
            return arguments[i];
    // more code . . .
}
```

If his macro doesn't do something like this, and it uses an error object as if it were a number, string, or something else, it will likely get strange results. For example, attempting to use an object in an arithmetic operation will return the JavaScript "NaN" (not a number) value.

Generating Custom Errors

Just like built-in functions, his macro may need to return its own error object if it encounters something unusual (for example, if it expects two arguments but only gets one). To do this, use the built-in err( ) function, which returns a new error object:

call.err(errorType,errorDesc)

errorType is a string containing a short error label
errorDesc is a more descriptive error message Using the iserror( ) and err( ) functions, macros can easily communicate errors to each other and to spreadsheet cells.

Passing Ranges into Macros

We've already seen how to pass a single cell value from a cell formula into a macro:

---
=someMacro( E3 )
---

But what if we want to pass an entire range of cell values? The answer is the same as for built-in functions: simply pass a range reference:

---
=someMacro( E3:F7 )
---

Each individual cell value in the range becomes one argument passed into the macro function. Two-dimensional ranges (those that span more than one row and more than one column) are converted to arguments starting with the upper-left cell and continuing in left-to-right reading order.

A macro designed to take a range as input could be defined with many named arguments. However, this technique won't allow the designer to pass in ranges of arbitrary size, because the designer might pass in a range with more values than there are named arguments. Instead, the best way to handle a range is to loop over the predefined arguments object, which is an array containing all the arguments passed into the function. For example, the following macro returns the sum of all the values in a range, regardless of the range's size:

```
// sums all the values in a range of arbitrary size
function sumRange( ) {
  var total = 0;
  // check for an empty range
  if (arguments.length == 0)
    return call.err( "[ERROR]", "empty range!" );
  // add 'em up!
  for (var i=0; i < arguments.length; i++)
    total += arguments[i];
  return total;
}
```

Invoking Macros from Cell Formulas

There are several ways to invoke a macro, one of which is to call the macro from a cell formula. Although this technique seems natural, it does have a few subtleties. The most important issue is the timing of when the macro is executed.

Simply put, a macro in a cell formula is executed each time that cell is recalculated. In general, a cell is recalculated when:

1. a cell that is referenced in the cell formula changes.
2. the designer changes the cell formula (spreadsheet mode only, not calculator mode).
3. the spreadsheet loads (only for formulas that contain certain functions).

When a cell needs to be recalculated, it is not usually processed immediately. Instead, it is put in a queue and recalculated as soon as possible.

Thus, if a macro is referenced in a formula, a designer can't always predict when that macro will execute, or how often. For a custom function that just computes a value, this is probably irrelevant. But for a more wide-ranging macro that, for example, rewrites the contents of other cells, this can be a problem. If the designer includes such a macro in a formula, he will want to consider the implications carefully.

Sometimes, however, this situation works to the designer's advantage. For example, say the designer wants to call a macro every time the designer edits the value in a particular cell. To do so, just put a formula into another cell that references the "input" cell:

---
=handleUserInput( A3 )
---

In this scenario, every time the value in cell A3 changes, the handlerUserInput macro is called and passed the value in A3.

The built-in if( ) function provides another way to control when a macro in a formula executes. Consider the following:

---
=if( B1=0, '', doSomethingCool( ) )
---

Assume that cell B1 starts with a value of zero. In this case, the cell displays nothing (actually an empty string). No matter how many times our cell is recalculated, nothing will happen. But as soon as the value of B1 changes to something else (such as 1), the cell will call the doSomethingCool( ) macro. The value of B1 changes when it is edited by the designer, or another macro could set its value using setcell( ). After doSomethingCool( ) executes, it should probably set the value of B1 back to zero, lest it inadvertently execute again.

Web functions are the built-in functions that call out to the network, or the Internet, to return a value. For example, the quote( ) function looks up a stock quote by accessing an internet stock server. Because these functions take time to look up their information from the network, they cannot immediately return a final value. Instead, when first called, these functions deliberately return an error object that contains a "[loading]" message. After the real data arrives, the cell is recalculated and the web function now returns the desired value.

This works in cells, but not so well in macros. Calling quote( ) directly from a macro will result in an error object, not the stock quote the designer wants.

The designer gets data from a web function into a macro by putting the web function into a cell along with a macro:

---
=handleQuote( quote('msft') )
---

A cell with this formula will be recalculated when the spreadsheet opens. At this point the quote( ) function will return an error object with the "[loading]" message, which will become the sole argument to our handleQuote( ) macro.

Later, when the stock quote information arrives, the cell will recalculate again, this time passing the current value of Microsoft's stock to handleQuote( ).

Our macro, then, needs to understand that it will be called multiple times, initially passed an error object and later (hopefully) the real value. Here is an example macro designed to do this gracefully:

```
// handles the return value of the quote
// function called in a cell
function handleQuote( input ) {
  if(call.iserror( input ) ) {
    // first, check if we're getting
    // the "loading" message
    if ( input.error == "[loading]" )
      return ''; // displays nothing in the cell
    // unknown error - just pass it along
    return input;
  }
  // if we're here, we know input is not an error,
  // so we should have the quote
  doSomething( input );
  return '';
}
```

Figure 14C:
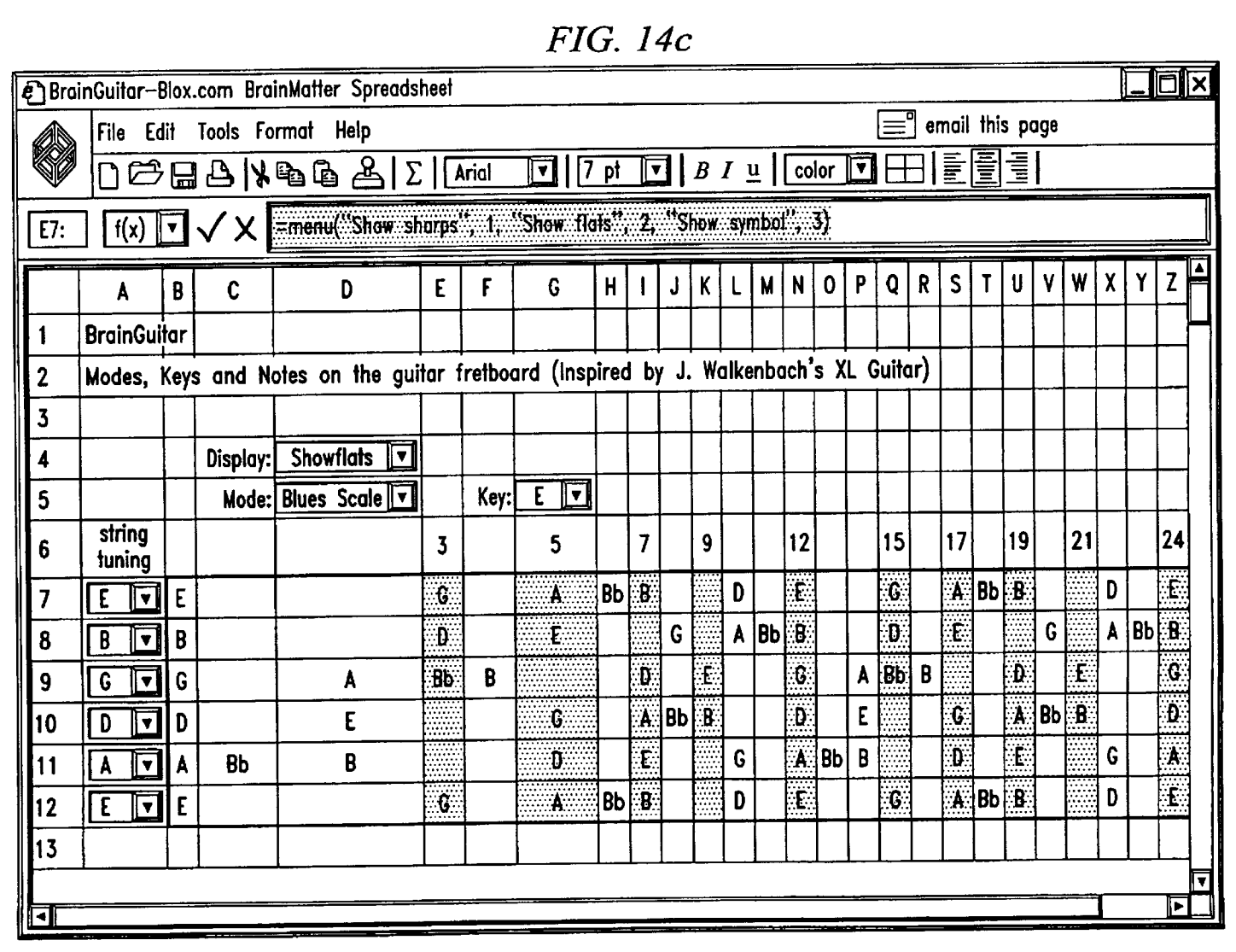

FIG. 14(c) shows an example spreadsheet created and viewed in accordance with the present invention. In the example, cell 4D has an associated menu macro that displays a drop down menu.

Figure 14D:
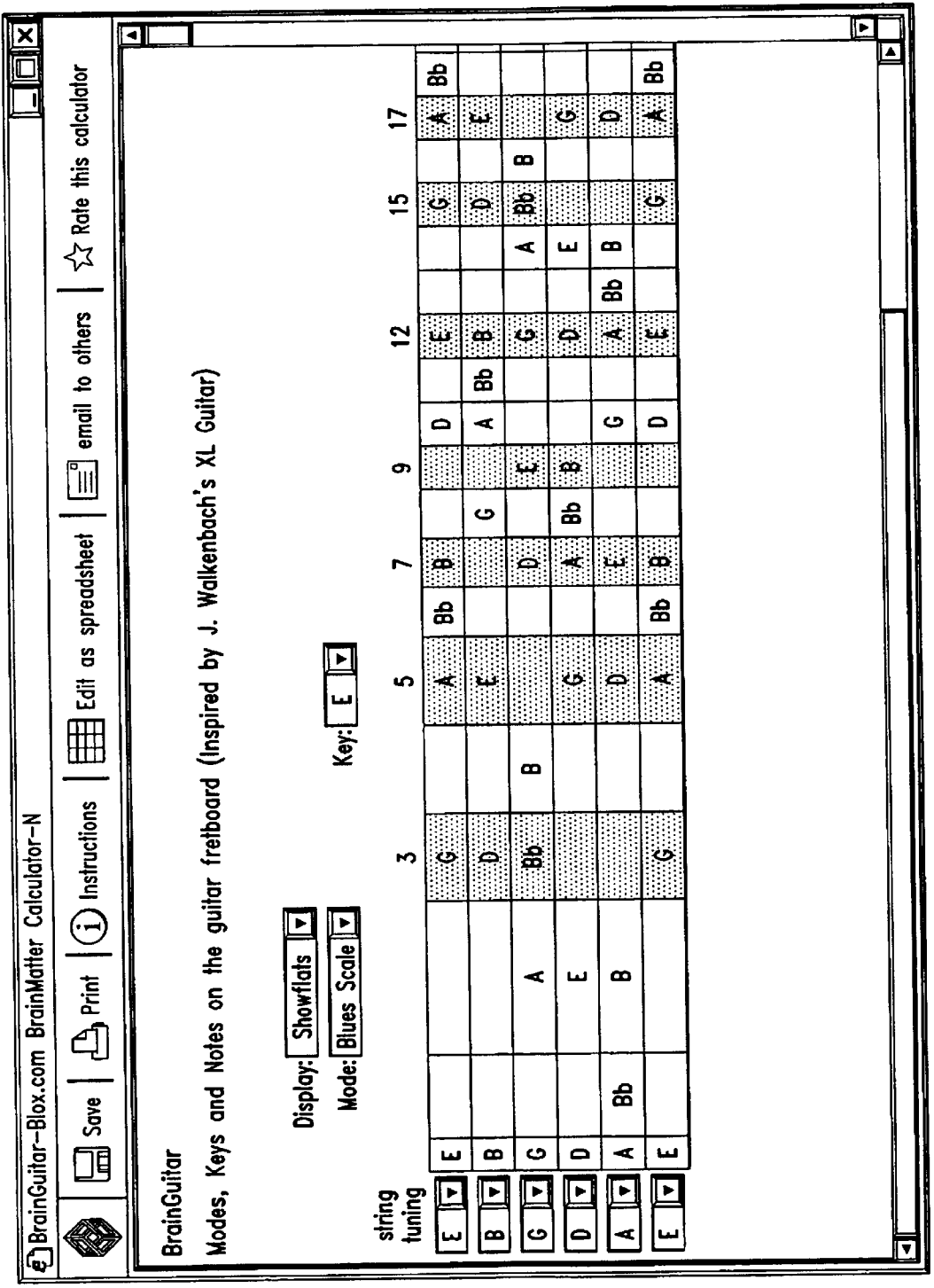

FIG. 14(d) shows an example spreadsheet in calculator mode. In calculator mode, the grid is not displayed and the user is not able to alter the formulas associated with the cells. The spreadsheet is used in a fill-in-the-blank mode. The designer requests calculator mode by clicking on a link having a calculator parameter so that the server sends a web page having calculator functionality.

5. OPENING AND CLOSING FILES

Opening Files from the My Files Page

Figure 16C:
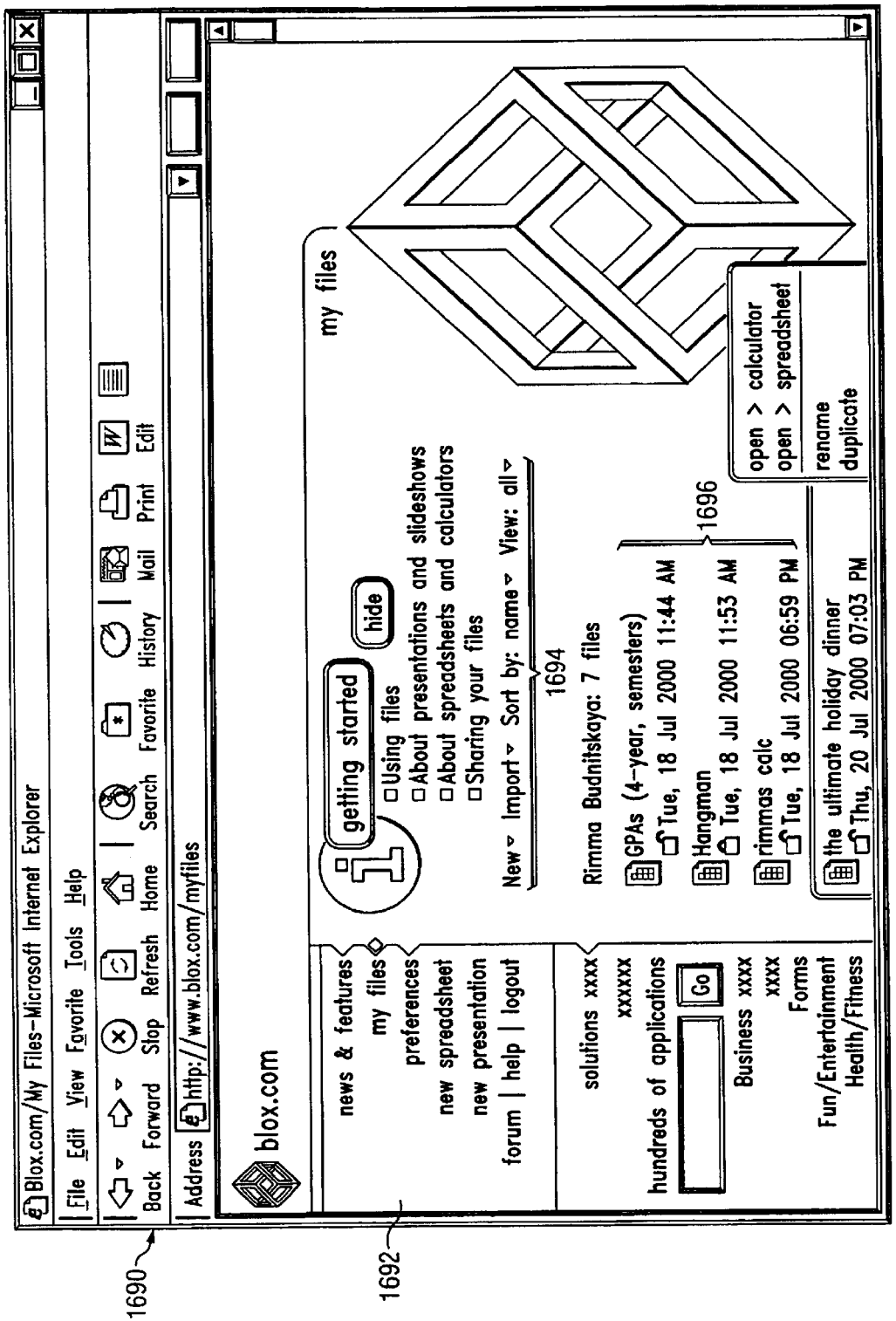
FIG. 16(c) shows a "My Files" page containing saved files.

When the user initially accesses the system of the described embodiment from his web browser, the user will typically navigate to his My Files section of the web site (FIG. 16(c)). My Files is where each member accesses and manages his files. The described embodiment.com is a secure, password protected web set—so all of his files are, by default, protected from outside access from within his account. The designer has the option of making any file a "public" file, so that the user can share it with others. Files are individually made public or kept private, so the user can share some, while keeping others protected.

To open a file, simply highlight the file by clicking on it. Then click on the "Open>Spreadsheet" command to open the file in Design Mode, or choose the "Open>Calculator" command to open the file as a fill-in-the-blanks Calculator.

Opening Files from a Spreadsheet

To open files from within a spreadsheet, select the Open command from the FILE menu. Highlight the file of interest and click once more, or click "Open>spreadsheet" or "Open>calculator" from the command list.

Closing Spreadsheets

To close a file, choose the Close command from the FILE menu, or click the close box in the upper right hand corner of the browser window. If the user has not saved the file recently, the user will be prompted to save changes before the user exits his session.

CREATING NEW FILES

To create a new file from within the web site My Files page, simply choose the "New Spreadsheet" link from the column of commands on the left side of the My Files interface. This will automatically open a new document in Spreadsheet Mode. The spreadsheet will open in the default dimensions. Its size can always be changed later with the Set Size and Insert/Delete Rows or Columns commands.

The designer can also create a new spreadsheet from within by choosing the New command from the FILE menu.

SAVING FILES

The Save and Save As . . . commands, which are accessed from the FILE menu, let the designer save the file the designer is currently working on. Save will overwrite the last saved version of the file, where Save As . . . renames the current file and saves it (under the new name) on the Server.

6. Gallery

Figure 15:
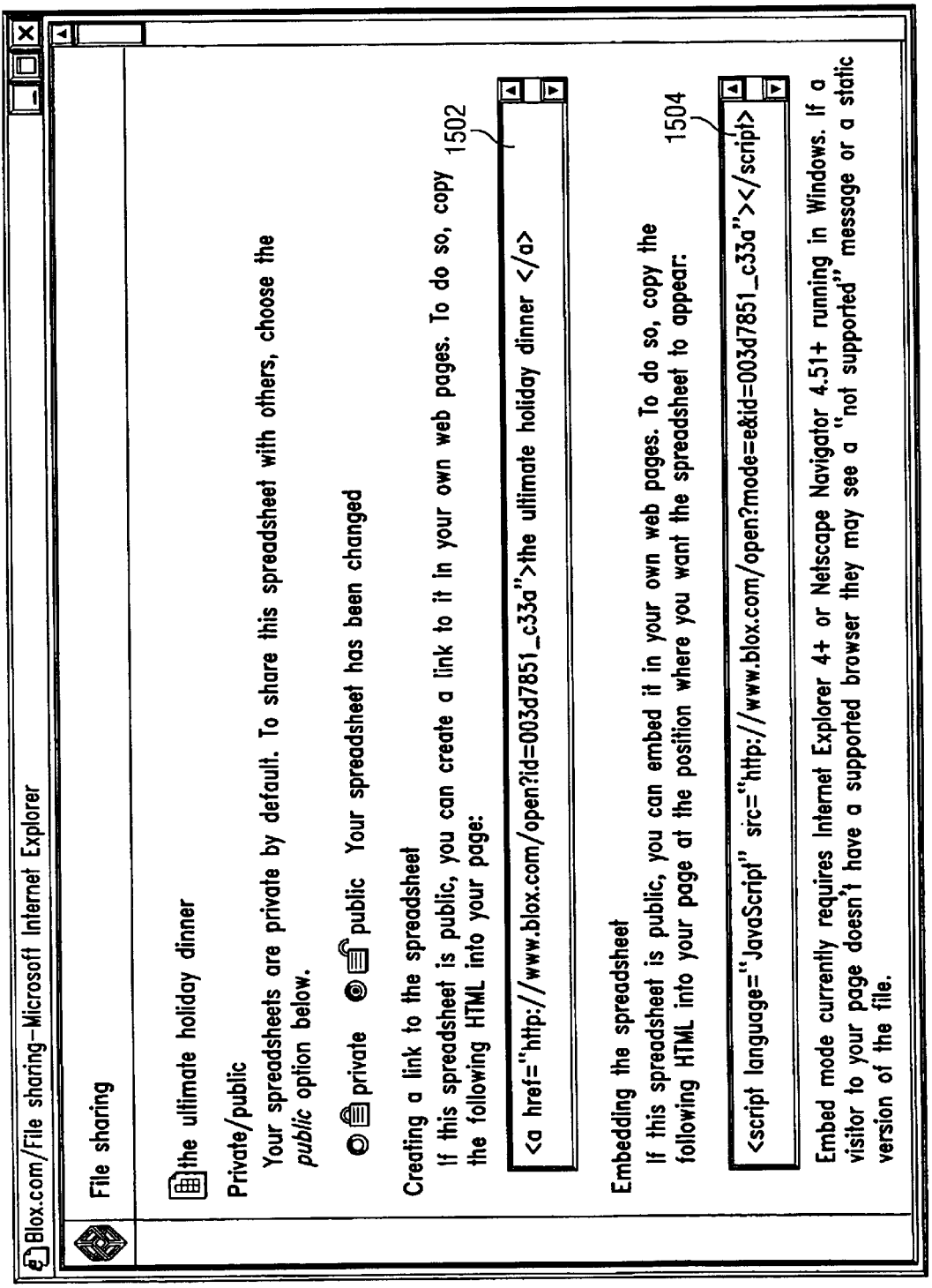
FIG. 15 shows a process of allowing a web page user to embed a spreadsheet in any web page.

FIG. 15 shows a process of allowing a web page user to embed a spreadsheet in any web page. If a user has a personal web site, he can include one of his spreadsheets directly into his web site. To embed a spreadsheet into a web page in the described embodiment, the user has to make the spreadsheet publicly accessible and go to a "My Files" page (see FIG. 116(c)). Then, the user highlights the file he wants to embed and selects the "Sharing" command from the Action Panel on the right side of the screen. Performing this step will open a dialog box with the appropriate code 1504:
<script language="JavaScript"src=http://www.blox.com/open?mode=e&id=003d785a c33a></s cript>

Code 1504 includes a DataID parameter and a mode parameter for the embedded spreadsheet. The user has to copy this code 1504 to the clipboard and then paste the code into his web page's HTML at the location he wants the spreadsheet to appear. In the Sharing dialog, the user first needs to set his file to Public. Embedding the spreadsheet advantageously allows the spreadsheet file to be viewed within the user's own web page. When a web page designer embeds a spreadsheet on a web page, he is actually adding code 1504 to an HTML page that requests that spreadsheet from the server 104. When this code is downloaded to someone's web browser from server 104, the browser makes a request to the server 104 to display the spreadsheet of interest. Server 104 then returns the appropriate Dynamic HTML code for the spreadsheet to that web browser. As discussed above, the embedded HTML page does not include HTML script tags, unlike spreadsheet HTML and calculator HTML. The embedded HTML page includes means to dynamically return the HTML content. These means are "JavaScript include tags." The JavaScript include tags return dynamically created JavaScript reflecting the current change in the spreadsheet or spreadsheet file. The embedded spreadsheet is a fully formed spreadsheet web page that looks identical to the non-embedded spreadsheet web page.

An embedded web-based spreadsheet treats real-time data differently than does a regular spreadsheet or calculator. If a request sent to server 104 is for a calculator or a spreadsheet, as specified by the mode parameter in the request, server 104 sends an entire web page including functionality to request real-time data. In contrast, if a request is for an embedded calculator (or an embedded spreadsheet), as specified by the mode parameter in the request, server 104 sends spreadsheet HTML that reloads the whole spreadsheet in order to update real-time data.

FIG. 16(a) is a flow chart showing a log-in process. The process starts in element 1600 and determines whether the user is a private user, in element 1602. The user has the option of making any individual file a "public" file, so that he can share it with others (see FIG. 15). A private user can only view private files if he has logged into the account where the file is listed. If the user is a private user, the process determines whether the user is a member, in element 1604. At this point, the user's name and password are posted to the server. The server 104 reviews these parameters and verifies that the user has an account with the system, i.e., the user is a member. If the user is not a member, an ERROR message is returned in element 1608, and the user is prompted to sign up with the system, in element 1618. In the alternative, if the user is a member, as determined from member file 126, the system determines, in element 1606, whether the user is the owner of the file he would like to work with. Every Spreadsheet data file 122 contains at least one member ID. If the user ID matches the member ID in the Spreadsheet data file 122, the user is the file owner. If the user is a file owner, the system allows the user to view that file, in element 1612, and the process ends in 1614. Similarly, if the user is a public user who has the URL of the file and wants to be able to view the file outside the private user's personal account, the system allows the public user to view that file, in element 1612.

If the member is not a file owner, an ERROR message is returned in element 1610 and the user is prompted to work with that particular file as not a file owner, in element 1616. If the user is a public user (he has the URL of the file and wants to be able to view the file outside the private user's personal account) he can view that file, in element 1612.

FIG. 16(*b*) is a flow chart showing a process of saving data into "My Files." The Save and Save As commands, which are accessed from the FILE menu, allow a spreadsheet designer to save the file he is currently working with. Save will overwrite the last saved version of the file, where Save As renames the current file and saves it (under a new name). The process starts in element 1652. In element 1654, the process determines whether spreadsheet designer changed editability. If the designer changed editability, the editability flag is changed from "FALSE" to "TRUE" in client-side Data Array 114, in element 1656. If designer changed the cell's content in a spreadsheet, in element 1658, data content is changed in the Data Array 114, in element 1660. If the designer indicates that he wants to save new data, in element 1662, the server 104 receives a "post" in the form of new data in client-side format, from the browser, in element 1664. In element 1666, the server determines whether the designer is a member who has an account with the system in accordance with member file 126. If the user is a member, the process determines, in element 1668, whether the user is the owner of the file he is working with. In the alternative, if the user is not a member, in element 1622 the user is prompted to register and become a member. If the member is the owner of the file he is working with, the process prompts the user to save the information in place of the original file, in element 1670. In the alternative, if the user is not the owner of the file, he is prompted to save the file, in element 1674. The process then saves information about each cell, including all attributes, such as format, borders, editability, and cell dependency as well as row height and column width into a non-owner account in element 1676. The process ends in element 1678.

FIG. 16(*c*) shows a "My Files" page listing saved files. The "My Files" page 1690 is a user's personal file manager where each member accesses and manages his files. To access the files from the "My Files" page 1690, the user has to enter his name and password. The user has the option of making any individual file a "public" file, so that he can share it with others. The upper left panel 1692 of the page lets the user navigate between different major areas of the site. The middle area 1694 of the page displays the user's list of files. The menu bar 1696 directly above the list of files allows the user to create new files, import files and images, sort the list of files, and view the files according to their type.

Figure 18:
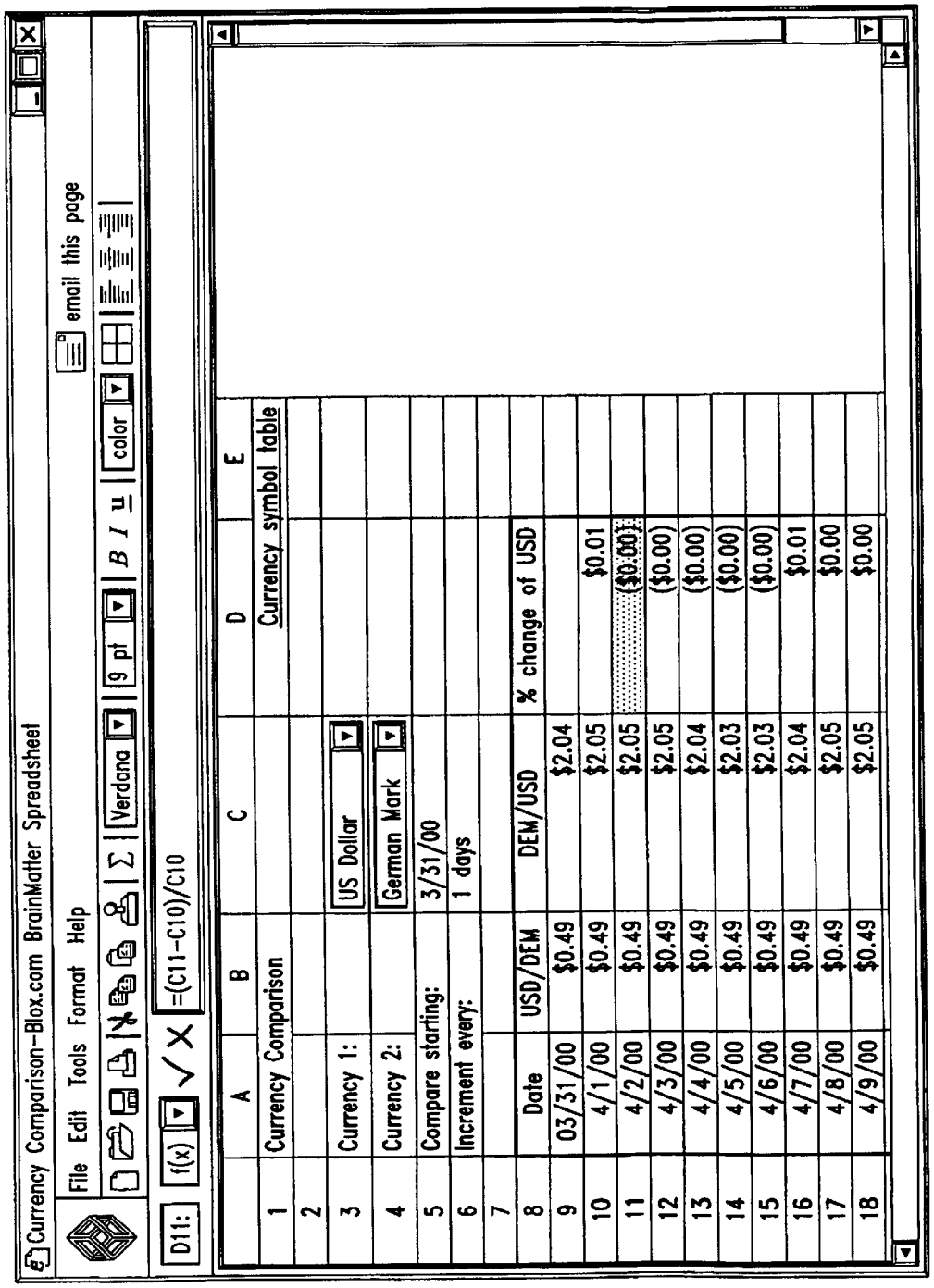
FIG. 18 shows an example of a web-based spreadsheet containing real-time data.

FIG. 18 shows an example of a web-based spreadsheet containing real-time data. The HTML page, including Javascript, to generate this spreadsheet is shown in Table 8.

In summary, the described embodiment of the present invention implements a web-based spreadsheet. The described embodiment is implemented in Javascript. The web-based spreadsheet includes web data, including links and images from the web and real-time data, including stock quotes and currency conversion information.

In the described embodiment, the data for the spreadsheets are stored in each user's directory or in a gallery on a server and people in the community are allowed to access each other's spreadsheets. A spreadsheet can be emailed and/or embedded in another web page.

While the invention has been described in conjunction with a specific embodiment, it is evident that many alternatives, modifications and variations will be apparent to those skilled in the art in light of the foregoing description. Accordingly, the present invention is intended to embrace all such alternatives, modifications and variations as fall within the spirit and scope of the appended claims and equivalents.

TABLE 1

```
<html>
    <head>
        <TITLE>the ultimate holiday dinner - Blox.com
        Spreadsheet</TITLE>
<link rel="stylesheet" type="text/css"
href="/css/static/design_mode_ie_
9ea8340.cssx"/><link rel="stylesheet"
type="text/css" href="/css/spreadsheet_ie4_630ddc74.cssx"/>
<style type="text/css">
/* /home/www/template/static/design_mode_ie.style.tpl */
<style>
        <script language="JavaScript">
            var kTotalJSIncludes = 14;
            var gNumJSIncludesLoaded = 0;
            function JSIncludeDoneLoading( )
            {
              gNumJSIncludesLoaded++;
              includeModalProgressWidget.style.width=
(gNumJSIncludesLoaded/kTotalJSIncludes)*250;
            }
        <script>
                <script language="JavaScript">
                    function WindowIsValid(wnd) {
                        try {
                            var x = wnd.name;
                        }
                        catch (error) {
                            return 0;
                        }
                        return 1;
                    }
                    function SafeEval(str) {
                        try {
                            eval( str );
                        }
                        catch (error) {
                            return error.description?
error.description: "unknown error";
                        }
                        return 0;
                    }
                </script>
</head>
        <body class="body" scroll="no" oncontextmenu='if
        ((!window.event.ctrlKey)
&& (window.event.srcElement.id != "entry")) return false'
onLoad="loadDocument( )"
onBeforeUnload="if(typeof unloadDocument !=
'undefined')unloadDocument( )"
onUnload="if(typeof unloadDocument != 'undefined')unloadDocument( )"
```

TABLE 1-continued

```
onResize="resizeDocument( )">
    <span class='view' id='view' style="width: 100%; height:
100%;">
        <!-- later write the contents of this span -->
    </span>
    <script language="JavaScript">
        var content = '<div class="modalLabel">Please wait a moment
(the first time the user use this may take a little longer).</div>'
        +'<div class="modalProgressBar">'
        +'<div id="includeModalProgressWidget"
class="modalProgressWidget" style="visibility: visible;">'
        +'</div></div>';
        var progressDialog='<table id="includeProgressDialog"
width="100%" height="100%">'
        +'<tr valign="middle"><td align="center"><div class="modal"
STYLE="visibility:visible; position:static;">'
        +'<table border="0" width="225" cellspacing="0"
cellpadding="0">'
        +'<tr valign="middle">'
        +'<td bgcolor="#ffcc00"><div
class="modalTopLeftBox"></div></td>'
        +'<td bgcolor="#ffe57d" nowrap><span
class="modalTitle">Loading </span></td>'
        +'</tr>'
        +'<tr>'
        +'<td bgcolor="#ffe57d"><br></td>'
        +'<td><div class="modalContent">' + content + '</div><div
id="modalBottomBar" style="height: 10px; overflow:
hidden"><BR></div></td>'
        +'</tr>'
        +'</table>'
        +'</div></tr></td></table>';
        document.write(progressDialog);
    </script>
    <script language="JavaScript">
        // global mode flag (can be "design", "view", or "embed")
        var kMode = "design";
        var gInitDirtyCells =" ";
        var gCellElemMatrix; //2-D array of the cell elements, use like:
gCellElemMatrix[row][column]
        var gRowCount, gColumnCount, gOwnerId=0,
gAppId=",gAppDescription=";
        var gImported = 0;
        var gAppVersion = 1.0;
        var gAppAuthor = 'ss'
        var gMacroText = ";
        var gPartnerMenu = null;
        var gPopupMenu = null;
        var kDomain = "blox.com";
        var kRootUrl "http://www.blox.com/";
        var gIsMatterhorn = false;
        var gSaveScript = "savebraincell";
        var gSaveLifeboat = "lifeboat";
        //
gColumnCount = 6;gRowCount = 24;
        function GetColumnWidthsAndHeights(widths, heights)
        {
            //
widths[1] = 399;
widths[2] = 84;
widths[3] = 73;
heights[2] = 19;
heights[3] = 19;
heights[4] = 19;
heights[5] = 19;
heights[6] = 19;
heights[7] = 31;
heights[8] = 19;
heights[9] = 19;
heights[10] = 19;
heights[11] = 19;
heights[12] = 19;
heights[13] = 19;
heights[14] = 19;
heights[15] = 19;
heights[16] = 19;
heights[17] = 19;
heights[18] = 19;
heights[19] = 19;
heights[20] = 31;
heights[21] = 19;
heights[22] = 19;
heights[23] = 19;
        }
        // after this comment, we add //init cells
gAppId='003d7851__c33a';
gOwnerId='003d76ac__435d';
gAppDescription='the ultimate holiday dinner';
var gCellDataArray=[{entry:'Make the Ultimate Holiday
Dinner',viewSize:'12pt',foreColor:'navy',viewFamily:'Verdana',
__fontWeight:'bold',__wrap
Text:'true',__textAlign:'left',m__row:1,m__col:1,i__nr:'Make the
Ultimate Holiday Dinner'},
{viewSize:'9pt',foreColor:'navy',viewFamily:'Verdana',
__wrapText:'true',__textAlign:'left',
m__row:2,m__col:1},
{entry:'How many total guests are you
having?',locked:'false',viewSize'9pt',foreColor:'navy',
viewFamily:'Verdana',__wrapText:'t
rue',__textAlign:'left',m__row:3,m__col:1,i__nr:
'How many total guests are you having?'},
{entry:'12',dynamic:'12',derived:'12',
i__tb:'[e[13][2],e[14][2],e[19][2],e[15][2],e[17][2],
e[21][2],e[23][2]]',locked:'false',viewSize:
'9pt',__widthClue:'80',foreColor:'maroon',__textAlign:'right',
m__row:3,m__col:2,i__nr:'12'},
{locked:'false',viewSize:'9pt',foreColor:'navy',viewFamily:'Verdana',
__wrapText:'true',__textAlign:'left',m__row:4,m__col:1},
{foreColor:'maroon',viewSize:'9pt',__textAlign:'right',m__row:4,
m__col:2},
{entry:'How many vegetarians?',
locked:'false',viewSize:'9pt',foreColor:'navy',viewFamily:'Verdana',
__wrapText:'true',__textAlign:'left',m__row:5 m__col:1,
i__nr:'How many vegetarians?'},
{entry:'2',dynamic:'2',derived:'2',
i__tb:'[e[13][2]]',locked:'false',viewSize:'9pt',__widthClue:'80',
foreColor:'maroon',__textAlign:'right',m__row:5,
m__col:2,i__nr:'2'},
{locked:'true',viewSize:'9pt',foreColor:'navy',viewFamily:'Verdana',
__wrapText:'true',__text
Align:'left',m__row:6 m__col:1},
{foreColor:'maroon',viewSize:'9pt',__textAlign:'right',
m__row:6,m__col:2},
{entry:'Traditional Holiday Dinner, or something a little more unusual?
(Traditional, Alternate or
Economy)',locked:'true',viewSize:'9pt',foreColor:'navy',viewFamily:
'Verdana',__wrapText:
'true',__textAlign:'left',m__row 7,m__col:1,i__nr:
'Traditional Holiday Dinner, or something a
little more unusual? (Traditional, Alternate or Economy)'},
{entry:'=menu("Traditional","traditional","Alternate","Alternate",
"Economy","economy")',dynamic:'__menu("r7c2s0",
\'Traditional\',\'traditional\',\'Alternate\',\'Alternate\',
\'Economy\',\'economy\')',derived:'traditional',
i__tb:'[e[14][1],e[17][1],e[19][1],e[21][1],e[23][1],
e[13][2],e[13][3],e[17][3],e[17][2],e[11][1],
e[20][1],e[13][1]]',m__cellGUI:'{type:\'menu\',setting:0,
label:\'Traditional\'}',locked:'true',viewSize:'9pt',m__dirtyOnInit:'true',
foreColor:'maroon',__textAlign:'left',
m__row:7,m__col:2,i__nr:'Traditional'},
{locked:'true',viewSize:'9pt',foreColor:'navy',
viewFamily:'Verdana',__wrapText:'true',
__textAlign:'left',m__row:8,m__col:1},
{locked:'true',m__row:8,m__col:2},
{entry:'Here\'s what the user can whip up in his
kitchen:',locked:'false',viewSize:'9pt',foreColor'navy',viewFamily:
'Verdana',__wrapText:'true',__textAlign:'left',m__row:9,m__col:1,
i__nr:'Here\'s what the user can whip up in his kitchen:'},
{viewSize:'9pt',foreColor:'navy',
viewFamily:'Verdana',__wrapText:'true',
__textAlign:'left',m__row:10,m__col:1},
{entry:'A traditional Holiday
Feast',locked:'false',viewSize:'9pt',foreColor:'navy',viewFamily:
'Verdana',__fontWeight:'bold',__wrapText:'true',__textAlign:'left',
m__row:11,m__col:1,i__nr:'A traditional Holiday Feast'},
{__borderBottom:'solid black
1pt',viewSize:'9pt',foreColor:'navy',viewFamily:'Verdana',__wrapText:
'true',__textAlign:'left',m__row:12,m__col:1},
```

TABLE 1-continued

{__borderBottom:'solid black 1pt',viewSize:'9pt',__textAlign:
'right',m__row:12,m__col:2},
{textAlign:'left',__borderBottom:'solid black 1pt',
viewSize:'9pt',m__row:12,m__col:3},
{entry:'=IF( B7 ="Traditional","Roast Turkey",IF( $B$7 =
"Alternate","Cornish Game Hens",IF( $B$7 ="Economy","Chicken
Parmesan"," ")))',dynamic:'(__eqr(__cel( \'r7c2s0\' ),
\'Traditional\')?\'Roast
Turkey\':(__eqr(__cel( \'r7c2s0\' ),
\'Alternate\')?\'Cornish Game Hens\':(__eqr(__cel(
    \'r7c2s0\' ),\'Economy\')?\'Chicken Parmesan\':\'\')))',
derived:'Roast Turkey',
i__tb:'[e[15][1]]',
i__rt:'[e[7][2]]',locked:'false',viewSize:'9pt',foreColor:'navy',
viewFamily:'Verdana',__fontWeight:'bold',__wrapText:'true',
__textAlign:'left',m__row:13,m__col:1,i__nr:'Roast Turkey'},
{entry:'12.5',dynamic:'12.5',derived:'12.5',locked:'false',viewSize:'9pt',
__widthClue:'80',___textAlign:'right',m__row:13,m__col:2,
i__nr:'12.5'},
{entry:'=IF( $B$7 ="Traditional","pounds",
IF( $B$7 ="Alternate","hens",IF(
    $B$7 ="Economy","pieces"," ")))',dynamic:
'(__eqr(__cel( \'r7c2s0\'
),\'Traditional\')?\'pounds\':(__eqr(__cel( \'r7c2s0\'
),\'Alternate\')?\'hens\':(__eqr(__cel( \'r7c2s0\'
),\'Economy\')?\'pieces\':\'\')))',derived:'pounds',
i__rt:'[e[7][2]]',textAlign:'left',locked:'false',viewSize:'9pt',
m__row:13,m__col:3,i__nr:'pounds'},
{entry:'=IF( $B$7 ="Traditional","Bread Stuffing",
IF( $B$7 ="Alternate","Corn
Bread",IF( $B$7 ="Economy","Garlic Breadsticks"," ")))',
dynamic:'(__eqr(__cel(
    \'r7c2s0\' ),\'Traditional\')?\'Bread Stuffing\':
(__eqr(__cel( \'r7c2s0\'
),\'Alternate\')?\'Corn Bread\':
(__eqr(__cel( \'r7c2s0\'
),\'Economy\')?\'Garlic Breadsticks\':\'\')))',derived:
'Bread Stuffing',
i__tb:'[e[14][2],e[14][3]]',
i__rt:'[e[7][2]]',viewSize:'9pt',foreColor:'navy',
viewFamily:'Verdana',__fontWeight:'bold',__wrapText:'true',
__textAlign:'left',m__row:14,m__col:1,i__nr:'Bread Stuffing'},
{entry:'=IF( A14 ="Garlic Breadsticks", B3 *2,
if( A14 =" "," ", B3
))',dynamic:'(__eqr(__cel( \'r14c1s0\' ),
\'Garlic Breadsticks\')?__mul(__cel(
    \'r3c2s0\' ),2):(__eqr(__cel( \'r14c1s0\' ),
\'\')?\'\':__cel( \'r3c2s0\'
)))',derived:'12',
i__rt:'[e[14][1],e[3][2]]',locked:'false',viewFormat:'number',viewSize:
'9pt',__widthClue'80',
__textAlign:'right',m__row:14,m__col:2,i__nr:'12'},
{entry:'=IF( A14 ="Bread Stuffing","cups",if( A14
=" "," ","pieces"))',dynamic:'(__eqr(__cel(
    \'r14c1s0\' ),\'Bread
Stuffing\')?\'cups\':(__eqr(__cel(\'r14c1s0\' ),
\'\')?\'\':\'pieces\'))',derived:'cups',
i__rt:'[e[14][1]]',textAlign:'left',locked:'false',
viewSize:'9pt',m__row:14,m__col:3,i__nr:'cups'},
{entry:'=if( A13 =" "," ","Soup")',
dynamic:'(__eqr(__cel(\'r13c1s0\'
),\'\')?\'\':\'Soup\')',derived:'Soup',
i__tb:'[e[16][1],e[15][2],e[15][3]]',
i__rt:'[e[13][1]]',viewSize:'9pt',foreColor:'navy',
viewFamily:'Verdana',__fontWeight:'bold',
__wrapText:'true',__textAlign:'left',m__row:15,
m__col:1,i__nr:'Soup'},
{entry:'12',dynamic:'12',derived:'12',locked:'false',viewSize:'9pt',
__widthClue:'80',__textAlign:'right',m__row:15,
m__col:2,i__nr:'12'},
{entry:'=if( A15 =" "," ","cups")',
dynamic:'(__eqr(__cel(\'r15c1s0\'
),\'\')?\'\':\'cups\')',derived:'cups',
i__rt:'[e[15][1]]',textAlign:'left',viewSize:'9pt',
m__row:15,m__col:3,i__nr:'cups'},
{entry:'=if( A15 =" "," ","- try a simple
corn chowder or spicy bean soup")',dynamic:'(__eqr(__cel( \'r15c1s0\'
),\'\')?\'\':\'V:\'- try a simple corn chowder or
spicy bean soup\')',derived:'- try a simple corn chowder or spicy bean
soup',
i__rt :'[e[15][1]]',viewSize:'9pt',foreColor:'navy',viewFamily:'Verdana',
__wrapText:'true',__textAlign:'left',m__row:16,
m__col:1,i__nr:'- try a simple corn chowder or spicy bean soup'},
{entry:'=IF( $B$7 ="Traditional","Side of Vegetables",IF( $B$7
="Alternate","Stuffed Mushrooms",IF( $B$7 ="Economy",
"Side of Vegetables"," ")))',
dynamic:'(__eqr(__cel( \'r7c2s0\' ),
\'Traditional\')?\'Side of
Vegetables\':(__eqr(__cel( \'r7c2s0\' ),
\'Alternate\')?\'Stuffed
Mushrooms\':(__eqr(__cel( \'r7c2s0\'
),\'Economy\')?\'Side of
Vegetables\':\'\')))',derived:'Side of Vegetables',
i__tb:'[e[17][3],e[18][1],e[17][2]]',
i__rt:'[e[7][2]]',viewSize:'9pt',foreColor:'navy',viewFamily:'Verdana',
fontWeight:'bold',__wrapText:'true',textAlign:'left',m__row:17,
m__col:1,i__nr:'Side of Vegetables'},
{entry:'=IF( B7 ="Alternate",3* B3 ,
if( A17 =" "," ",1* B3
))',dynamic:'(__eqr(__cel( \'r7c2s0\' ),
\'Alternate\')?__mul(3,__cel(
    \'r3c2s0\' )):(__eqr(__cel( \'r17c1s0\' ),
\'\')?\'\':__mul(1,__cel( \'r3c2s0\'
))))',derived:'12',
i__rt:'[e[7][2],e[3][2],e[17][1]]',
locked:'false',viewFormat:'number',viewSize:'9pt',__widthClue:'80',
__textAlign:'right',m__row:17,m__col:2,i__nr:'12'},
{entry:'=IF( B7 ="Alternate","mushrooms",if( A17
=" "," ","cups"))',dynamic:'(__eqr(__cel(\'r7c2s0\'
),\'Alternate\')?\'mushrooms\':(__eqr(__cel( \'r17c1s0\'
),\'\')?\'\':\'cups\'))',derived:'cups',
i__rt:'[e[7][2],e[17][1]]',textAlign:'left',locked:'false',
viewSize:'9pt',m__row:17,m__col :3,i__nr:'cups'},
{entry:'=if( A17 =" "," ",'- try green beans,
squash, or a vegetable medley as well"}',
dynamic:'(__eqr(__cel( \'r17c1s0\' ),\'\')?\'\':
\'- try green beans, squash, or a vegetable medley as well\')',
derived:'- try green beans, squash, or a vegetable medley as well',
i__rt:'[e[17][1]]',viewSize:'9pt',foreColor:'navy',viewFamily:'Verdana',
__wrapText:'true',__textAlign:'left',m__row:18,m__col:1,
i__nr:'- try green beans, squash, or a vegetable medley as well'},
{locked:'false',m__row:18,m__col:3},
{entry:'=IF( $B$7 ="Traditional","Side of Potatoes",IF($B$7
="Alternate","Yams",IF( $B$7
="Economy","Yams"," ")))',
dynamic:'(__eqr(__cel( \'r7c2s0\'
),\'Traditional\')?\'Side of Potatoes\':
(__eqr(__cel( \'r7c2s0\'
),\'Alternate\')?\'Yams\':(__eqr(__cel( \'r7c2s0\'
),\'Economy\')?\'Yams\':\'\')))',derived:'Side of Potatoes',
i__tb:'[e[19][2],e[19][3],e[20][1]]',
i__rt:'[e[7][2]]',viewSize:'9pt',foreColor:'navy',viewFamily:'Verdana',
__fontWeight:'bold',__wrapText:'true',__textAlign:'left',
m__row:19,m__col:1,i__nr:'Side of Potatoes'},
{entry:'=if( A19 =" "," ", B3 /2)',
dynamic:'(__eqr(__cel( \'r19c1s0\'
),\'\')?\'\':__div(__cel( \'r3c2s0\' ),2))',
derived:'6',
i__rt:'[e[19][1],e[3][2]]',viewFormat:'number',viewSize:'9pt',
__widthClue:'80',__textAlign:'right',m__row:19,
m__col:2,i__nr:'6'},
{entry:'=if( A19 =" "," ","pounds")',
dynamic:'(__eqr(__cel( \'r19c1s0\'
),\'\')?\'\':\'pounds\')',derived:'pounds',
i__rt:'[e[19][1]]',textAlign:'left',locked:'false',
viewSize:'9pt',m__row:19,m__col:3,i__nr:'pounds'}
{entry:9=IF( B7 ="Traditional","-there\'s more than one way
to cook a potato! Try scalloped, mashed, twice-baked, or even au gratin!",
if( A19 =" "," ","- yams are
sweeter than potatoes and can be prepared just as easily, for a different
twist on the holidays!",))',dynamic:'(__eqr(__cel(
\'r7c2s0\' ),\'Traditional\')?\'- there\\\'s more
than one way to cooks potato! Try scalloped, mashed, twice-baked, or
even au gratin!\':(__eqr(__cel( \'r19c1s0\' ),
\'\')?\'\':\' - yams are sweeter than potatoes and
be prepared just as easily, for a different twist on the holidays!\'))',
derived:' - there\'s more than one way to cook a potato!
Try scalloped, mashed, twice-baked, or even au gratin!', TABLE 1-continued

```
i_rt:'[e[7][2],e[19][1]]',viewSize:'9pt',foreColor:'navy',
viewFamily:'Verdana',__wrapText:'true',__textAlign:'left',m_row:20,
m_col:1,i_nr:' - there\'s more than one way to cook a
potato! Try scalloped, mashed, twice-baked, or even au gratin!'},
{locked:'true',m_row:20,m_col:3},
{entry:'=IF(  $B$7  ="Traditional","Pumpkin Pie"," ",IF(  $B$7
="Alternate","Pecan Pie",IF(  $B$7  ="Economy","Pumpkin Pie",
" ")))',dynamic:'(_eqr(_cel(
       \'r7c2s0\'   ),\'Traditional\')?\'Pumpkin Pie\':
       (_eqr(_cel( \'r7c2s0\'
       ),\'Alternate\')?\'Pecan Pie\9:(_eqr(_cel(  \'r7c2s0\'
       ),\'Economy\')?\'Pumpkin Pie\':\'\')))',derived:'Pumpkin Pie',
i_tb:'[e[21][2],e[21][3],e[22][1]]',
i_rt:'[e[7][2]]',viewSize:'9pt',foreColor:'navy',viewFamily:'Verdana',
__fontWeight:'bold',__wrapText:'true',__textAlign:'left',m_row:21,
m_col:1,i_nr:'Pumpkin Pie'},
{entry:'=if(  A21  ="","",ROUND(  B3  /8,0))',
dynamic:'(_eqr(_cel(
       \'r21c1s0\'   ),\'\')?\'\':
       _round(_div(_cel(  \'r3c2s0\'   ),8),0))',derived:'2',
i_rt:'[e[21][1],e[3][2]]',viewFormat:'number',viewSize:'9pt',
__widthClue:'80',__textAlign:'right',m_row:21,
m_col:2,i_nr:'2'},
{entry:'=if(  A21  ="","","pies")',
dynamic:'(_eqr(_cel(   \'r21c1s0\'
       ),\'\')?\'\':\'pies\')',derived:'pies',
i_rt:'[e[21][1]]',textAlign:'left',locked:'false',
viewSize:'9pt',m_row:21,m_col:3,i_nr:'pies'},
{entry:'=if(  A21   ="",""," - or try something
different, like a Sweet Potato Pie!")',dynamic:'(_eqr(_cel(
\'r21c1s0\' ),\'\')?\'\':\' - or try
something different, like a Sweet Potato Pie!\')',derived:' - or try
something different, like a Sweet Potato Pie!',
i_rt:'[e[21][1]]',viewSize:'9pt',foreColor:'navy',
viewFamily:'Verdana',__wrapText:'true',__textAlign:'left',
m_row:22,m_col:1,i_nr:' - or try something different,
like a Sweet Potato Pie!'},
{entry:'=IF(  $B$7  ="Traditional","Hot Apple Cider",IF(  $B$7
       ="Alternate","Spiced Cranberry Cider",IF(  $B$7  ="Economy",
"Hot Apple Cider"," ")))',dynamic:'(_eqr(_cel(  \'r7c2s0\'   ),
\'Traditional\')?\'Hot Apple Cider\':
(_eqr(_cel(  \'r7c2s0\'   ),
\'Alternate\')?\'Spiced Cranberry Cider\':
(_eqr(_cel(  \'r7c2s0\'   ),\'Economy\')?\'Hot Apple
Cider\':\'\')))',derived:'Hot Apple Cider',
i_tb:'[e[23][2],e[23][3]]',
i_rt:'[e[7][2]]',__borderBottom:'solid black
1px',viewSize:'9pt',foreColor:'navy',
viewFamily:'Verdana',fontWeight:'bold',
__wrapText:'true',__textAlign:'left',m_row:23,m_col:1,
i_nr:'Apple Cider'},
{entry:'=if(  A23   ="",""  , B3   *2)',
dynamic:'(_eqr(_cel(   \'r23c1s0\'
       ),\'\')?\'\':_mul(_cel(   \'r3c2s0\'   ),2))',
       derived:'24',
i_rt:'[e[23]7[1],e[3][2]]',__borderBottom:'solid black
1px',locked:'false',viewFormat:'number',viewSize:'9pt',__widthClue:'80',
__textAlign:'right',m_row:23,m_col:2,i_nr:'24'},
{entry:'=if(  A23   ="",""  ,"cups")',
dynamic:'(_eqr(_cel(   \'r23c1s0\'
       ),\'\')?\'\':\'cups\')',derived:'cups',
       i_rt:'[e[23][1]]',textAlign:'left',__borderBottom:'solid black
1px',locked:'false',viewSize:'9pt',m_row:23,m_col:3,i_nr:'cups'}];
       var needsRebuilding=false;
       var gDerivedFrom='';
       var kSaveHostname = " ";
       gMacroText=" ";
       </script>
       <script language="JavaScript" src="/lib/js/dialog_ie_
              d6af9e21.jsx"
></script><script language="JavaScript" src="/lib/js/gui_ie_
fc55692d.jsx"
></script><script language="JavaScript" src="/lib/js/document_ie_
ec836dad.jsx"
></script><script language="JavaScript" src="/lib/js/browser_
detect_ie_6af40f80.jsx"
></script><script language="JavaScript" src="/lib/js/cookie_
ie_81818cb9.jsx"
></script><script language="JavaScript" src="/lib/js/
spreadsheet_ie_aa99f61b.jsx"
></script><script language="JavaScript" src="/lib/js/
rows_columns_ie_cac582f7.jsx"
></script><script language="JavaScript"
src="/lib/js/interface_spreadsheet_ie_
3e5a3560.jsx" ></script><script
language="JavaScript" src="/lib/js/runtime_ie_
38489e48.jsx" ></script><script
language="JavaScript" src="/lib/js/cell_ie_
f1e68dc0.jsx" ></script><script
language="JavaScript" src="/lib/js/compiler_ie_
574f1484.jsx" ></script><script
language="JavaScript" src="/lib/js/platform_ie_
bb68a125.jsx" ></script><script
language="JavaScript" src="/lib/js/resource_ie_
b70be76d.jsx" ></script><script
language="JavaScript" src="/lib/js/utility_ie_
16a663aa.jsx" ></script>
              <div id="bulbLogo" style="background-color:#c0c0c0; position:
absolute; top: 0; left: 0; height: 50; width: 50; visibility: visible;"> <img
src="/img/blox_cube_28x44.gif" width=28 height=44 hspace=9
vspace=3 border=0
alt=" "><:div id="break2" class="break" style="position:absolute;
top: 1; left: 47; height: 50; background-repeat: repeat-y;"></div>
</div><div id="menuPalette"
class="palette">
       <div id="fileMenu" class="largeMenu"></div>
       <div id="fileSpot" class="largeSpot">File</div>
       <div id="editMenu" class="largeMenu"></div>
       <div id="editSpot" class="largeSpot">Edit</div>
       <div id="toolsMenu" class="largeMenu"></div>
       <div id="toolsSpot" class="largeSpot">Tools</div>
       <div id="formatMenu" class="largeMenu"></div>
       <div id="formatSpot" class="largeSpot">Format</div>
       <div id="helpMenu" class="largeMenu"></div>
       <div id="helpSpot" class="largeSpot" >Help</div>
       <div id="partnerMenu" class="largeMenu" ></div>
       <div id="partnerSpot" class="largeSpot"></div>
       <div id="btnEmail" class="button" title=
"Email"></div><div id="em 1"
class="buttonText">email this page</div>
</div>
<div id="menuDivision" class="division"></div>
<div id="iconPalette" class="palette">
<div id="new" class="button" title=
"New File"></div><div id="open" class="button"
title="Open File"></div><div id="save" class="button" title="Save
File"></div><div
id="print'8 class="button" title="Print"></div><div id="break1"
class="break"></div>
<div id="cut" class="button" title="Cut Cells"></div><div id=
"copy" class="button"
title="Copy Cells"></div><div id="paste" class="button"
title="Paste Cells"></div><div
id="format" class="button" title="Copy Format of Selected
Cells"></div><div
id="break2" class="break">/div>
<div id="sum" class="button" title="Automatic
Sum"></div><div id="break3"
class="break"></div>
<div id="fontMenu" class="smallMenu"></div><input
type="text" tabindex=-1
id="fontSpot" class="comboBox" hasFocus=0
onBlur="fontSpot.basFocus=0">
<div id="break4" class="break"></div>
<div id="sizeMenu" class="smallMenu"></div><input type="text"
tabindex=-1
id="sizeSpot" class="comboBox" hasFocus=0
onBlur="sizeSpot.hasFocus=0">
<div id="break5" class="break"></div>
<div id="bold" class="button" title="Bold "></div><div id=
"italic" class="button"
title="Italic "></div><div id="underline"
class="button" title="Underline"></div><div
id="break6" class="break"></div>
<div id="colorMenu" class="smallMenu"></div><div id=
"colorSpot"
class="smallSpot"> color</div>
<div id="borderMenu" class="button" title=
```

TABLE 1-continued

```
"Cell border"></div><div id="break7"
class="break"></div>
<div id="left" class="button" title=
"Align Left"></div><div id="center" class="button"
title="Center"></div><div id="right" class=
"button" title="Align Right"></div><div
id="break8" class="break"></div>
</div>
<div id="iconDivision" class="division"></div>
<div id="editPalette" class="palette">
<div id="label" class="label " style="position:absolute;
top: 4; left: 4; height: 15; width: 40;">A1</div><div id=
"functionMenu" class="smallMenu"></div><div
id="functionSpot" class="smallSpot">f(x)</div>
<div id="accept" class="button" title=
"Accept"></div><div id="cancel" class="button"
title="Cancel"></div><div style="position: absolute;
overflow: visible; top: -1; left: 150;
height: 22; z-index: 100;"><form name="entryForm" onSubmit=
"return false"><text area
id="entry" name="entry" tabindex=-1 style=
"font-family: arial, helvetica, sans-serif;
font-size: 10pt; width: 100%; height: 22px; overflow: hidden;"
onBlur="gEntryClickFocused=0" oncut='cutDocument( )'
onpaste='pasteDocument( )'
onkeydown="return keyDownDocument( )" onkeyup="return
keyUpDocument( )"></text area></form></div></div>
<div id="editDivision" class="division"></div>
<div id="previewPalette" class="palette">
<img src="/img/blox_cube_16x26.gif"
width=16 height=26 style="position: absolute;
top: 2; left: 9;" border=0 alt=" "><div id="break10"
class="break"></div>
<div id="previewHolder" class="palette">
<input id="btnEndpreview" type="button"
value="Exit Preview" style="position: absolute;
top: 4; left: 0; height: 22; width: 68; font-size: 9pt;"
onclick="ExitPreview( )"><div id="break11"
class="break"></div>
<div id="previewClue" style="position: absolute;
top: 7; left: 88; height: 18; width: 500;">
   Click on a cell to toggle it from editable to
non-editable       <div></div>
</div>
<div id="footDivision" class="division"></div>
<div id="footPalette" class="palette">
   Copyright © 1999–2000 AlphaBlox
Corporation Inc.
™</div>
<div id="fileList" class="largeList">
<div id="cmdNew" class="largeItem">New</div>
<div id="cmdOpen" class="largeItem">Open...</div>
<div id="cmdClose" class="largeItem">Close</div>
<div id="separator11" class="separator"></div>
<div id="cmdSave" class="largeItem ">Save</div>
<div id="cmdSaveAs" class="largeItem">Save As...</div>
<div id="cmdExcelExport" class="largeItem">Export to Excel...</div>
<div id="cmdExcelImport" class="largeItem">Import Excel file...</div>
<div id="separator12" class="separator"></div>
<div id="cmdSetSize" class="largeItem">Set Size...</div>
<div id="separator13" class="separator"></div>
<div id="cmdPrint" class="largeItem">Print...</div>
<div id="cmdSummary" class="largeItem">Summary...</div>
</div>
<div id="editList" class="largeList">
<div id="cmdCut" class="largeItem">Cut</div>
<div id="cmdCopy" class="largeItem">Copy</div>
<div id="cmdPaste" class="largeItem">Paste</div>
<div id="cmdPasteSpecial" class="largeItem">Paste Values</div>
<div id="cmdClear" class="largeItem">Clear</div>
<div id="separator20" class="separator"></div>
<div id="cmdFillDown" class="largeItem">Fill Down</div>
<div id="cmdFillRight" class="largeItem">Fill Right</div>
<div id="separator21" class="separator"></div>
<div id="cmdMacros" class="largeItem">Macros...</div>
</div>
<div id="toolsList" class="largeList">
<div id="cmdInsertRow" class="largeItem">Insert Row</div>
<div id="cmdInsertColumn" class="largeItem">Insert Column</div>
<div id="cmdDeleteRow" class="largeItem">Delete Row</div>
<div id="cmdDeleteColumn" class="largeItem">Delete Column</div>
<div id="separator30" class="separator"></div>
<div id="cmdFitRow" class="largeItem">Auto fit Row</div>
<div id="cmdFitColumn" class="largeItem">Autofit Column</div>
<div id="separator31" class="separator"></div>
<div id="cmdRowHeight" class="largeItem">Row Height...</div>
<div id="cmdColumnWidth" class="largeItem"Column Width...</div>
<div id="separator32" class="separator"></div>
<div id="cmdSortAscending" class="largeItem">Sort Ascending</div>
<div id="cmdSortDescending" class="largeItem">Sort Descending</div>
<div id="separator33" class="separator"></div>
<div id="cmdToggleGrid" class="largeItem">Ride Grid</div>
<div id="separator34" class="separator"></div>
<div id="cmdPreview" class="largeItem">Spreadsheet Preview</div>
</div>
<div id="formatList" class="largeList">
<div id="cmdGeneral" class="largeItem">General</div>
<div id="cmdCustom" class="largeItem">Custom...</div>
<div id="separator41" class="separator"></div>
<div id="cmd8901" class="largeItem">8,901</div>
<div id="cmd8901d2" class="largeItem">8,901.2</div>
<div id="cmd8901d22" class="largeItem">8,901.22</div>
<div id="separator42" class="separator"></div>
<div id="cmdDollar2345" class="largeItem">$2,345</div>
<div id="cmdDollar2345d67" class="largeItem">$2,345.67</div>
<div id="separator43" class="separator"></div>
<div id="cmd6Percent" class="largeItem">6%</div>
<div id="cmd6d7Percent" class="largeItem">6.7%</div>
<div id="cmd6d78Percent" class="largeItem">6.78%</div>
<div id="cmd6d789Percent" class="largeItem">6.789%</div>
<div id="separator44" class="separator"></div>
<div id="cmdMDYY" class="largeItem">m/d/yy</div>
<div id="cmdMDYYYY" class="largeItem ">m/d/yyyy</div>
<div id="cmdDMYY" class="largeItem">d/m/yy</div>
<div id="cmdDMYYYY" class="largeItem">d/m/yyyy</div>
<div id="separator4s" class="separator"></div>
<div id="cmdHMMAP" class="largeItem">h:mm AM/PM</div>
<div id="cmdHHMM" class="largeItem">hh:mm</div>
<div id="separator46" class="separator"></div>
<div id="cmdWrapText" class="largeItem">Wrap Text</div>
</div>
<div id="helpList" class="largeList">
<div id="cmdContents" class="largeItem">Contents...</div>
<div id="separator60" class="separator"><div>
<div id="cmdIntroduction" class="largeItem">Introduction</div>
<div id="cmdBasics" class="largeItem">Basics</div>
<div id="cmdFiles" class="largeItem">Files</div>
<div id="cmdNavigating" class="largeItem">Navigating</div>
<div id="cmdEditing" class="largeItem">Editing</div>
<div id="cmdFormatting" class="largeItem">Formatting</div>
<div id="cmdSpreadsheets" class="largeItem">Spreadsheets</div>
<div id="cmdMacrosHelp" class="largeItem">Macros</div>
<div id="separator61" class="separator"></div>
<div id="cmdMenuReference" class="largeItem">Menu reference</div>
<div id="cmdFunctionReference" class="largeItem">Function
reference</div>
<div id="separator62" class="separator"></div>
<div id="cmdBugReport" class="largeItem">Report a bug</div>
<div id="cmdAbout" class="largeItem">About...</div>
</div>
<div id="partnerList" class="largeList">
</div>
<div id="fontList" class="smallList">
<div id="fontArial" class="smallItem">Arial</div>
<div id="fontBookman" class="smallItem">Bookman Old Style</div>
<div id="fontCourier" class="smallItem">Courier</div>
<div id="fontGaramond" class="smallItem">Garamond</div>
<div id="fontConsole" class="smallItem">Lucida Console</div>
<div id="fontSymbol" class="smallItem">Symbol</div>
<div id="fontTahoma" class="smallItem">Tahoma</div>
<div id="fontTimesNewRoman" class=
"smallItem">Times New Roman</div>
<div id="fontVerdana" class="smallItem">Verdana</div>
</div>
<div id="sizeList" class="smallList">
<div id="point7" class="smallItem">7 pt</div>
<div id="point8" class="smallItem">8 pt</div>
<div id="point9" class="smallItem">9 pt</div>
```

TABLE 1-continued

```
<div id="point10" class="smallItem">10 pt</div>
<div id="point11" class="smallItem">11 pt</div>
<div id="point12" class="smallItem">12 pt</div>
<div id="point14" class="smallItem">14 pt</div>
<div id="point18" class="smallItem">18 pt</div>
<div id="point24" class="smallItem">24 pt</div>
<div id="point36" class="smallItem">36 pt</div>
<div id="point48" class="smallItem">48 pt</div>
<div id="point72" class="smallItem">72 pt</div>
</div>
<div id="functionList" class="smallList">
<div id="funcImageUrl" class="smallItem">Image URL</div>
<div id="funcStockQuote" class="smallItem">Stock Quote</div>
<div id="funcLinkUrl" class="smallItem">Web Link</div>
<div id="funcCurrency" class="smallItem">Currency Quote</div>
</div>
<div id="borderList" class="smallList" style="position: absolute;
top: 0; left: 0; width: 98; height: 98;">    <div id="border10"
class="border" style="position: absolute; top: 0; left: 0;" title=
"No border"></div><div id="border11" class="border"
style="position: absolute; top: 0; left: 24;" title=
"Thick bottom"></div>    <div id="border12"
class="border" style="position: absolute; top: 0; left: 48;" title=
"Double bottom"></div>
    <div id="border13" class="border"
        style="position: absolute; top: 0; left: 72;"
title="Top rule, double bottom"></div>    <div
id="border14" class="border"
style="position: absolute; top: 24; left: 0;" title=
"Bottom only"></div>    <div
id="border15" class="border" style="position: absolute; top: 24;
left: 24;" title="Left only"></div><div id="border16"
class="border" style="position: absolute; top: 24; left: 48;"
title="Right only"></div>    <div id="border17"
class="border" style="position: absolute; top: 24; left: 72;"
title="Top only"></div><div id="border18"
class="border" style="position: absolute; top: 48; left: 0;"
title="Left and right"></div>    <div id="border19"
class="border" style="position: absolute; top: 48; left: 24;" title="Top and
bottom"></div>    <div id="border20" class="border" style=
"position: absolute; top: 48; left: 48;" title=
"Columns"></div>    <div id="border21"
class="border" style="position: absolute; top: 48; left: 72;"
title="Rows"></div><div id="border22"
class="border" style="position: absolute; top: 72; left: 0;"
title="Box"></div>    <div id="border23"
class="border" style="position: absolute; top: 72; left: 24;"
title="Grid"></div>    <div id="border24"
class="border" style="position absolute; top: 72; left: 48;"
title="Boxed columns"></div><div id="border25"
class="border" style="position: absolute; top: 72; left: 72;"
title="Boxed rows"></div>    </div><div
id="colorList" class="smallList" style="position: absolute;
top: 0; left: 0; width: 200; height: 120;"><div class="heading"    style=
"position: absolute; top: 3; left: 0; width: 98;">Text Color</div>    <div
class="heading"
style="position: absolute; top: 3; left: 100;
width: 98;">Background</div>    <div
id="holder10" class="holder" style=
"position: absolute; top: 20; left: 2;"></div><div
id="holder11" class="holder" style="position: absolute;
top: 20; left: 26;"></div>
    <div id="holder12" class="holder" style=
        "position: absolute; top: 20; left:
50;"></div>    <div id="holder13"
class="holder" style="position: absolute; top: 20; left:
74;"></div>    <div id="holder14" class="holder"
style="position: absolute; top: 44; left:
2;"></div>    <div id="holder15" class="holder"
style="position: absolute; top: 44; left:
26;"></div>    <div id="holder16" class="holder"
style="position: absolute; top: 44; left:
50;"></div>    <div id="holder17" class="holder"
style="position: absolute; top: 44; left:
74;"></div>    <div id="holder18" class="holder"
style="position: absolute; top: 68; left:
2;"></div>    <div id="holder19" class="holder"
style="position: absolute; top: 68; left:
26;"></div>    <div id="holder20" class="holder"
style="position: absolute; top: 68; left:
50;"></div>    <div id="holder21" class="holder"
style="position: absolute; top: 68; left:
74;"></div>    <div id="holder22" class="holder"
style="position: absolute; top: 92; left:
2;"></div>    <div id="holder23" class="holder"
style="position: absolute; top: 92; left:
26;"></div>    <div id="holder24" class="holder"
style="position: absolute; top: 92; left:
50;"></div>    <div id="holder25" class="holder"
style="position: absolute; top: 92; left:
74;"></div>    <div id="holder50" class="holder"
style="position: absolute; top: 20; left:
100;"></div>    <div id="holder51" class="holder"
style="position: absolute; top: 20; left:
124;"></div>    <div id="holder52" class="holder"
style="position: absolute; top: 20; left:
148; "></div>    <div id="holder53" class="holder"
style="position: absolute; top: 20; left:
172;"></div>    <div id="holder54" class="holder"
style="position: absolute; top: 44; left:
100;"></div>    <div id="holder55" class="holder"
style="position: absolute; top: 44; left:
124;"></div>    <div id="holder56" class="holder"
style="position: absolute; top: 44; left:
148;"></div>    <div id="holder57" class="holder"
style="position: absolute; top: 44; left:
172;"></div>    <div id="holder58" class="holder"
style="position: absolute; top: 68; left:
100;"></div>    <div id="holder59" class="holder"
style="position: absolute; top: 68; left:
124;"></div>    <div id="holder60" class="holder"
style="position: absolute; top: 68; left:
148;"></div>    21 div id="holder61" class="holder"
style="position: absolute; top: 68; left:
172;"></div>    <div id="holder62" class="holder"
style="position: absolute; top: 92; left:
100;"></div>    <div id="holder63" class="holder"
style="position: absolute; top: 92; left:
124;"></div>    <div id="holder64" class="holder"
style="position: absolute; top: 92; left:
148;"></div>    <div id="holder65" class="holder"
style="position: absolute; top: 92; left:
172;"></div>    <div id="swatch10" class="swatch"
style="position: absolute; top: 26;
left: 8;" title="Black"></div>        <div id="swatch11"
class="swatch" style="position:
absolute; top: 26; left: 32;" title="Silver"></div>    <div id=
"swatch12" class="swatch"
style="position: absolute; top: 26; left: 56;" title=
"Gray"></div><div id="swatch13"
class="swatch" style="position: absolute; top: 26;
left: 80;" title="White"></div><div
id="swatch14" class="swatch" style=
"position: absolute; top: 50; left: 8;"
title="Maroon"></div>        <div id="swatch15"
class="swatch" style="position:
absolute; top: 50; left: 32;" title="Red"></div>    <div
id="swatch16" class="swatch"
style="position: absolute; top: 50; left: 56;" title=
"Purple"></div>    <div id="swatch17"
class="swatch" style="position: absolute; top: 50;
left: 80;" title="Fuchsia"></div>
    <div id="swatch18" class="swatch" style=
        "position: absolute; top: 74; left: 8;"
title="Green"></div><div id="swatch19" class=
"swatch" style="position: absolute; top:
74; left: 32;" title="Lime"></div>    <div id=
"swatch20" class="swatch" style="position:
absolute; top: 74; left: 56;" title="Olive">    </div><div
id="swatch21" class="swatch"
style="position: absolute; top: 74; left: 80;"
title="Yellow"></div><div id="swatch22"
class="swatch" style="position: absolute; top: 98; left: 8;"
title="Navy"></div>    <div
id="swatch23" class="swatch" style=
"position: absolute; top: 98; left: 32;"
title="Blue">    </div><div id="swatch24"
class="swatch" style="position: absolute; top:
```

TABLE 1-continued

```
98; left: 56;" title="Teal"></div>   <div id=
"swatch25" class="swatch" style="position:
absolute; top: 98; left: 80;" title="Aqua"></div><div id=
"swatch50" class="swatch"
style="position: absolute; top: 26; left: 106;"
title="Black"></div><div id="swatch51"
class="swatch" style="position: absolute;
top: 26; left: 130;" title="Silver"></div>
    <div id="swatch52" class="swatch" style=
    "position: absolute; top: 26; left: 154;"
title="Gray">   </div><div id=
"swatch53" class="swatch" style="position: absolute; top:
26; left: 178;" title="White"></div>   <div id=
"swatch54" class="swatch" style="position:
absolute; top: 50; left: 106;" title="Maroon"></div><div id=
"swatch55" class="swatch"
style="position: absolute; top: 50; left: 130;"
title="Red"></div>   <div id="swatch56"
class="swatch" style="position: absolute;
top: 50; left: 154;" title="Purple"></div>
    <div id="swatch57" class=
    "swatch" style="position: absolute; top: 50; left: 178;"
title="Fuchsia"></div>   <div id=
"swatch58" class="swatch" style="position:
absolute; top: 74; left: 106;" title=
"Green"></div>   <div id="swatch59" class="swatch"
style="position: absolute; top: 74; left: 130;"
title="Lime"></div>   <div id="swatch60"
class="swatch" style="position: absolute;
top: 74; left: 154;" title="Olive"><div
id="swatch61" class="swatch" style=
"position: absolute; top: 74; left: 178;"
title="Yellow"></div>   <div id="swatch62"
class="swatch" style="position:
absolute; top: 98; left: 106;" title="Navy"></div>   <div
id="swatch63" class="swatch"
style="position: absolute; top: 98; left: 130;"
title="Blue"></div>   <div id="swatch64"
class="swatch" style="position: absolute; top: 98;
left: 154;" title="Teal"></div>   <div
id="swatch65" class="swatch" style=
"position: absolute; top: 98; left: 178;"
title="Aqua"></div>   </div>
        <div id="modalDialog" style="display: none"></div>
        <div id="popupMenuList" class="smallList" style="width: 100;
height: 1;"></div>
        <script language="JavaScript">
            includeProgressDialog.style.display = "none";
        </script>
        <iframe id="resource0" src=" " style="display: none;"></iframe>
        <iframe id="resource1" src=" " style="display: none;"></iframe>
        <iframe id="resource2" src=" " style="display: none;"></iframe>
        <iframe id="resource3" src=" " style="display: none;"></iframe>
        <iframe id="saveFrame" src="/save_frame.html" style="display:
none;"></iframe>
        <iframe id="macroFrame" src="/macro_frame" style="display:
none;"></iframe>
        <iframe id="bugFrame" src=" " style="display: none;"></iframe>
        <iframe name="postFrame" src=
        " " style="display: none;"></iframe>
        <form id="postForm" method="POST"></form>
    </body>
</html>
```

```
<html>
    <head>
        <TITLE>Currency Comparison - Blox.com BrainMatter
Spreadsheet</TITLE>
<link rel="stylesheet" type="text/css"
href="/css/static/design_mode_ie_9eaB34d0.cssx"/><link rel=
"stylesheet"
type="text/css" "href="/css/spreadsheet_ie4_630ddc74.cssx"/>
<style type="text/css">
/* /home/www/template/static/design_mode_ie.style.tpl */
```

```
</style>
    <script language="JavaScript">
        var kTotalJSIncludes = 14;
        var gNumJSIncludesLoaded = 0;
        function JSIncludeDoneLoading ( )
        {
            gNumJSIncludesLoaded++;
            includeModalProgressWidget.style.width =
(gNumJSIncludesLoaded/kTotalJSIncludes) *250;
        }
    </script>
        <script language="JavaScript">
            function WindowIsValid(wnd) {
                try {
                    var x = wnd.name;
                }
                catch (error) {
                    return 0;
                }
                return 1;
            }
            function SafeEval (str) {
                try {
                    eval( str );
                }
                catch (error) {
                    return error.description ?
error.description : "unknown error";
                }
                return 0;
            }
        </script>
</head>
    <body class="body" scroll="no" oncontextmenu='if
((!window.event.ctrlKey) && (window.event.srcElement.id. != "entry"))
return false' onLoad="loadDocument ( )" onBeforeUnload="if (typeof
unloadDocument != 'undefined' ) unloadDocument ( )"
onUnload="if (typeof
unloadDocument != 'undefined' ) unloadDocument ( )"
onResize="resizeDocument ( )">
        <span class='view' id='view' style="width: 100%; height:
100%;">
            <!-- later write the contents of this span -->
        </span>
        <script language="Javascript">
            var content = '<div class="modalLabel">Please wait a
moment (the first time you use BrainMatter this may take a little
longer).</div>'
            + '<div class="modalProgressBar">'
            + '<div id="includeModalProgressWidget"
class="modalProgressWidget" style="visibility: visible;">'
            + '</div></div>';
            var progressDialog = '<table
id="includeProgressDialog" width="100%" height="100%">'
            + '<tr valign="middle"><td align="center"><div
class="modal" STYLE="visibility:visible; position:static;">'
            + '<table border="0" width="225" cellspacing="0"
cellpadding="0">'
            + '<tr valign="middle">'
            + '<td bgcolor="#ffcc00"><div
class="modalTopLeftBox"></div></td>'
            + '<td bgcolor="#ffe57d" nowrap><span
class="modalTitle">Loading BrainMatter</span></td>'
            + '</tr>'
            + '<tr>'
            + '<td bgcolor="#ffe57d"><br></td>'
            + '<td><div class="modalContent">' + content +
'</div><div id="modalBottomBar" style="height : 10px;
overflow:hidden"><BR></div></td>'
            + '</tr>'
            + '</table>'
            + '</div></tr></td></table>';
            document.write (progressDialog);
        </script>
        <script language="JavaScript">
            // global mode flag (can be "design", "view", or
"embed")
            var kMode = "design";
            var gInitDirtyCells = " ";
```

-continued

```
            var gCellElemMatrix; // 2-D array of the cell
elements, use like: gCellElemMatrix[row] [column]
            var gRowCount, gColumnCount, gOwnerId=0,
gAppId=' ', gAppDescription=' ';
            var gImported = 0;
            var gAppVersion = 1.0;
            var gAppAuthor = 'ss';
            var gMacroText = ' ';
            var gPartnerMenu = null;
            var gPopupMenu = null;
            var Domain = "blox.com";
            var kRootUrl = "http://www.blox.com/";
            var gIsMatterhorn = false;
            var gSaveScript = "savebraincell";
            var gSaveLifeboat = "lifeboat";
            //
gColumnCount = 6;gRowCount = 41;
            function GetColumnWidthsAndHeights (widths, heights)
widths[1] = 74;
widths[2] = 76;
widths[3] = 128;
widths[4] = 127;
widths[5] = 73;
heights[3] = 23;
heights[4] = 23;
heights[5] = 23;
heights[7] = 23;
heights[8] = 19;
heights[9] = 19;
heights[10] = 19;
heights[11] = 19;
heights[12] = 19;
heights[13] = 19;
heights[14] = 19;
heights[15] = 19;
heights[16] = 19;
heights[17] = 19;
heights[18] = 19;
heights[19] = 19;
heights[20] = 19;
heights[21] = 19;
heights[22] = 19;
heights[23] = 19;
heights[24] = 19;
heights[25] = 19;
heights[26] = 19;
heights[27] = 19;
heights[28] = 19;
heights[29] = 19;
heights[30] = 19;
heights[31] = 19;
heights[32] = 19;
heights[33] = 19;
heights[34] = 19;
heights[35] = 19;
heights[36] = 19;
heights[37] = 19;
heights[38] = 19;
heights[39] = 19;
heights[40] = 19;
            }
            // after this comment, we add //init cells
gAppId='003d728a_9c9b';
   gOwnerId='001ee26b_21c3';
   gAppDescription='Currency Comparison';
var gCellDataArray= [{entry: 'Currency
Comparison',textAlign:'left',viewSize:'12pt',foreColor:'navy',viewFamily
'Verdana',_fontWeight:'bold',m_row:1,m_col:1,i_nr:'Currency
Comparison'},
{textAlign:'left',viewSize:'12pt',foreColor:'navy',viewFamily:'Verdana',
_fontWeight:'bold',m_row:1,m_col:2},
{textAlign:'left',viewSize:'12pt',foreColor:'navy',viewFamily:'Verdana',
_fontWeight:'bold',m_row:1,m_col:3};
{textAlign:'left',viewSize:'7pt',foreColor:'navy',viewFamily:'Verdana',
_fontWeight:'bold',m_row:1,m_col:4};
{entry:'=link("http://www.halfbrain.com/cgi-
bin/help.cgi?id=bc_currency_codes","Currency symbol
table")',dynamic:'_link(\'http://www.halfbrain.com/cgi-
bin/help.cgi?id=bc_currency_codes[\]',[\]'Currency symbol
```

-continued

```
table\')',derived:'(A HREF="http://www.halfbrain.com/cgi-
bin/help.cgi?id=bc_currency_codes" TARGET="_blank"
title="link(
\"http://www.halfbrain.com/cgi-bin/help.cgi?id=bc_currency.codes\',
\'Currency symbol table\' )">Currency symbol
table</A>',viewsize:'7pt',_widthClue:'110',m_dirtyOnInit:'true',
foreColor:'navy',viewFamily:'Verdana', fontWeight:'bold',_
textAlign:'right',
m_row:1,m_col:5,i_nr:'Currency symbol table'},
{entry:'Currency
1:',viewSize:'9pt',foreColor:'navy',viewFamily:'Verdana',_textAlign:
'left',m_row:3,m_col:1,i_nr:'Currency 1:'),
{entry:'=menu("US Dollar", "USD", "Australian Dollar", "AUD",
"British Pound", "GBP", "Canadian Dollar", "CAD", "Dutch
Guilder", "NLG", "Euro", "EUR", "French Franc", "FRF", "German
Mark", "DEM", "Hong Kong Dollar", "HKD", "Indian Rupee", "INR",
"Italian Lira", "ITL", "Mexican Peso", "MXP",
"Spanish Peseta", "ESP", "Swedish
Kronal", "SEK", "Swiss Franc", "CHF", "Japanese
Yen", "JPY")',dynamic:'_menu("r3c3s0", \'US
Dollar\',\'USD\',\'Australian Dollar\',\'AUD\',
\'British Pound\',\'GBP\',\'Canadian Dollar\',\'CAD\',\'Dutch
Guilder\',\'NLG\',\'Euro\',\'EUR\',\'French Franc\',\'FRF\',
\'German Mark\',\'DEM\',\'Hong Kong Dollar\',\'HKD\',\'Indian
Rupee\',\'INR\',\'Italian Lira\',\'ITL\',\'Mexican
Peso\',\'NXP\',\'Spanish Peseta\',\'ESP\',\'Swedish
Krona\',\'SEK\',\'Swiss Franc\',\'CHF\',\'Japanese
Yen\', \'JPY\')',derived:'USD',
i_tb:'[e[8] [2],e[8] [3],e[8] [4],e[9] [2],
e[10] [2],e[11] [2],e[12] [2],e[13]
[2],e[14] [2],e[15] [2],e[16] [2],e[17] [2],e[18] [2],
e[19] [2],e[20] [2],e[21] [2]
e[22] [2],e[23] [2],e[24] [2],e[25] [2],e[26] [2],
e[27] [2],e[28] [2],e[30] [2],
e[31] [2],e[32] [2],e[33] [2],e[34] [2],e[35] [2],
e[36] [2],e[37] [2],e[38] [2],
e[39] [2],e[29] [2]]',m_cellGUI:'(type:\'menu\',
setting:0, label:\'US
Dollar\'}', locked:'true',viewSize:'9pt',m_dirtyOnInit:'true',foreColor:
maroon',viewFamily:'Verdana', _textAlign:'left',m_row:3,m_col:3,
i_nr:'US Dollar'},
{textAlign:'left',locked:'true',viewSize:'9pt',foreColor:'maroon',
viewFamily:
'Verdana',m_row:3,m_col:4},
{entry:'Currency
2:',viewSize:'9pt',foreColor:'navy',viewFamily:'Verdana',_textAlign:
'left',m_row:4,m_col:i,i_nr:'Currency 2:'},
{entry:'=menu("US Dollar", "USD", "Australian Dollar", "AUD",
"British Pound", "GBP", "Canadian Dollar", "CAD", "Dutch
Guilder", "NLG", "Euro", "EUR", "French Franc", "FRF", "German
Mark", "DEM", "Hong Kong Dollar", "HKD", "Indian Rupee", "INR",
"Italian Lira", "ITL", "Mexican Peso", "MXP", "Spanish Peseta",
"ESP", "Swedish Krona", "SEK", "Swiss Franc", "CHF", "Japanese
Yen", "JPY")',dynamic:'_menu("r4c3s0", \'US
Dollar\',\'USD\',\'Australian Dollar\',\'AUD\',\'British
Pound\',\'GBP\',\'Canadian Dollar\',\'CAD\',\'Dutch
Guilder\',\'NLG\',\'Euro\',\'EUR\',\'French Franc\',
\'FRF\',\'German Mark\',\'GEM\',\'Hong Kong Dollar\',
\'HKD\',\'Indian Rupee\',\'INR\',\'Italian Lira\',
\'ITL\',\'Mexican Peso\',\'MXP\',\'Spanish Peseta\',
\'ESP\',\'Swedish Krona\',\'SEK\',\'Swiss Franc\',\'CHF\',
\'Japanese Yen\',\'JPY\')',derived:'DEM'
i_tb:'[e[8] [2],e[8] [3],e[9] [2],e[10] [2],
e[11] [2],e[12] [2],e[13] [2],e[14] [2],
e[15] [2],e[16] [2],e[17] [2],e[18] [2],
e[19] [2],e[20] [2],e[21] [2],e[22] [2],
e[23] [2],e[24] [2],e[25] [2],e[26] [2],
e[27] [2],e[28] [2],e[30] [2],e[31] [2],
e[32] [2],e[33] [2],e[34] [2],e[35] [2],
e[36] [2],e[37] [2],e[38] [2],e[39] [2],
e[29] [2]]',m_cellGUI:'{type:\'menu\', setting:7, label:\'German
Mark\'}',locked:'true',viewSize:'9pt',m_dirtyOnInit:'true',foreColor:
'maroon',viewFamily:'Verdana',_textAlign:'left',m_row:4,
m_col:3,i_nr:'German Mark'}, _
{textAlign:'left',locked:'true',viewSize:'9pt',foreColor:'maroon',
viewFamily:'Verdana',m_row:4,m_col :4},
{entry:'Compare
starting:',viewSize:'9pt',foreColor:'navy',viewFamily:'Verdana',
_textAlign:'left',m_row:5,m_col:1,
```

-continued i_nr:'Compare starting:'},
{entry:'3/31/00',dynamic:'11047.000011574075',
derived:'11047.000011574075',
i_tb:'[e[9] [1]]',locked:'false',viewFormat:'dateMDYY',viewSize:'9pt',
foreColor:'maroon',viewFamily:'Verdana',__textAlign:'left',m_row:5,
m_col:3,i_nr:'3/31/00'},
{entry:'Increment
every:',viewSize:'9pt',foreColor:'navy',viewFamily:'Verdana',__textAlign:
'left',m_row:6,m_col:1,i_nr:'Increment every:'},
{entry:'1',dynamic:'1',derived:'1',
i_tb:'[e[10] [1],e[11] [1],e[12] [1],e[13] [1],
e[14] [1],e[15] [1],e[16] [1],
e[17] [1],e[18] [1],e[19] [1],e[20] [1],e[21] [1],
e[22] [1],e[23] [1],e[24] [1],
e[25] [1],e[26] [1],e[27] [1],e[28] [1],e[29] [1],
e[30] [1],e[31] [1],e[32] [1],e[33] [1],e[34] [1],
e[35] [1],e[36] [1],e[37] [1],e[38] [1],e[39] [1]]',
__viewFormat:'custom',foreColor:'maroon',__textAlign:'left',
locked:'false',viewSize:'9pt',negativeFormat:'-### days',positiveFormat:
'###days',viewFamily:'Verdana',m_row:6,m_col:3,
i_nr:'1 days'},
{textAlign:'left',__borderBottom:'solid black
1px',viewSize:'9pt',viewFamily:'Verdana',m_row:7,m_col:1},
{textAlign:'left',__borderBottom:'solid black
1px',viewSize:'9pt',viewFamily:'Verdana',m_row:7,m_col:2},
{textAlign:'left',__borderBottom:'solid black
1px',viewSize:'9pt',viewFamily:'Verdana',m_row:7,m_col:3},
{textAlign:'left',__borderBottom:'solid black
1px',viewSize:'9pt',viewFamily:'Verdana',m_row:7,m_col:4},
{__borderRight:'solid black 1px',m_row:8,m_col:0},
{entry:'Date',viewSize:'9pt',widthClue:'70',foreColor:'white',bk_color:
'navy',__borderRight:'solid black
1px',viewFamily:'Verdana',fontWeight:'bold',__textAlign:'center',
m_row:8,m_col:1,i_nr:'Date'}, _
{entry:'= C3 &"/" & C4 ',dynamic:'__concat(__concat
(__cel( \'r3c3s0\' ),\'/\'),__cel( \'r4c3s0\' ))',
derived:'USD/DEM',
i_rt:'[e[3] [3],e[4] [3]]',__widthClue:'72',foreColor:'white',
bk_color:'navy',__textAlign:'center',viewSize:'9pt',__borderRight:
'solid black 1px',viewFamily:'Verdana',__fontWeight:'bold',m_row:8,m_
col:2,
i_nr:'USD/DEM'},
{entry:'= C4 &"/" & C3 ',
dynamic:'__concat(__concat(__cel( \'r4c3s0\' ),\'/\'),
cel( \'r3c3s0\' ))',derived:'DEM/USD',
i_rt:'[e[4] [3],e[3] [3]]',__widthClue:'124',
foreColor:'white',bk_color:'navy',__textAlign:'center',viewSize:'9pt',
__borderRight:'solid black 1px',viewFamily:'Verdana',__fontWeight:'bold',
m_row:8,m_col:3,i_nr:'DEM/USD'},
{entry:'="% change of " & C3 ',dynamic:'__concat(\'% change of
\',__cel( \'r3c3s0\' ))',derived:'% change of USD',
i_rt:'[e[3] [3]]',textAlign:'left',viewSize:'9pt',foreColor:'white',
bk_color:'navy',__borderRight:'solid black 1px',viewFamily:'Verdana',
__fontWeight:'bold',m_row:8,m_col:4,i_nr:'%
change of USD'},
{__borderRight:'solid black 1px',m_row:9,m_col:0},
{entry:'= C5 ',dynamic:'__cel( \'rsc3s0\' )',
derived:'11047.000011574075',
i_tb:'[e[9] [2],e[10] [1]]',
i_rt:'[e[5] [3]]',__viewFormat:'dateMMDDYY',
viewSize:'9pt',__widthClue:'70',__borderRight:'solid black
1px',viewFamily:'Verdana',m_row:9,m_col:1,i_nr:'03/31/00'},
{entry:'=currency( $C$3 , $C$4 , $A9 ,"bid")',dynamic:
'__currency(__cel( \'r3c3s0\' ),__cel(
\'r4c3s0\' ),__cel( \'r9c1s0\' ),\'bid\')',
derived:'0.4913',
i_tb:'[e[9] [3]]',
i_rt:'[e[3] [3],e[4] [3],e[9] [1]]',
viewFormat:'currency_2',viewSize:'9pt',__widthClue:'72',
__borderRight :'solid black 1px',viewFamily:'Verdana',
__textAlign:'right',m_row:9,m_col:2,i_nr:'$0.49'},
{entry:'=1/ B9 ',dynamic:'__div(1,__cel( \'r9c2s0\' ))',derived:
'2.0354162426216162',
i_tb:'[e[10] [4]]',
i_rt:'[e[9] [2]]',viewFormat:'currency_2',viewSize:'9pt',
__widthClue:'124',__borderRight:'solid black
1px',viewFamily:'Verdana',m_row:9,m_col:3,i_nr:'$2.04'},
{textAlign:'left',viewFormat:'currency_2',viewSize:'9pt',__widthClue:
'123',__borderRight:'solid black 1px',viewFamily:'Verdana',m_row:9, -continued m_col:4},
{__borderRight:'solid black 1px',m_row:10,m_col:0},
entry:'= A9 + C$6 ',dynamic:'__add
(__cel( \'r9c1s0\' ),__cel( \'r6c3s0\' ))',
derived:'11048.000011574075',
i_tb:'[e[10] [2],e[11] [1]]',
i_rt:'[e[9] [1],e[6] [3]]',viewFormat:'dateMDYY',
viewSize:'9pt',__widthClue:'70',__borderRight:'solid black
1px',viewFamily:'Verdana',m_row:10,m_col:1,i_nr:'4/1/00'},
{entry:'=currency( $C$3 , $C$4 , $A10 ,"bid")',dynamic:
'__currency(__cel( \'r3c3s0\' ),__cel(
\'r4c3s0\' ),__cel( \'r10c1s0\' ),\'bid\')',
derived:'0.4883',
i_tb:'[e[10] [3]]',
i_rt:'[e[3] [3],e[4] [3],e[10] [1]]',viewFormat:'currency_2',
viewSize:'9pt',__widthClue:'72',__borderRight:'solid black
1px',viewFamily:'Verdana',__textA1ign:'right',m_row:10,m_col:2,
i_nr:'$0.49'},
{entry:'=1/ B10 ',dynamic:'__div(1,__cel( \'r10c2s0\' ))',
derived:'2.047921359819783',
i_tb:'[e[10] [4],e[11] [4]]',
i_rt:'[e[10] [2]]',viewFormat:'currency_2',viewSize:'9pt',
__widthClue:'124',__borderRight:'solid black
1px',viewFamily:'Verdana',m_row:10,m_col:3,i_nr:'$2.05'},
{entry:'=( C10 -
C9 )/ C9 ',dynamic:'__div(__sub(__cel( \'r10c3s0\' ),
__cel( \'r9c3s0\' )),__cel( \'r9c3s0\' ))',
derived:'0.006143764079459307',
i_rt:'[e[10] [3],e[9] [3]]',viewFormat:'currency_2',
viewSize:'9pt',__widthClue:'123',__borderRight:'solid black
1px',viewFamily:'Verdana',m_row:10,m_col:4,i_nr:'$0.01'},
{__borderRight:'solid black 1px',m_row:11,m_col:0},
{(entry:'= A10 + C$6 ',dynamic:'__add
(__cel( \'r10c1s0\' ),__cel( \'r6c3s0\' ))',
derived:'11049.000011574075',
i_tb:'[e[11] [2],e[12] [1]]',
i_rt:'[e[10] [1],e[6] [3]]', viewFormat:'dateMDYY',
viewSize:'9pt',__widthClue:'70',__borderRight:'solid black
1px',viewFamily:'Verdana',m_row:11,m col:1,i_nr:'4/2/00'},
{entry:'=currency( $C$3 , C$4 , $A11 ,"bid")',dynamic:'
__currency(__cel( \'r3c3aC\' ),__cel( \'r4c3sC\' ),
__cel( \'r11c1s0\' ),\'bid\')',derived:'0.4864',
i_tb:'[e[11] [3]]',
i_rt:'[e[3] [3],e[4] [3],e[11] [1]]',
viewFormat:'currency_2',viewSize:'9pt',__widthClue:'72',
__borderRight:'solid black 1px',viewFamily:'Verdana',
__textAlign:'right',m_row:11,m_col:2,i_nr:'$0.49'},
{entry:'=1/ B11 ',dynamic:'__div(1,__cel( \'r11c2s0\' ))',
derived:'2.0475020475020473',
i_tb:'[e[11] [4],e[12] [4]]',
i_rt:'[e[11] [2]]',viewFormat:'currency_2',viewSize:'9pt',
__widthClue:'124',__borderRight:'solid black
1px',viewFamily:'Verdana',m_row:11,m_col:3,i_nr:'$2.05'},
{entry:'=( C11 -
C10 )/ C10 ',dynamic:'__div(__sub(__cel
( \'r11c3s0\' ),__cel( \'r10c3s0\' )),__cel
( \'r10c3s0\' ))',derived:'-0.00020475020475D00353',
i_rt:'[e[11] [3],e[10] [3]]',viewFormat:'currency_2',
viewSize:'9pt',__widthClue:'123',__borderRight:'solid black
1px',viewFamily:'Verdana',m_row:11,m_col:4,i_nr:'($0.00)'},
{__borderRight:'solid black 1px',m_row:12,m_col:0},
{entry:'= A11 + C$6 ',dynamic:'__add(__cel(
\'r11c1s0\'),__cel( \'r6c3s0\' ))',
derived:'11050.000011574075',
i_tb:'[e[12] [2],e[13] [1]]',
i_rt:'[e[11] [1],e[6] [3]]',viewFormat:'dateMDYY',
viewsize:'9pt',__widthClue:'70',__borderRight:'solid black
1px',viewFamily:'Verdana',m_row:12,m_col:1,i_nr:'4/3/00'},
{entry:'=currency( $C$3 , $C$4 , $A12 ,"bid")',dynamic:
'__currency(__cel(\'r3c3s0\' ),__cel( \'r4c3s0\' ),
__cel( \'r12c1s0\' ),\'bid\')',derived:'0.4886',
i_tb:'[e[12] [3]]',
i_rt:'[e[3] [3],e[4] [3],e[12] [1]]',
viewFormat:'currency_2',viewsize:'9pt',
__widthClue:'72',__borderRight; 'solid black
1px',viewFamily:'Verdana',__textAlign:'right',m_row:12,m_col:2,i_
nr:'$0.49'},
{entry:'=1/ B12 ',dynamic:'__div(1,__cel( \'r12c2s0\' ))',derived:
'2.046663937781416',

```
i_tb:'[e[12][4],e[13][4]]',
i_rt:'[e[12][2]]',viewFormat:'currency_2',viewSize:'9pt',
__widthClue:'124',__borderRight:'solid black 1px',viewFamily:'Verdana',
m_row:12,m_col:3,i_nr:'$2.05'},
{entry:'=( C12 −
 C11 )/ C11 ',dynamic:'__div(_sub(_cel( \'r12c3s0\' ),
_cel( \'r11c3s0\' )),_cel( \'r11c3s0\' ))',derived:
'−0.0004093327675562496',
i_rt:'[e[12][3],e[11][3]]',viewFormat:'currency_2',
viewSize:'9pt',__widthClue:'123',__borderRight:'solid black
1px',viewFamily:'Verdana',m_row:12,m_col:4,i_nr:'($0.00)'},
{__borderRight:'solid black 1px',m_row:13,m_col:0},
{entry:'= A12 + C$6 ',dynamic:
'__add(_cel( \'r12c1s0\' ),_cel( \'r6c3s0\' ))',
derived:'11051.000011574075',
i_tb:'[e[13][2],e[14][1]]',
i_rt:'[e[12][1],e[6][3]]', viewFormat:
'dateMDYY',viewsize:'9pt',__widthClue:'70',__borderRight:'solid black
1px',viewFamily:'Verdana',m_row:13,m col:1,i_nr:'4/4/00'),
{entry:'=currency( $C$3 , $C$4 , $A13 ,"bid")',
dynamic:'__currency(_cel( \'r3c3s0\' ),
_cel( \'r4c3s0\' ),_cel( \'r13c1s0\' ),\'bid\')',
derived:'0.4895',
i_tb:'[e[13][3]]',
i_rt:'[e[3][3],e[4][3],e[13][1]]',viewFormat:'currency_2',
viewsize:'9pt',__widthClue:'72',__borderRight:'solid black
1px',viewFamily:'Verdana',__textAlign:'right',m_row:13,m_col:2,
i_nr:'$0.49'},
{entry:'=1/ B13 ',dynamic:'__div(1,_cel( \'r13c250\' ))',
derived:'2.0429009193054135',
i_tb:'[e[13][4],e[14][4]]',
i_rt:'[e[13][2]]',viewFormat:'currency_2 ',
viewSize:'9pt',__widthClue:'124',__borderRight:'solid black
1px',viewFamily:'Verdana',m_row:13,m_col:3,i_nr:'$2.04'},
{entry:'=( C13 −
 C12 )/ C12 ',dynamic:'__div(_sub(_cel( \'r13c3s0\' ),
_cel( \'r12c3s0\' )),_cel( \'r12c350\' ))',
derived:'−0.0018386108273749136',
i_rt:'[e[13][3],e[12][3]]',viewFormat:'currency_2',
viewSize:'9pt',__widthClue:"23",__borderRight:'solid black
1px',viewFamily:'Verdana',m_row:13,m_col:4,i_nr:'($0.00)'),
{__borderRight:'solid black 1px',m_row:14,m_col:0},
{entry:'= A13 + C$6 ',
dynamic:'__add(_cel( \'r13c1s0\' ),
_cel( \'r6c3s0\' ))',derived:'11052.000011574075',
i_tb:'[e[14][2],e[15][1]]',
i_rt:'[e[13][1],e[6][3]]',viewFormat:'dateMDYY',
viewSize:'9pt',__widthClue:'70',__borderRight:'solid black
1px',viewFamily:'Verdana',m_row:14,m col:1,i_nr:'4/5/00'},
{entry:'=currency( $C$3 , $C$4 , $A14 ,"bid")',
dynamic:'__currency(_cel( \'r3c3s0\' ),
_cel( \'r4c390\'),_cel( \'r14c1s0\' ),\'bid\')',
derived:'0.4918',
i_tb:'[e[14][3]]',
i_rt:'[e[3][3],e[4][3],e[14][1]]',viewFormat:
'currency_2',viewsize:'9 pt',
__widthClue:'72',__borderRight:'solid black
1px',viewFamily:'Verdana',__textAlign:'right',m_row:14,
m_col:2,i_nr:'$0.49'},
{entry:'=1/ B14 ',dynamic:'__div(1,_cel( \'r14c290\'))',
derived:'2.03334688897926',
i_tb:'[e[14][4],e[15][4]]',
i_rt:'[e[14][2]]',viewFormat:'currency_2',viewSize:'9pt',
__widthClue:'124',__borderRight:'solid black
1px',viewFamily:'Verdana',m_row:14,m_col:3,i_nr:'$2.03'},
{entry:'=( C14 −
 C13 )/ C13 ',dynamic:'__div(_sub(_cel( \'r14c3s0\' ),
_cel( \'r13c3s0\' )),_cel( \'r13c3s0\' ))',
derived:'−0.004676697844652212',
i_rt:'[e[14][3],e[13][3]]',viewFormat:'currency_2',
viewSize:'9pt',__widthClue:'123',__borderRight:'solid black
1px',viewFamily:'Verdana',m_row:14,m_col:4,i_nr:'($0.00)'),
__borderRight:'solid black 1px',m_row:15,m_col:0},
{entry:'= A14 + C$6 ',dynamic:
'__add(_cel( \'r14c1s0\' ),_cel( \'r6c3s0\' ))',
derived:'11053.000011574075',
i_tb:'[e[15][2],e[16][1]]',
i_rt:'[e[14][1],e[6][3]]',viewFormat:'dateMDYY',viewSize:'9pt',
__widthClue:'70',__borderRight:'solid black
1px',viewFamily:'Verdana',m_row:15,m_col:1,i_nr:'4/6/00'},
{entry:'=currency( $C$3 , C$4 , $A15 ,"bid")',
dynamic:'__currency(_cel( \'r3c3s0\' ),_cel( \'r4c3s0\' ),
_cel( \'r15c1s0\' ),\'bid\')',derived:'0.4926',
i_tb:'[e[15][3]]',
i_rt:'[e[3][3],e[4][3],e[15][1]]',viewFormat:'currency_2',
viewSize:'9pt',__widthClue:'72',__borderRight:'solid black
1px',viewFamily:'Verdana',__textAlign:'right',m_row:15,m_col:2,
i_nr:'$0.49'},
{entry:'=1/ B15 ',dynamic:'__div(1,_cel( \'r15c2s0\' ))',
derived:'2.0300446609B25417',
i_tb:'[e[15][4],e[16][4]]',
i_rt:'[e[15][2]]',viewFormat:'currency_2',
viewSize:'9pt',__widthClue:'124',__borderRight:'solid black
1px',viewFamily:'Verdana',m_row:15,m_col:3,i_nr:'$2.03'},
{entry:'=( C15 −
 C14 )/ C14 ',
dynamic:'__div(_sub(_cel( \'r15c3s0\' ),_cel( \'r14c3s0\' )),
_cel( \'r14c3s0\' ))',derived:'−0.0016240357287859556',
i_rt:'[e[15][3],e[14][3]]',viewFormat:'currency_2',viewSize:'9pt',
__widthClue:'123',__borderRight:'solid black
1px',viewFamily:'Verdana',m_row:15,m_col:4,i_nr:'($0.00)'},
{__borderRight:'solid black 1px',m_row:16,m_col:0},
{entry:'= A15 + C$6 ',dynamic:'__add(_cel( \'r15c1s0\' ),
_cel( \'r6c3s0\' ))',derived:'11054.000011574075',
i_tb:'[e[16][2],e[17][1]]',
i_rt:'[e[15][1],e[6][3]]',__viewFormat:'dateMDYY',viewSize:'9pt',
__widthClue:'70', borderRight:'solid black 1px',viewFamily:'Verdana',
m_row:16,m col:1,i_nr:'4/7/00'},
{entry:'=currency( $C$3 , C$4 , $A16 ,"bid")',dynamic:
__currency(_cel( \'r3c3s0\' ),
_cel( \'r4c3s0\' ),_cel( \'r16c1s0\' ),
\'bid\')',derived:'0.4899',
i_tb:'[e[16][3]]',
i_rt:'[e[3][3],e[4][3],e[16][1]]',
viewFormat:'currency_2',viewSize:'9pt',
__widthClue:'72',__borderRight:'solid black
1px',viewFamily:'Verdana',__textAlign:'right',m_row:16,
m_col:2,i_nr:'$0.49'},
{entry:'=1/ B16 ',dynamic:'__div(1,_cel( \'r16c2s0\' ))',
derived:'2.0412329046744233',
i_tb:'[e[16][4],e[17][4]]'
i_rt:'[e[16][2]]',viewFormat:'currency_2',
viewSize:'9pt',__widthClue:'124',__borderRight:'solid black
1px',viewFamily:'Verdana',m_row:16,m_col:3,i_nr:'$2.04'},
{entry:'=( C16 −
 C15 )/ C15 ',dynamic:'__div( sub(_cel( \'r16c3s0\' ),
_cel( \'r15c3s0\' )),_cel( \'r15c3s0\' ))',
derived:'0.005511328842620646',
i_rt:'[e[16][3],e[15][3]]',viewFormat:'currency_2',
viewSize:'9pt',__widthClue:'123',__borderRight:'solid black
1px',viewFamily:'Verdana',m_row:16,m_col:4,i_nr:'$0.01'},
{__borderRight:'solid black 1px',m_row:17,m_col:0},
{entry:'= A16 + C$6 ',dynamic:
'__add(_cel( \'r16c1s0\' ),_cel( \'r6c3s0\' ))',
derived:'11055.000011574075',
i_tb:'[e[17][2],e[18][1]]',
i_rt:'[e[16][1],e[6][3]]',__viewFormat:'dateMDYY',
viewSize:'9pt',__widthClue:'70',__borderRight:'solid black
1px',viewFamily:'Verdana',m_row:17,m col:1,i_nr:'4/8/00'},
{entry:'=currency( $C$3 , $C$4 , $A17 ,"bid")',
dynamic:'__currency(_cel( \'r3c3s0\' ),
_cel( \'r4c3s0\' ),_cel( \'r17c1s0\' ),
\'bid\')',derived:'0.4879',
i_tb:'[e[17][3]]',
i_rt:'[e[3][3],e[4][3],e[17][1]]',
viewFormat:'currency_2',viewSize:'9pt',
__widthClue:'72',__borderRight:solid black
1px',viewFamily:'Verdana',__textAlign:'right',m_row:17,
m_col:2,i_nr:'$0.49'},
{entry:'=1/ B17 ',dynamic:'__div(1,_cel( \'r17c2s0\' ))',
derived:'2.0496003279360524',
i_tb:'[e[17][4],e[18][4]]',
i_rt:'[e[17][2]]',viewFormat:'currency_2',
viewSize:'9pt',__widthClue:'124',__borderRight:'solid black
1px',viewFamily:'Verdana',m_row:17,m_col:3,i_nr:'$2.05'},
{entry:'=( C17 −
 C16 )/ C16 ',
dynamic:'__div(_sub(_cel( \'r17c3s0\' ),_cel
```

( \'r16c3s0\' )),__cel( \'r16c3s0\' ))',
derived:'0.00040992006558729',
i__rt:'[e[17] [3],e[16] [3]]',viewFormat:'currency__2',
viewsize:'9pt',__widthClue:'123',__borderRight:'solid black
1px',viewFamily:'Verdana',m__row:17,m__col:4,i__nr:'$0.00'},
{__borderRight:'solid black 1px',m__row:18,m__col:0},
{entry:'= A17 + C$6 ',
dynamic:'__add(__cel( \'r17c1s0\' ),
__cel( \'r6c3s0\' ))',derived:'11056.000011574075',
i__tb:'[e[18] [2],e[19] [1]]',
i__rt:'[e[17] [1],e[6] [3]]',__viewFormat:'dateMDYY',
viewSize:'9pt',__widthClue:'70',__borderRight:'solid black
1px',viewFamily:'Verdana',m__row:18,m__col:1,i__nr:'4/9/00'},
[entry:'=currency( $C$3 , $C$4 , $A18 ,"bid")',
dynamic:'__currency(__cel( \'r3c3s0\' ),
__cel( \'r4c3s0\' ),__cel( \'r18c1s0\' ),
\'bid\')',derived:'0.4879'},
i__tb:'[e[18] [3]]',
i__rt:'[e[3] [3],e[4] [3],e[16] [1]]',viewFormat:
'currency__2',viewSize:'9pt',__widthClue:'72',
__borderRight:'solid black 1px',viewFamily:'Verdana',__textAlign:'right',
m__row:18,m__col:2,i__nr:'$0.49'},
{entry:'=1/ B18 ',dynamic:'__div(1,__cel( \'r18c2s0\' ))',
derived:'2.0496003279360524'},
i__rt:'[e[18] [4],e[19] [4]]',
i__rt:'[e[18] [2]]',viewFormat:'currency__2',
viewSize:'9pt',__widthClue:'124',__borderRight:'solid black
1px',viewFamily:'Verdana',m__row:18,m__col:3,i__nr:'$2.05'},
{entry:'=( C18 -
C17 )/ C17 ',
dynamic:'__div(__sub(__cel( \'r18c3s0\' ),
__cel( \'r17c3s0\' )),__cel( \'r17c3s0\' ))',
i__tb:'[e[18] [3],e[17] [3]]',viewFormat:'currency__2',
viewSize:'9pt',__widthClue:'123',__borderRight:'solid black
1px',viewFamily:'Verdana',m__row:18,m__col:4,i__nr:'$0.00'},
{__borderRight:'solid black 1px',m__row:19,m__col:0},
{entry:'= A18 + C$6 ',
dynamic:'__add(__cel( \'r18c1s0\' ),
__cel( \'r6c3s0\' ))',derived:'11057.000011574075',
i__tb:'[e[19] [2],e[20] [1]]',
i__rt:'[e[18] [1],e[6] [3]]',viewFormat:'dateMDyy',
viewSize:'9pt',__widthClue:'70',__borderRight:'solid black
1px',viewFamily:'Verdana',m__row:19,m__col:1,i__nr:'4/10/00'},
{entry:'=currency( $C$3 , $C$4 , $A19 ,"bid")',dynamic:
'__currency(__cel( \'r3c3s0\' ),__cel( \'r4c350\' ),
__cel( \'r16c1s0\' ),\'bid\')',derived:'0.4983',
i__tb:'[e[19] [3]]'
i__rt:'[e[3] [3],e[4] [3],e[19] [1]]',viewFormat:'currency__2',
viewsize:'9pt'
1px',viewFamily:'Verdana',__textAlign:'right',m__row:19,m__col:2,
i__nr:'$0.49'},
{entry:'=1/ B19 ',dynamic:'__div(1,__cel( \'r19c2s0\' ))',
derived:'2.047921359819793'},
i__rt:'[e[19] [4],e[20] [4]]'
i__rt:'[e[19] [2]]',viewFormat:'currency__2',viewSize:'9pt',
__widthClue:'124',__borderRight:'solid black 1px',viewFamily:'Verdana',
m__row:19,m__col:3,i__nr:'2.05'},
{entry:'=( C19 -
C18 )/ C18 ',dynamic:'__div(__sub(__cel( \'r19c3s0\'),
__cel( \'r18c3s0\')),__cel( \'r18c3s0\' ))',
derived:'0.0008191685439278605',
i__rt:'[e[19] [3],e[18] [3]]',viewFormat:'currency__2',
viewSize:'9pt',__widthClue:'123',__borderRight:'solid black
1px',viewFamily:'Verdana',m__row:19,m__col:4,i__nr:'($0.00)'},
{__borderRight:'solid black 1px',m__row:20,m__col:0},
{entry:'= A19 + C$6 ',dynamic:'__add(__cel( \'r19c1s0\' ),
__cel( \'r6c3s0\' ))',derived:'11058.000011574075', __
i__tb:'[e[20] [2],e[21] [1]]',
i__rt:'[e[19] [1],e[6] [3]]',__viewFormat:'dateMDYY',
viewSize:'9pt',__widthClue:'70',__borderRight:'solid black
1px',viewFamily:'Verdana',m__row:20,m__col:1,i__nr:'4/11/00'},
{entry:'=currency( $C$3 , $C$4 , $A20 ,"bid")',
dynamic:'__currency(__cel( \'r3c3s0\' ),
__cel( \'r4c3s0\' ),__cel( \'r20c1s0\' ),\'bid\')',
derived:'0.4919',
i__tb:'[e[20] [3]]'
i__rt:'[e[3] [3],e[4] [3],e[20] [1]]',viewFormat:'currency__2',
viewSize:'9pt'
1px',viewFamily:'Verdana',__textAlign:'right',m__row:2D,m__col:2,
i__nr:'$0.49'},
[entry:'=1/ B20 ',dynamic:'__div(1,__cel( \'r20c2s0\' ))',
derived:'2.0329335230737952',
i__tb:'[e[20] [4],e[21] [4]]',
i__rt:'[e[20] [2]]',viewFormat:'currency__2',viewSize:'9pt',
__widthClue:'124',__borderRight:'solid black
1px',viewFamily:'Verdana',m__row:20,m__col:3,i__nr:'$2.03'},
{entry:'=( C20 -
C19 )/ C19 ',dynamic:
'__div(__sub(__cel( \'r20c3s0\' ),
__cel( \'r19c3s0\' )),__cel( \'r19c3s0\'))',
derived:'−0.0073185606930657905',
i__rt:'[e[20] [3],e[19] [3]]',viewFormat:'currency__2',
viewSize:'9pt',__widthClue:'123',__borderRight:'solid black
1px',viewFamily:'Verdana',m__row:20,m__col:4,i__nr:'($0.01)'},
{__borderRight:'solid black 1px',m__row:21,m__col:0}
[entry:'= A20 + C$6 ',
dynamic:'__add(__cel( \'r20c1s0\' ),
__cel( \'r6c3s0\' ))',derived:'11059.000011574075',
i__tb:'[e[21] [2],e[22] [1]]',
i__rt:'[e[20] [1],e[6] [3]]', viewFormat:'dateMDYY',
viewSize:'9pt',__widthClue:'70',__borderRight:'solid black
1px',viewFamily:'Verdana',m__row:21,m__col:1,i__nr:'4/12/00'},
{entry:'=currency( $C$3 , $C$4 , $A21 ,"bid")',
dynamic:'__currency(__cel( \'r3c3s0\' ),
__cel( \'r4c3s0\' ),__cel( \'r21c1s0\' ),
\'bid\')',derived:'0.4903',
i__tb:'[e[21] [3]]',
i__rt:'[e[3] [3],e[4] [3],e[21] [1]]',
viewFormat:'currency__2',viewSize:'9pt'
__widthClue:'72',__borderRight:'solid black
1px',viewFamily:'Verdana',__textAlign:'right',m__row:21,m__col:2,
i__nr:'$0.49'},
{entry:'=1/ B21 ',dynamic:'__div(1,__cel( \1r21c2s0\' ))',
derived:'2.039567611666327',
i__tb:'[e[21] [4],e[22] [43]]',
i__rt:'[e[21] [2]]',viewFormat:'currency__2',
viewSize:'9pt',__widthClue:'124',__borderRight:'solid black
1px',viewFamily:'Verdana',m__row:21,m__col:3,i__nr:'$2.04'},
{entry:'=( C21 -
C20 )/ C20 ',dynamic:
'__div(__sub(__cel( \'r21c3s0\' ),__cel( \'r20c3s0\' ),
__cel( \'r20c3s0\' ))',derived:'0.0032633081786662757',
i__rt:'[e[21] [3],e[20] [3]]',viewFormat:'currency__2',
viewsize:'9pt',__widthClue:'123',__borderRight:'solid black
1px',viewFamily:'Verdana',m__row:21,m__col:4,i__nr:'0.00'},
__borderRight:'solid black 1px',m__row:22,m__col:0}
entry:'= A21 + C$6 ',dynamic:
'__add(__cel( \'r21c1s0\' ),__cel( \'r6c3s0\' ))',
derived:'11060.000011574075',
i__tb:'[e[22] [2],e[23] [1]]',
i__rt:'[e[21] [1],e[6] [3]]',__viewFormat:'dateMDYY',
viewSize:'9pt',__widthClue:'70',__borderRight:'solid black
1px',viewFamily:'Verdana',m__row:22,m__col:1,i__nr:'4/13/00'},
{entry:'=currency( $C$3 , $C$4 , $A22 ,"bid")',
dynamic:'__currency(__cel( \'r3c3s0\' ),
__cel( \'r4c3s0\' ),__cel( \'r22c1s0\' ),
\'bid\')',derived:'0.4898',
i__tb:'[e[22] [3]]',
i__rt:'[e[3] [3],e[4] [3],e[22] [1]]',
viewFormat:'currency__2',viewSize:'9pt'
__borderRight:'solid black 1px',viewFamily:'Verdana',__textAlign:'right',
m__row:22,m__col:2,i__nr:'$0.49'},
{entry:'=1/ B22 ',dynamic:'__div(1,__cel( \'r22c2s0\' ))',
derived:'2.041649652919559',
i__tb:'[e[22] [4],e[23] [4]]',
i__rt:'[e[22] [2]]',viewFormat:'currency__2',viewSize:'9pt',
__widthClue:'124',__borderRight:'solid black
1px',viewFamily:'Verdana',m__row:22,m__col:3,i__nr:'$2.04'},
{entry:'=( C22 -
C21 )/ C21 ',
dynamic:'__div(__sub(__cel( \'r22c3s0\' ),
__cel( \'r21c3s0\' )),__cel( \'r21c3s0\' ))',
derived:'0.00102082462642645968691',
i__rt:'[e[22] [3],e[21] [3]]',viewFormat:'currency__2',
viewSize:'9pt',__widthClue:'123',__borderRight:'solid black
1px',viewFamily:'Verdana',m__row:22,m__col:4,i__nr:'$0.00'},
{__borderRight:'solid black 1px',m__row:23,m__col:0},
{entry:'= A22 + C$6 ',dynamic:

```
'__add(__cel( \'r22c1s0\'  ),__cel( \'r6c3s0\'  ))',
derived:'11061.000011574075',
i__tb:'[e[23] [2],e[24] [1]]',
i__rt:'[e[22] [1],e[6] [3]]',__viewFormat:'dateMDYY',
viewSize:'9pt',__widthClue:'70',__borderRight:'solid black
1px',viewFamily:'Verdana',m__row:23,m__col:1,i__nr:'4/14/00'},
{entry:'=currency(  $C$3   ,   $C$4   ,  $A23  ,"bid")',
dynamic:'currency(__cel(  \'r3c3s0\'  ),__cel(  \'r4c3s0\'  ),
__cel(  \'r23c1s0\'  ),\'bid\')',derived:'0.488',
i__tb:'[e[23] [3]]',
i__rt:'[e[3] [3],e[4] [3],e[23] [1]]',
viewFormat:'currency__2',viewSize:'9pt'
__borderRight:'solid black 1px',viewFamily:'Verdana',__textAlign:'right',
m__row:23,m__col:2,i__nr:'$0.49'},
{entry:'=1/ B23  ',dynamic:'__div(1,__cel( \'r23c2s0\'))',
derived:'2.0491803278688523',
i__tb:'[e[23] [4],e[24] [4]]',
i__rt:'[e[23] [2]]',viewFormat:'currency__2',
viewSize:'9pt',__widthClue:'124',__borderRight:'solid black
1px',viewFamily:'Verdana',m__row:23,m__col:3,i__nr:'$2.05'},
{entry:'=(  C23  -
   C22   )/  C22  ',dynamic:
'__div(__sub(__cel(  \'r23c3s0\' ),
__cel(  \'r22c3s0\' )),__cel(  \'r22c3s0\' ))',
derived:'0.003688524590163698'
i__rt:'[e[23] [3],e[22] [3]]',viewFormat:'currency__2',
viewsize:'9pt',__widthClue:'123',__borderRight:'solid black
1px',viewFamily:'Verdana',m__row:23,m__col:4,i__nr:'$0.00'},
{borderRight:'solid black 1px',m__row:24,m__col:0},
{entry:'=  A23  +  C$6  ',dynamic:
'__add(__cel(  \'r23c1s0\'  ),__cel(  \'r6c3s0\'  ))',
derived:'11062.000011574075',
i__tb:'[e[23] [2],e[25] [1]]',
i__rt:'[e[23] [1],e[6] [3]]',__viewFormat:'dateMDYY',
viewSize:'9pt',__widthClue:'70',__borderRight:'solid black
1px',viewFamily:'Verdana',m__row:24,m__col:1,i__nr:'4/15/00'},
{entry:'=currency(  $C$3   ,   $C$4   ,  $A24  ,"bid")',dynamic:
'__currency(__cel(  \'r3c3s0\'  ),
__cel(  \'r4c3s0\'  ),__cel(  \'r24c1s0\'  ),\'bid\')',
derived:'0.4911',
i__tb:'[e[24] [3]]',
i__rt:'[e[3] [3],e[4] [3],e[24] [1]]',
viewFormat:'currency__2',viewSize:'9pt',
__widthClue:'72', borderRight:'solid black
1px',viewFamily:'Verdana',__textAlign:'right',m__row:24,
m__col:2,i__nr:'$0.49'},
{entry:'=1/ B24  ',dynamic:'__div(1,__cel( \'r24c2s0\' ))',
derived:'2.036245163917736',
i__tb:'[e[24] [4],e[25] [4]]',
i__rt:'[e[24] [2]]',viewFormat:'currency__2',viewSize:'9pt',
__widthClue:'124',__borderRight:'solid black
1px',viewFamily:'Verdana',m__row:24,m__col:3,i__nr:'$2.04'},
{entry:'=(  C24  -
   C23   )/  C23  ',dynamic:
'__div(__sub(__cel(  \'r24c3s0\' ),
__cel(  \'r23c3s0\' )),__cel(  \'r23c3s0\\' ))',
derived:'-0.006312360008144793',
1__rt:'[e[24] [3],e[23] [3]]',viewFormat:'currency__2',
viewSize:'9pt',__widthClue:'123',__borderRight:'solid black
1px',viewFamily:'Verdana',m__row:24,m__col:4,i__nr:'($0.01)'},
{__borderRight:'solid black 1px',m__row:25,m__col:0},
{entry:'=  A24  +  C$6  ',dynamic:
'__add(__cel(  \'r24c1s0\'  ),__cel(  \'r6c3s0\'  ))',
derived:'11063.000011574075',
i__tb:'[e[25] [2],e[26] [1]]',
i__rt:'[e[24] [1],e[6] [3]]',__viewFormat:'dateMDYY',
viewSize:'9pt',__widthClue:'70',__borderRight:'solid black
1px',viewFamily:'Verdnna',m__row:25,m__col:1,i__nr:'4/16/00'},
{entry:'=currency(  $C$3   ,   C$4   ,  $A25  ,"bid")',
dynamic:'currency(__cel(  \'r3c3s0\' ),
__cel(  \'r4c3s0\'  ),__cel(  \'r25c1s0\'  ),
\'bid\')',derived:'0.4914',
i__tb:'[e[25] [3]]',
i__rt:'[e[3] [3],e[4] [3],e[25] [1]]',
viewFormat:'currency__2',viewSize:'9pt',__widthClue:'72',
__borderRight:'solid black 1px',viewFamily:'Verdana',
__textAlign:'right',m__row:25,m__col:2,i__nr:'$0.49'},
{entry:'=1/ B25  ',dynamic:'__div(1,__cel( \'r25c2s0\' ))',
derived:'2.035002035002035',
i__tb:'[e[25] [4],e[26] [4]]',
i__rt:'[e[25] [2]]',viewFormat:'currency__2',viewSize:'9pt',
__widthClue:'124',__borderRight:'solid black
1px',viewFamily:'Verdana',m__row:25,m__col:3,i__nr:'$2.04'},
{entry:'=(  C25  -
   C24   )/  C24  ',dynamic:
'__div(__sub(__cel(  \'r2Sc3s0\' ),
__cel(  \'r24c3s0\' )),__cel(  \'r24c3s0\' ))',
derived:'-0.0006105006105007051',
i__rt:'[e[25] [3],e[24] [3]]',viewFormat:'currency__2',
viewSize:'9pt',__widthClue:'123',__borderRight:'solid black
1px',viewFamily:'Verdana',m__row:25,m__col:4,i__nr:'($0.00)'},
{__borderRight:'solid black 1px',m__row:26,m__col:0},
{entry:'=  A25  +  C$6  ',
dynamic:'__add(__cel(  \'r25c1s0\'  ),
__cel(  \'r6c3s0\'  ))',
derived:'11064.000011574075',
i__tb:'[e[26] [2],e[27] [1]]',
i__rt:'[e[25] [1],e[6] [3]]',viewFormat:'dateMDYY',
viewSize:'9pt',__widthClue:'70',__borderRight:'solid black
1px',viewFamily:'Verdana',m__row:26,m__col:1,i__nr:'4/17/00'},
{entry:'=currency(  $C$3   ,   $C$4   ,  $A26  ,"bid")',
dynamic:'__currency(__cel(  \'r3c3s0\'  ),
__cel(  \'r4c360\'  ),__cel(  \'r26c1s0\'  ),
\'bid\'  )',derived:'0.4915',
i__tb:'[e[26] [3]]',
i__rt:'[e[3] [3],e[4] [3],e[26] [1]]',viewFormat:
'currency__2',viewsize:'9pt',__widthClue:'72',
__borderRight:'solid black 1px',viewFamily:'Verdana',
__textAlign:'right',m__row:26,m__col:2,i__nr:'$0.49'},
{entry:'=1/ B26  ',dynamic:'__div(1,__cel( \'r26c2s0\' ))',
derived:'2.034587995930824',
i__tb:'[e[26] [4],e[27] [4]]',
i__rt:'[e[26] [2]]',viewFormat:'currency__2',
viewSize:'9pt',__widthClue:'124',__borderRight:'solid black
1px',viewFamily:'Verdana',m__row:26,m__col:3,i__nr:'$2.03'},
{entry:'=(  C26  -
   C25   )/  C25  ',dynamic:
'__div(__sub(__cel(  \'r26c3s0\' ),
__cel(  \'r25c3s0\' )),__cel(  \'r25c3s0\' ))',
derived:'-0.00020345879959301057',
i__rt:'[e[26] [3],e[25] [3]]',viewFormat:'currency__2',
viewSize:'9pt',__widthClue:'123',__borderRight:'solid black
1px',viewFamily:'Verdana',m__row:26,m__col:4,i__nr:'($0.00)'},
{__borderRight:'solid black 1px',m__row:27,m__col:0},
entry:'=  A26  +  C$6  ',dynamic:
'__add(__cel(  \'r26c1s0\'  ),__cel(  \'r6c3s0\'  ))',
derived:'1065.0000115741075',
i__tb:'[e[27] [2],e[28] [1]]',
i__rt:'[e[26] [1],e[6] [3]]',viewFormat:'dateMDYY',
viewSize:'9pt',__widthClue:'70',__borderRight:'solid black
1px',viewFamily:'Verdana',m__row:27,m__col:1,i__nr:'4/18/00'},
{entry:'__currency(  $C$3   ,   $C$4   ,  $A27  ,"bid")',
dynamic:'__currency(__cel(  \'r3c3s0\'  ),
__cel(  \'r4c3s0\'  ),__cel(  \'r27c1s0\'  ),\'bid\')',
derived:'0.4869',
i__tb:'[e[27] [3]]',
i__rt:'[e[3] [3],e[4] [3],e[27] [1]]',
viewFormat:'currency__2',viewSize:'9pt'
__widthClue:'72',__borderRight:'solid black
1px',viewFamily:'Verdana',__textAlign:'right',m__row:27,
m__col:2,i__nr:'$0.49'},
{entry:'=1/ B27  ',dynamic:'__div(1,__cel( \'r27c2s0\' ))',
derived:'2.0538096172109262',
i__tb:'[e[27] [4],e[28] [4]]',
i__rt:'[e[27] [2]]',viewFormat:'currency__2',
viewSize:'9pt',__widthClue:'124',__borderRight:'solid black
1px',viewFamily:'Verdana',m__row:27,m__col:3,i__nr:'$2.05'},
{entry:'=(  C27  -
   C26   )/  C26  ',dynamic:
'__div(__sub(__cel(  \'r27c3s0\' ),
__cel(  \'r26c3s0\' )),__cel(  \'r26c3s0\' ))',
derived:'0.009447525159170171'
i__rt:'[e[27] [3],e[26] [3]]',viewFormat:'currency__2',
viewSize:'9pt',__widthClue:'123',__borderRight:'solid black
1px',viewFamily:'Verdana',m__row:27,m__col:4,i__nr:'$0.01'},
{__borderRight:'solid black 1px',m__row:28,m__col:0},
entry:'=  A27  +  C$6  ',dynamic:
'__add(__cel(  \'r27c1s0\'  ),__cel(  \'r6c3s0\'  ))',
```

```
derived:"1066.000011574075',
i_tb:'[e[26] [2],e[29] [1]]',
i_rt:'[e[27] [1],e[6] [3]]',viewFormat:'dateMDYY',viewSize:'9pt',
__widthClue:'70',__borderRight:'solid black
1px',viewFamily:'Verdana',m_row:26,m_col:1,i_nr:'4/19/00'},
{entry:'=currency( $C$3 , $C$4 , $A26 ,"bid")',
dynamic:'_currency(_cel( \'r3c3s0\' ),
_cel( \'r4c3s0\' ),_cel( \'r28c1s0\' ),\'bid\')',
derived:'0.4841',
i_tb:'[e[28] [3]]',
i_rt:'[e[3] [3],e[4] [3],e[28] [1]]',
viewFormat:'currency_2',viewsize:'9pt',__widthClue:'72',
__borderRight:'solid black 1px',viewFamily:'Verdana',__textAlign:'right',
m_row:28,m_col:2,i_nr:'$0.48'},
{entry:1=1/ B28 ',dynamic:'_div(1,_cel( \'r28c2s0\' ))',
derived:'2.065688907250568',
i_tb:'[e[28] [4],e[29] [4]]',
i_rt:'[e[28] [2]]',viewFormat:'currency_2',viewSize:'9pt',
__widthClue:'124',__borderRight:'solid black
1px',viewFamily:'Verdana',m_row:28,m_col:3,i_nr:'$2.07'},
{entry:'=( C28 -
C27 )/ C27 ',dynamic:
'_div(_sub(_cel( \'r28c3s0\' ),
_cel( \'r27c3s0\' )),
_cel( \'r27c3s0\' ))',
derived:'0.0057839289400301659',
i_rt:'[e[28] [3],e[27] [3]]',viewFormat:'currency_2',
viewSize:'9pt',__widthClue:'123',__borderRight:'solid black
1px',viewFamily:'Verdana',m_row:28,m_col:4,i_nr:'$0.01'},
{__borderRight:'solid black 1px',m_row:29,m_col:0},
{entry:'= A28 + C$6 ',dynamic:
'_add(_cel( \'r28c1s0\' ),_cel( \'r6c3s0\' ))',
derived:'11067.000011574075',
i_tb:'[e[30] [1],e[29] [2]]',
i_rt:'[e[28] [1],e[6] [3]]',__viewFormat:'dateMDYY',
viewSize:'9pt',__widthClue:'70',__borderRight:'solid black
1px',viewFamily:'Verdana',m_row:29,m_col:1,i_nr:'4/20/00'},
{entry:'=currency( $C$3 , $C$4 , $A29 ,"bid")',
dynamic:'__currency(_cel( \'r3c3s0\' ),
_cel( \'r4c3s0\' ),_cel( \'r29c1s0\' ),\'bid\')',
derived:'0.4809',
i_tb:'[e[29] [3]]',
i_rt:'[e[3] [3],e[4] [3],e[29] [1]]',
viewFormat:'currency_2',viewSize:'9pt',
__widthClue:'72',__borderRight:'solid black
1px',viewFamily:'Verdana',__textA1ign:'right',m_row:29,m_col:2,
i_nr:'$0.48'},
{entry:'=1/ B29 ',dynamic:
'_div(i,_cel( \'r29c2s0\' ))',
derived:'2.079434393844874',
i_tb:'[e[29] [4],e[30] [4]]',
i_rt:'[e[29] [2]]',viewFormat:'currency_2',viewSize:'9pt',
__widthClue:'124',__borderRight:'solid black
1px',viewFamily:'Verdana',m_row:29,m_col:3,i_nr:'$2.08'},
{entry:'=( C29 -
C28 )/ C28 ',dynamic:
'_div(_sub(_cel( \'r29c3s0\' ),
_cel( \'r28c3s0\' )),_cel( \'r28c3s0\' ))',
derived:'0.006654190060303464'
i_rt:'[e[29] [3],e[28] [3]]',viewFormat:'currency_2',
viewsize:'9pt',__widthClue:'123',__borderRight:'solid black
1px',viewFamily:'Verdana',m_row:29,m_col:4,i_nr:'$0.01'},
{__borderRight:'solid black 1px',m_row:30,m_col:0},
{entry:'= A29 + C$6 ',dynamic:
'_add(_cel( \'r29c1s0\' ),_cel( \'r6c3a0\' ))',
derived:'11068.000011574075',
i_tb:'[e[30] [2],e[31] [1]]',
i_rt:'[e[29] [1],e[6] [3]]',__viewFormat:'dateMDYY',
viewSize:'9pt',__widthClue:'70',__borderRight:'solid black
1px',viewFamily:'Verdana',m_row:30,m_col:0,i_nr:'4/21/00'},
{entry:'=currency( $C$3 , $C$4 , $A30 ,"bid")',
dynamic:'_currency(_cel( \'r3c3s0\' ),
_cel( \'r4c3a0\' ),_cel( \'r30c1s0\' ),
\'bid\')',derived:'0.4798',
i_tb:'[e[30] [3]]',
i_rt:'[e[3] [3],e[4] [3],e[30] [1]]',
viewFormat:'currency_2',viewSize:'9pt',__widthClue:'72',__borderRight:
'solid black 1px',viewFamily:'Verdana',__textAlign:'right',m_row:30,
m_col:2,i_nr:'$0.48'},
{entry:'=1/ B30 ',
dynamic:'_div(1,_cel( \'r30c2s0\' ))',
derived:'2.084201750729471',
i_tb:'[e[30] [4],e[3] [4]]',
i_rt:'[e[30] [2]]',viewFormat:'currency_2',
viewSize:'9pt',__widthClue:'124',__borderRight:'solid black
1px',viewFamily:'Verdana',m_row:30,m_col:3,i_nr:'2.08'},
{entry:'=( C30 -
C29 )/ C29 ',dynamic:
'_div(_sub(_cel( \'r30c3s0\' ),
_cel( \'r29c3s0\' )),_cel( \'r29c3s0\' ))',
derived:'0.0022926219258025673',
i_rt:'[e[30] [3],e[29] [3]]',viewFormat:'currency_2',
viewsize:'9pt',__widthClue:'123',__borderRight:'solid black
1px',viewFamily:'Verdana',m_row:30,m_col:4,i_nr:'$0.00'},
{__borderRight:'solid black 1px',m_row:31,m_col:0},
{entry:'= A30 + C$6 ',
dynamic:'_add(_cel( \'r30c1s0\' ),_cel( \'r6c3s0\' ))',
derived:'11069.000011574075',
i_tb:'[e[31] [2],e[32] [1]]',
i_rt:'[e[30] [1],e[6] [3]]',viewFormat:'dateMDYY',viewsize:'9pt',
__widthClue:'70',__borderRight:'solid black
1px',viewFamily:'Verdana',m_row:31,m_col:1,i_nr:'4/22/00'},
{entry:'=currency( $C$3 , C$4 , $A31 ,"bid")',
dynamic:'_currency(_cel( \'r3c3s0\' ),
_cel( \'r4c3s0\'),_cel( \'r31c1s0\' ),
\'bid\')',derived:'0.4797',
i_tb:'[e[31] [3]]',
i_rt:'[e[3] [3],e[4] [3],e[31] [1]]',viewFormat:'currency_2',
viewsize:'9pt',__widthClue:'72',__borderRight:'solid black
1px',viewFamily:'Verdana',__textAlign:'right',m_row:31,
m_col:2,i_nr:'$0.48'},
{entry:'=1/ B31 ',dynamic:
'_div(1,_cel( \'r31c2s0\' ))',derived:'2.0846362309776944',
i_tb:'[e[31] [4],e[32] [4]]',
i_rt:'[e[31] [2]]',viewFormat:'currency_2',viewSize:'9pt',
__widthClue:'124',__borderRight:'solid black
1px',viewFamily:'Verdana',m_row:31,m_col:3,i_nr:'$2.08'},
{entry:'=( C31 -
C30 )/ C30 ',dynamic:
'_div(_sub(_cel( \'r31c3s0\' ),_cel( \'r30c3s0\' )),
_cel( \'r30c3s0\' ))',derived:'0.00020846362309772103',
i_rt:'[e[31] [3],e[30] [3]]',viewFormat:'currency_2',
viewSize:'9pt',__widthClue:'123',__borderRight:'solid black
1px',viewFamily:'Verdana',m_row:31,m_col:4,i_nr:'$0.00'},
{__borderRight:'solid black 1px',m_row:32,m_col:0},
{entry:'= A31 + C$6 ',dynamic:
'_add(_cel( \'r31c1s0\' ),_cel( 'r6c3s0\'))',
derived:'11070.000011574075',
i_tb:'[e[32] [2],e[33] [1]]',
i_rt:'[e[31] [1],e[6] [3]]',viewFormat:'dateMDYY',
viewSize:'9pt',__widthClue:'70',__borderRight:'solid black
1px',viewFamily:'Verdana',m_row:32,m_col:1,i_nr:'4/23/00'},
{entry:'=currency( $C$3 , $C$4 , $C$2 ,"bid")',
dynamic:'_currency(_cel( \'r3c3s0\' ),
_cel( \'r4c3s0\'),_cel( \'r32c1s0\' ),
\'bid\')',derived:'0.4801'
i_tb:'[e[32] [3]]',
i_rt:'[e[3] [3],e[4] [3],e[32] [1]]',
viewFormat:'currency_2',viewSize:'9pt',__widthClue:'72',
__borderRight:'solid black 1px',viewFamily:'Verdana',
__textAlign:'right',m_row:32,m_col:2,i_nr:'$0.48'},
{entry:'=1/ B32 ',dynamic:
'_div(1,_cel(\'r32c2s0\' ))',derived:'2.08289939S959175',
i_tb:'[e[32] [4],e[33] [4]]',
i_rt:'[e[32] [2]]',viewFormat:'currency_2',
viewSize:'9pt',__widthClue:'124',__borderRight:'solid black
1px',viewFamily:'Verdana',m_row:32,m_col:3,i_nr:'$2.08'},
{entry:'=( C32 -
C31 )/ C31 ',dynamic:
'_div(_sub(_cel( \'r32c3s0\' ),
_cel( \'r31c3s0\' )),_cel( \'r31c3s0\' ))',derived:
'-0.0009331597583837563',
i_rt:'[e[32] [3],e[31] [3]]',viewFormat:'currency_2',
viewSize:'9pt',__widthClue:'123',__borderRight:'solid black
1px',viewFamily:'Verdana',m_row:32,m_col:4,i_nr:'($0.00)'},
{__borderRight:'solid black 1px',m_row:33,m_col:0},
{entry:'= A32 + C$6 ',dynamic:
'_add(_cel( \'r32c1s0\' ),_cel( \'r6c3s0\' ))',
```

-continued derived:'11071.000011574075',
i_tb:'[e[33] [2],e[34] [1]]',
i_rt:'[e[32] [1],e[6] [3]]',_widthClue:'70',_borderRight:'solid black 1px',viewFamily:'Verdana',m_row:33,m_col:3,i_nr:'4/24/00'},
{entry:'=currency( $C$3  $C$4 ,  $A33 ,"bid")',dynamic: '_currency(_cel( \'r3c3s0\' ),_cel( \'r4c3s0\' ), _cel( \'r33c1s0\' ),\'bid\')',derived:'0.4807',
i_tb:'[e[33] [3]]',
i_rt:'[e[3] [3],e[4] [3],e[33] [1]]',viewFormat: '_currency_2',viewSize:'9pt',_widthClue:'72', _borderRight:'solid black 1px',viewFamily:'Verdana', _textAlign:'right',m_row:33,m_col:2,i_nr:'$0.48'},
{entry:'=1/ B33 ',dynamic:'_div(1 ,_cel( \'r33c2s0\' ))', derived:'2.0802995631370917',
i_tb:'[e[33] [4],e[34] [4]]',
i_rt:'[e[33] [2]]',viewFormat:'currency_2',viewsize:'9pt', _widthClue:'124',_borderRight:'solid black 1px',viewFamily:'Verdana',m_row:33,m_col:3,i_nr:'$2.08'},
{entry:'=(   C33   − 
     C32  )/   C32  ',dynamic: '_div(_sub(_cel( \'r33c3s0\' ), _cel( \'r32c3s0\' )),_cel( \'r32c3s0\'))',
derived:'0.0012481797378821994',
i_rt:'[e[33] [3],e[32] [3]]',viewFormat:'currency_2', viewSize:'9pt',_widthClue:'123',_borderRight:'solid black 1px',viewFamily:'Verdana',m_row:33,m_col:4,i_nr:'($0.00)'},
{_borderRight:'solid black 1px',m_row:34,m_col:0},
{entry:'= A33  +  C$6  ',dynamic:' _add(_cel( \'r33c1s0\' ),_cel( \'r6c3s0\' ))',
derived:'11072.000011574075',
i_tb:'[e[34] [2],e[35] [1]]',
i_rt:'[e[33] [1],e[6] [3]]',_widthFormat:'dateMDYY', viewSize:'9pt',_widthClue:'70',_borderRight:'solid black 1px',viewFamily:'Verdana',m_row:34,m_col:1,i_nr:'4/25/00'},
{entry:'=currency( $C$3 ,  $C$4 ,  $A34 ,"bid")', dynamic:'_currency(_cel( \'r3c3s0\' ), _cel( \'r4c3s0\' ),_cel( \'r34c1s0\' ),\'bid\')',
derived:'0.4797',
i_tb:'[e[34] [3]]',
i_rt:'[e[3] [3],e[4] [3],e[34] [1]]',viewFormat: 'currency_2',viewsize:'9pt',_widthClue:'72',_borderRight:'solid black 1px',viewFamily:'Verdana',_textAlign:'right',m_row:34,m_col:2, i_nr:'$0.48'},
{entry:'=1/ B34 ',dynamic:'_div(1,_cel( \'r34c2s0\' ))', derived:'2.0846362309776944',
i_tb:'[e[34] [4],e[35] [4]]',
i_rt:'[e[34] [2]]',viewFormat:'currency_2', viewSize:'9pt',_widthClue:'124',_borderRight:'solid black 1px',viewFamily:'Verdana',m_row:34,m_col:3,i_nr:'$2.08'},
{entry:'=(   C34   − 
     C33  )/   C33  ',dynamic: '_div(_sub(_cel( \'r34c3s0\' ), _cel( \'r33c3s0\' )),_cel( \'r33c3s0\' ))',
derived:'0.002084636230977725',
i_rt:'[e[34] [3],e[33] [3]]',viewFormat:'currency_2', viewSize:'9pt',_widthClue:'123',_borderRight:'solid black 1px',viewFamily:'Verdana',m_row:34,m_col:4,i_nr:'0.00'},
{_borderRight:'solid black 1px',m_row:35,m_col:0},
{entry:'= A34  +  C$6  ',dynamic: '_add(_cel( \'r34c1s0\' ),_cel( \'r6c3s0\' ))',
derived:'11073.000011574075',
i_tb:'[e[35] [2],e[36] [13]]',
i_rt:'[e[34] [1],e[6] [3]]',_viewFormat:'dateMDYY', viewSize:'9pt',_widthClue:'70',_borderRight:'solid black 1px',viewFamily:'Verdana',m_row:35,m_col:1,i_nr:'4/26/00'},
{entry:'=currency( $C$3 ,  $C$4 ,  $A35 ,"bid")', dynamic:'_currency(_cel( \'r3c3s0\' ), _cel( \'r4c3s0\' ),_cel( \'r35c1s0\'),\'bid\')',
derived:'0.4708',
i_tb:'[e[35] [3]]',
i_rt:'[e[3] [3],e[4] [3],e[35] [1]]',
viewFormat:'currency_2',viewSize:'9pt',_widthClue:'72', _borderRight:'solid black 1px',viewFamily:'Verdana',_textAlign:'right',
m_row:35,
m_col:2,i_nr:'$0.47'},
{entry:'=1/ B35 ',dynamic:_div(1,_cel( \'r35c2s0\'))',
derived:'2.1240441801189464',
i_tb:'[e[35] [4],e[36] [4]]', i_rt:'[e[35] [2]]',viewFormat:'currency_2',viewSize:'9pt', _widthClue:'124',_borderRight:'solid black 1px',viewFamily:'Verdana',m_row:35,m_col:3,i_nr:'$2.12'},
{entry:'=(   C35   − 
     C34   )/   C34  ',dynamic: '_div(_sub(_cel( \'r35c3s0\' ), _cel( \'r34c350\' )),_cel( \'r34c3s0\' ))',
derived:'0.018903993203058588',
i_rt:'[e[35] [3],e[34] [3]]',viewFormat:'currency_2', viewsize:'9pt',_widthClue:'123',_borderRight:'solid black 1px',viewFamily:'Verdana',m_row:35,m_col:4,i_nr:'4/27/00'},
{_borderRight:'solid black 1px',m_row:36,m_col:0},
{entry:'= A35  +  C$6  ',dynamic: '_add(_cel( \'r35c1s0\' ),_cel( r6c3s0\' ))',
derived:'11074.000011574075',
i_tb:'[e[36] [2],e[37] [1]]',
i_rt:'[e[35] [1],e[6] [3]]',_viewFormat:'dateMDYY', viewsize:'9pt',_widthClue:'70',_borderRight:'solid black 1px',viewFamily:'Verdana',m_row:36,m_col:1,i_nr:'4/27/00'},
{entry:'=currency( $C$3 ,  $C$4 ,  $A36 ,"bid")',
dynamic:'_currency(_cel( \'r3c3s0\' ), _cel( \'r4c3s0\' ),_cel( \'r36c1s0\' ),\'bid\')',
derived:'0.4722',
i_tb:'[e[36] [3]]',
i_rt:'[e[3] [3],e[4] [3],e[36] [1]]',
viewFormat:'currency_2',viewSize:'9pt',_widthClue:'72', _borderRight:'solid black 1px',viewFamily:'Verdana',_textAlign:'right',
m_row:36,m_col:2,i_nr:'$0.47'},
{entry:'=1/ B36 ',dynamic: '_div(1,_cel(\'r36c2s0\' ))',
derived:'2.117746717492588',
i_tb:'[e[36] [4],e[37] [4]]',
i_rt:'[e[36] [2]]',viewFormat:'currency_2', viewsize:'9pt',_widthClue:'124',_borderRight:'solid black 1px',viewFamily:'Verdana',m_row:36,m_col:3,i_nr:'$2.12'},
{entry:'=(   C36   − 
     C35  )/   C35  ',dynamic: '_div(_sub(_cel( \'r36c3s0\' ), _cel( \'r35c3s0\' )),_cel( \'r35c3s0\' ))',
derived:'−0.002964845404489606',
i_rt:'[e[36] [3],e[35] [3]]',viewFormat:'currency_2', viewSize:'9pt',_widthClue:'123',_borderRight:'solid black 1px',viewFamily:'Verdana',m_row:36,m_col:4,i_nr:'($0.00)'},
{_borderRight:'solid black 1px',m_row:37,m_col:0},
{entry:'= A36  +  C$6  ',dynamic: '_add(_cel( \'r36c1s0\' ),
_cel( \'r6c3s0\' ))',derived:'11075.000011574075',
i_tb:'[e[37] [2],e[38] [1]]',
i_rt:'[e[36] [1],e[6] [3]]',_viewFormat:'dateMDYY', viewSize:'9pt',_widthClue:'70',_borderRight:'solid black 1px',viewFamily:'Verdana',m_row:37,m_col:1,i_nr:'4/28/00',
{entry:'=currency( $C$3 ,  $C$4 ,  $A37 ,"bid")',
dynamic:'_currency(_cel( \'r3c3s0\' ), _cel( \'r4c3s0\' ),_cel( \'r37c1s0\' ), \'bid\' )',derived:'0.4649',
i_tb:'[e[37] [3]]',
i_rt:'[e[3] [3],e[4] [3],e[37] [1]]',
viewFormat:'currency_2',viewSize:'9pt',_widthClue:'72', _borderRight:'solid black 1px',viewFamily:'Verdana',_textAlign:'right',
m_row:37,m_col:2,i_nr:'$0.46',
{entry:'=1/ B37 ',dynamic:'_div(1,_cel( \'r37c2s0\' ))',
derived:'2.15100021510002 16',
i_tb:'[e[37] [4],e[38] [4]]',
i_rt:'[e[37] [2]]',viewFormat:'currency_2',
viewSize:'9pt',_widthClue:'124',_borderRight:'solid black 1px',viewFamily:'Verdana',m_row:37,m_col:3,i_nr:'2.15'},
{entry:'=(   C37   − 
     C36  )/   C36  ',dynamic: '_div(_sub(_cel( \'r37c3s0\' ), _cel( \'r36c3s0\' )),_cel( \'r36c3s0\' ))',
derived:'0.015702301570230184',
i_rt:'[e[37] [3],e[36] [3]]',viewFormat:'currency_2', viewSize:'9pt',_widthClue:'123',_borderRight:'solid black 1px',viewFamily:'Verdana',m_row:37;m_col:4,i_nr:'$0.02'},
{i_rt:borderRight:'solid black 1px',m_row:38,m_col:0},
{entry:'= A37  +  C$6  ',dynamic: '_add(_cel( \'r37c1s0\' ),
_cel( \'r6c3s0\' ))',derived:'11076.000011574075',
i_tb:'[e[38] [2],e[39] [1]]', -continued

```
i_rt:'[e[37][1],e[6][3]]',_viewFormat:'dateMDYY',
viewSize:'9pt',_widthClue:'70',_borderRight:'solid black
1px',viewFamily:'Verdana',m_row:38,m_col:1,i_nr:'4/29/00'},
{entry:'=currency( $C$3  ,  $C$4  ,  $A38  ,"bid")',
dynamic:'_currency(_cel(  \'r3c3s0\'  ),
_cel(  \'r4c3s0\'),_cel(  \'r38c1s0\' ),
\'bid\' )',derived:'0.4659',
i_tb:'[e[38][3]]',
i_rt:'[e[3][3],e[4][3],e[38][1]]',
viewFormat:'currency_2',viewSize:'9pt',_widthClue:'72',
_borderRight:'solid black 1px',viewFamily:'Verdana',
_textAlign:'right',m_row:38,m_col:2,i_nr:'$0.47'}, _
{entry:'=1/ B38   ',dynamic:'_div(i,_cel(  \'r38c2s0\' ))',
derived:'2.14638334406525',
i_tb:'[e[38][4],e[39][4]]'
i_rt:'[e[38][2]]',viewFormat:'currency_2',
viewSize:'9pt',_widthClue:'124',_borderRight:'solid black
1px',viewFamily:'Verdana',m_row:38,m_col:3,i_nr:'$2.15'},
{entry:'=(    C38   -
    C37    )/   C37   ',dynamic:
'_div(_sub(_cel(_\'r38c3s0\' ),
_cel(  \'r37c3s0\')),_cel(  \'r37c3s0\'))',
derived:'0.002146383344065212',
i_rt:'[e[38][3],e[37][3]]',viewFormat:'currency_2',
viewSize:'9pt',_widthClue:'123',_borderRight:'solid black
1px',viewFamily:'Verdana',m_row:38,m_col:4,i_nr:'($0.00)'},
{borderRight:'solid black 1px',m_row:39,mcol:0},
entry:'=   A38    +   C$6   ',dynamic:
'_add(_cel(  \'r35c1s0\' ),_cel(  \'r6c3s0\' ))',
derived:'11077.000011574075',
i_tb:'[e[39][2]]',
i_rt:'[e[38][1],e[6][3]]',_borderBottom:'solid black
1px',_viewFormat:'dateMDYY',viewSize:'9pt',_widthClue:'70',
_borderRight:'solid black 1px',viewFamily:'Verdana',m_row:39,m_col:1,
i_nr:'4/30/00'},
{entry:'=currency( $C$3  ,  $C$4  ,  $A39  ,"bid")',
dynamic:'_currency(_cel(  \'r3c3s0\'  ),
_cel(  \'r4c3s0\'),_cel(  \'r39c1s0\' ),
\'bid\' )',derived:'0.4661',
i_tb:'[e[39][3]]',
i_rt:'[e[3][3],e[4][3],e[39][1]]',
_borderBottom:'solid black 1px',viewFormat:'currency_2',viewSize:'9pt',
_widthClue:'72',_borderRight:'solid black 1px',viewFamily:'Verdana',
_textAlign:'right',m_row:39,m_col:2,i_nr:'$0.47'},
{entry:'=1/ B39   ',dynamic:'_div(i,_cel(  \'r39c2s0\' ))',
derived:'2.145462347135608'
i_tb:'[e[39][4]]',
i_rt:'[e[39][2]]',_borderBottom:'solid black
1px',viewFormat:'currency_2',viewSize:'9pt',_widthClue:'124',
_borderRight:'solid black 1px',viewFamily:'Verdana',m_row:39,
m_col:3,i_nr:'$2.15'},
{entry:'=(    C39   -
    C38    )/   C38   ',dynamic:
'_div(_sub(_cel(  \'r39c3s0\' ),
_cel(  \'r38c3s0\' )),_cel(  \'r36c3s0\' ))',
derived:'-0.0004290924694271972',
i_rt:'[e[39][3],e[38][3]]',_borderBottom:'solid black
1px',viewFormat:'currency_2',viewSize:'9pt',_widthClue:'123',
_borderRight:'solid black
1px',viewFamily:'Verdana',m_row:39,m_col:4,i_nr:'($0.00)'}];
var needsRebuilding=false,
var gDerivedFrom=' ';
var kSaveHostname = " ";
gMacroText= " ";
        </script>
        <script language="JavaScript"
src="/lib/js/dialog_ie_d6af9e21.jsx" ></script><script
language="JavaScript" src="/lib/js/gui_ie_fc55692d.jsx"
></script><script language="JavaScript"
src="/lib/js/document_ie_ec836dad.jsx" ></script><script
language="JavaScript" src="/lib/js/browser_detect_ie_6af40f80.jsx"
></script><script language="JavaScript"
src="/lib/js/cookie_ie_81818cb9.jsx" ></script><script
language="JavaScript" src="/lib/js/spreadsheet_ie_as99f6lb.jsx"
></script><script language="JavaScript"
src="/lib/js/rows_columns_ie_cac582f7.jsx" ></script><script
language= "JavaScript"
src="/lib/js/interface_spreadsheet_ie_3e5a3560.jsx" ></script><script
language="JavaScript" src="/lib/js/runtime_ie_38489e48.jsx"
```

-continued

```
></script><script language="JavaScript"
src="/lib/js/cell_ie_f1e68dc0.jsx" ></script><script
language="JavaScript" src="/lib/js/compiler_ie_574f1484.jsx"
></script><script language="JavaScript"
src="/lib/js/platform_ie_bb68a125.jsx" ></script><script
language="JavaScript" src="/lib/js/resource_ie_b70be76d.jsx"
></script><script language="JavaScript"
src="/lib/js/utility_ie_16a663aa.jsx" ></script>
        <div id="bulbLogo" style="background-color: #c0c0c0;
position: absolute; top: 0; left: 0; height: 50; width: 50; visibility:
visible;"> <img src="/img/blox_cube_28x44.gif" width=28 height=44
hspace=9 vspace=3 border=0 alt=" "> <div id-"break2" class="break"
style=" position:absolute; top: 1; left: 47; height: 50; background-
repeat: repeat-y;"></div> </div><div id="menuPalette"
class="palette">
<div id="fileMenu" class="largeMenu"></div>
<div id="filespot" class="largeSpot">File</div>
<div id="editMenu" class="largeMenu"></div>
<div id="editSpot" class="largeSpot">Edit</div>
<div id="toolsMenu" class="largeMenu"></div>
<div id="toolsSpot" class="largeSpot">Tools</div>
<div id="formatMenu" class="largeMenu"></div>
<div id="formatSpot" class="largeSpot">Format</div>
<div id="helpMenu" class="largeMenu"></div>
<div id="helpSpot" class="largeSpot">Help</div>
<div id="partnerMenu" class="largeMenu" ></div>
<div id="partnerSpot" class="largeSpot"></div>
<div id="btnEmail" class="button" title="Email">
</div><div id="eml"
class="buttonText">email this page</div>
</div>
<div id="menuDivision" class="division"></div>
<div id="iconPalette" class="palette">
<div id="new" class="button" title="New File">
</div><div id="open"
class="button" title="Open File"></div><div id=
"save" class="button"
title="Save File"></div><div id="print" class="button"
title="Print"></div><div id="break1" class="break"></div>
<div id="cut" class="button" title="Cut Cells">
</div><div id="copy"
class="button" title="Copy Cells"></div><div id="paste" class="button"
title="paste Cells"></div><div id="format" class="button" title="Copy
Format of Selected Cells"></div><div id="break2" class="break"></div>
<div id="sum" class="button" title="Automatic Sum"></div><div
id="break3" class="break"></div>
<div id="fontMenu" class="smallMenu"></div><input type="text"
tabindex=-1 id="fontSpot" class="comboBox" hasFocus=0
onBlur="fontSpot.hasFocus=0">
<div id="break4" class="break" ></div>
<div id="sizeMenu" class="smallMenu"></div><input type="text"
tabindex=-1 id="sizeSpot" class="comboBox" hasFocus=0
onBlur="sizeSpot.hasFocus=0">
<div id="break5" class="break"></div>
<div id="bold" class="button" title=
"Bold"></div><div id="italic"
class="button" title="Italic"></div><div id=
"underline" class="button"
title="Underline"></div><div id="break6" class="break"></div>
<div id="colorMenu" class="smallMenu"></div><div id="colorSpot"
class="smallSpot"> color</div>
<div id="borderMenu" class="button" title="Cell border"></div><div
id="break7" class="break"></div>
<div id="left" class="button" title="Align Left"></div><div id=
"center"
class="button" title="Center"></div><div id="right"
class="button"
title="Align Right"></div><div id="break8" class="break"></div>
</div>
<div id="iconDivision"class="division"></div>
<div id="editPalette" class="palette">
<div id="label" class="label" style="position: absolute; top: 4; left:
4; height: 15; width: 40;">A1</div><div id="functionMenu"
class="smallMenu"></div><div id="functionSpot"
class="smallSpot">f(x)</div>
<div id="accept"class="button" title=
"Accept"></div><div id="cancel"
class="button" title="Cancel"></div><div style="position: absolute;
overflow: visible; top: -1; left: 150; height: 22; z-index: 100;"><form
```

-continued

```
name="entryForm" onSubmit="return false"><textarea id="entry"
name="entry" tabindex=-1 style="font-family: arial, helvetica, sans-
serif; font-size: 10pt; width: 100%; height: 22px; overflow: hidden;"
onBlur= "gEntryClickFocused=0" oncut= 'cutDocument ( )'
onpaste= 'pasteDocument ( )' onkeydown="return keyDownDocument ( )"
onkeyup="return keyUpDocument ( )"></textarea></form></div></div>
<div id= "editDivision" class="division"></div>
<div id="previewPalette" class="palette">
<img src="/img/blox_cube_16x26.gif" width=16 height=26
style="position: absolute; top: 2; left: 9;" border=0 alt=" "><div
id="break10" class="break"></div>
<div id="previewHolder" class="palette">
<input id="btnEndPreview" type="button" value="Exit Preview"
style="position: absolute; top: 4; left: 0; height: 22; width: 68; font-
size: 9pt;" onclick="ExitPreview ( )"><div id="break11"
class="break"></div>
<div id="previewClue" style="position: absolute; top: 7; left: 88;
height: 18; width: 500;">          Click on a
cell to toggle it from editable to non-editable           </div></div>
</div>
<div id="footDivision" class="division"></div>
<div id="footPalette" class="palette">
   Copyright © 1999–2000 AlphaBlox Corpora-
tion Inc.
™</div>
<div id="fileList" class="largeList">
<div id="cmdNew" class="largeItem">New</div>
<div id="cmdOpen" class="largeItem">Open...</div>
<div id="cmdClose" class="largeItem">Close</div>
<div id="separator11" class="separator"></div>
<div id="cmdSave" class="largeItem">Save</div>
<div id="cmdSaveAs" class="largeItem">save As...</div>
<div id="cmdExcelExport" class="largeItem">Export to Excel...</div>
<div id="cmdExcelImport" class="largeItem">Import Excel file...</div>
<div id="separator12" class="separator"></div>
<div id="cmdsetSize" class="largeItem">Set Size...</div>
<div id="separator13" class="separator"></div>
<div id="cmdPrint" class="largeItem">Print...</div>
<div id="cmdSummary" class="largeItem">Summary...</div>
</div>
<div id="editList" class="largeList">
<div id="cmdCut" class="largeItem">Cut</div>
<div id="cmdCopy" class="largeItem">Copy</div>
<div id="cmdPaste" class="largeItem">Paste</div>
<div id="cmdPasteSpecial" class="largeItem">Paste Values</div>
<div id="cmdClear" class="largeItem">Clear</div>
<div id="separator20" class="separator"></div>
<div id="cmdFillDown" class="largeItem">Fill Down</div>
<div id="cmdFillRight" class="largeItem">Fill Right#/div>
<div id="separator21" class="separator"></div>
<div id="cmdMacros" Class="largeItem">Macros...</div>
</div>
<div id="toolsList" class="largeList">
<div id="cmdInsertRow" class="largeItem">Insert Row</div>
<div id="cmdInsertColumn" class="largeItem">Insert Column</div>
<div id="cmdDeleteRow" class="largeItem">Delete Row</div>
<div id="cmdDeleteColumn" class="largeItem">Delete Column</div>
<div id="separator30" class="separator"></div>
<div id="cmdFitRow" class="largeItem">Autofit Row</div>
<div id="cmdFitColumn" class="largeItem">Autofit Column</div>
<div id="separator31" class="separator"></div>
<div id="cmdRowHeight" class="largeItem">Row Height...</div>
<div id="cmdColumnWidth" class="largeItem">Column Width...</div>
<div id="separator32" class="separator"></div>
<div id="cmdSortAscending" class="largeItem">Sort Ascending</div>
<div id="cmdSortDescending" class="largeItem">Sort Descending</div>
<div id="separator33" class-"separator"></div>
<div id="cmdToggleGrid" class="largeItem">Hide Grid</div>
<div id="separator34" class="separator"></div>
<div id="cmdPreview" class="largeItem">Calculator Preview</div>
</div>
<div id="formatList" class="largeList">
<div id="cmdGeneral" class="largeItem">General</div>
<div id="cmdCustom" class="largeItem">Custom...</div>
<div id="separator41" class="separator"></div>
<div id="cmd8901" class="largeItem">8,901</div>
<div id="cmd8901d2" class="largeItem">8,901.2</div>
<div id="cmd8901d22" class="largeItem">8,901.22</div>
<div id="separator42" class="separator"></div>
```

-continued

```
<div id="cmdDollar2345" class="largeItem">$2,345</div>
<div id="cmdDollar2345d67" class="largeItem">$2,345.67</div>
<div id="separator43" class= "separator"></div>
<div id="cmd6Percent" class="largeItem">6%</div>
<div id="cmd6d7percent" class="largeItem">6.7%</div>
<div id="cmd6d78percent" class="largeItem">6.78%</div>
<div id="cmd6d789percent" class="largeItem">6.789%</div>
<div id="separator44" class= "Beparator"></div>
<div id="cmdMDYY" class="largeItem">m/d/YY</div>
<div id= "cmdMDYYYY" class="largeItem" >m/d/yyyy</div>
<div id="cm_MYY" class="largeItem">d/m/yy</div>
<div id="cm_MYYYY" class="largeItem">d/m/yyyy</div>
<div id="separator45" class="separator"></div>
<div id="cm_HMMAP" class="largeItem">h:mm AM/PM</div>
<div id="cm_HMMM" class="largeItem">hh:mm</div>
<div id="separator46" class= "separator"></div>
<div id="cmdWrapText" class="largeItem">Wrap Text</div>
</div>
<div id="helpList" class="largeList">
<div id="cmdContents" class="largeItem">Contents...</div>
<div id="separator60" class="separator"></div>
<div id="cmdIntroduction" class="largeItem">Introduction</div>
<div id="cmdBasic6" class="largeItem">Basics</div>
<div id="cmdFiles" class="largeItem">Files</div>
<div id="cmdNavigating" class="largeItem">Navigating</div>
<div id="cmdEditing" class="largeItem">Editing</div>
<div id="cmdFormatting" class="largeItem">Formatting</div>
<div id="cmdCalculators" class="largeItem">Calculators</div>
<div id="cmdMacrosHelp" class="largeItem">Macros</div>
<div id="separator61" class="separator"></div>
<div id="cmdMenuReference" class="largeItem">Menu reference</div>
<div id="cmdFunctionReference" class="largeItem">Function
reference</div>
<div id="separator62" class="separator"></div>
<div id="cmdBugReport" class="largeItem">Report a bug</div>
<div id="cmdAbout" class="largeItem">About...</div>
</div>
<div id="partnerList" class="largeList">
</div>
<div id="fontList" class="smallList">
<div id="fontArial" class="smallItem">Arial</div>
<div id="fontBookman" class="smallItem">Bookman Old Style</div>
<div id="fontCourier" class="smallItem">Courier</div>
<div id="fontGaramond" class="smallItem">Garamond</div>
<div id="fontConsole" class="smallItem">Lucida Console</div>
<div id="fontsymbol" class="smallItem">Symbol</div>
<div id="fontTahoma" class="smallItem">Tahoma</div>
<div id="fontTimesNewRoman" class="smallItem">Times New Roman</
div>
<div id="fontVerdana" class="smallItem">Verdana</div>
</div>
<div id="sizeList" class="smallList">
<div id="point7" class="smallItem">7 pt</div>
<div id="point8" class="smallItem">8 pt</div>
<div id="point9" class="smallItem">9 pt</div>
<div id="point10" class="smallItem">10 pt</div>
<div id="point11" class="smallItem">11 pt</div>
<div id="point12" class="smallItem">12 pt</div>
<div id="point14" class="smallItem">14 pt</div>
<div id="point18" class="smallItem">18 pt</div>
<div id="point24" class="smallItem">24 pt</div>
<div id="point36" class="smallItem">36 pt</div>
<div id="point48" class="smallItem">48 pt</div>
<div id="point72" class="smallItem">72 pt</div>
</div>
<div id="functionList" class="smallList">
<div id="funcImageUrl" class="smallItem">Image URL</div>
<div id="funcStockQuote" class="smallItem">Stock Quote</div>
<div id="funcLinkUrl" class="smallItem">web Link</div>
<div id="funcCurrency" class="smallItem">Currency Quote</div>
</div>
<div id="borderList" class="smallList" style="position: absolute; top:
0; left: 0; width: 96; height: 98;">      <div id="border10"
class="border" style="position: absolute; top: 0; left: 0;" title="No
border"></div>      <div id="border11" class="border" style="position:
absolute; top: 0; left: 24;" title="Thick bottom"></div>   <div
id="border12" class="border" style="position: absolute; top: 0; left:
46;" title="Double bottom"></div>   <div id="border13" class="border"
style="position: absolute; top: 0; left: 72;" title="Top rule, double
```

-continued

```
bottom"></div>    <div id="border14" class="border" style="position:
absolute; top: 24; left: 0;" title="Bottom only">':/div>    <div
id="border15" class="border" style="position: absolute; top: 24; left:
24;" title="Left only"></div><div id="border16" class="border"
style="position: absolute; top: 24; left: 48;" title="Right
only"></div>    <div id="border17" class="border" style="position:
absolute; top: 24; left: 72;" title="Top only"></div><div id="border18"
class="border" style="position: absolute; top: 48; left: 0;"
title="Left and right"></div><div id="border19" class="border"
style="position: absolute; top: 48; left: 24;" title="Top and
bottom"></div>    <div id="border20" class="border" style="position:
absolute; top: 48; left: 48;" title="Columns"></div>    <div id=
"border21" class="border" style="position: absolute; top: 48; left: 72;"
title="Rows"></div>    <div id="border22" class="border"
style="position: absolute; top: 72; left: 0;" title="Box"></div><div
id="border23" class="border" style="position: absolute; top: 72; left:
24;" title="Grid"></div>    <div id="border24" class="border"
style="position: absolute; top: 72; left: 48;" title="Boxed
columns"></div>    <div id="border25" class="border" style="position:
absolute; top: 72; left: 72;" title="Boxed
rows"></div>    </div>    <div id="colorList" class="smallList"
style="position: absolute; top: 0; left: 0; width: 200; height:
120;">    <div class="heading"         style="position:
absolute; top: 3; left: 0; width: 98;">Text Color</div><div
class="heading"         style="position: absolute; top: 3;
left: 100; width: 98;">Background</div><div id="holder10"
class="holder" style="position: absolute; top: 20; left:
2;"></div>    <div id="holder11" class=
"holder" style="position: absolute;
top: 20; left: 26;"></div>    <div id="holder12" class="holder"
style="position: absolute; top: 20; left: 50;"></div>    <div
id="holder13" class="holder11 style="position: absolute; top: 20; left:
74;"></div><div id="holder14" class="holder" style="position: absolute;
top: 44; left: 2;"></div>    <div id="holder15" class="holder"
style="position: absolute; top: 44; left: 26;"></div>    <div
id="holder16" class="holder" style="position: absolute; top: 44; left:
50;"></div><div id="holder17" class="holder" style="position: absolute;
top: 44; left: 74;"></div>    <div id="holder18" class="holder"
style="position: absolute; top: 68; left: 2;"></div>    <div
id="holder19" class="holder" style="position: absolute; top: 68; left:
26;"></div><div id="holder20" class="holder" style="position: absolute;
top: 68; left: 50;"></div>    <div id="holder21" class="holder"
style="position: absolute; top: 68; left: 74;"></div>    <div
id="holder22" class="holder" style="position: absolute; top: 92; left:
2;"></div>    <div id="holder23" class="holder" style=
"position: absolute; top: 92; left: 26;"></div>    <div id=
"holder24" class="holder"
style="position: absolute; top: 92; left: 50;"></div>    <div
id="holder25" class="holder" style="position: absolute; top: 92; left:
74;"></div><div id="holder50" class="holder" style="position: absolute;
top: 20; left: 100;"></div>    <div id="holder51" class="holder"
style="position: absolute; top: 20; left: 124;"></div>    <div
id="holder52" class="holder" style="position: absolute; top: 20; left:
148; "></div>    <div id="holder53" class="holder" style="position:
absolute; top: 20; left: 172;"></div>    <div id="holder54"
class="holder" style="position: absolute; top: 44; left:
100; "></div>    <div id="holder55" class="holder" style="position:
absolute; top: 44; left: 124;"></div>    <div id="holder56"
class="holder" style="position: absolute; top: 44; left:
148; "></div>    <div id="holder57" class="holder" style="position:
absolute; top: 44; left: 172;"></div>    <div id="holder58"
class="holder" style="position: absolute; top: 68; left:
100; "></div>    <div id="holder59" class="holder" style="position:
absolute; top: 68; left: 124;"></div>    <div id="holder60"
class="holder" style="position: absolute; top: 68; left:
148; "></div>    <div id="holder61" class="holder" style="position:
absolute, top: 68, left 172;"></div>    <div id="holder62"
class="holder" style="position absolute; top 92; left:
100; "></div>    <div id="holder63" class="holder" style="position:
absolute, top: 92, left: 124;"></div>    <div id="holder64"
class="holder" style="position: absolute; top: 92; left:
148; "></div>    <div id="holder65" class="holder" style="position:
absolute; top: 92; left: 172;"></div>    <div id="swatch10"
class="swatch" style="position: absolute; top: 26; left: 8;"
title="Black"></div>    <div id="swatch11" class="swatch"
style="position: absolute; top: 26; left: 32;"
title="Silver"></div>    <div id="swatch12" class="swatch"
style="position: absolute; top: 26; left: 56;"
title="Gray"></div>    <div id="swatch13" class="swatch"
style="position: absolute; top: 26; left: 80;"
title="White"></div>    <div id="swatch14" class="swatch"
style="position: absolute; top:50; left: 8;"
title="Maroon"></div>    <div id="swatch15" class="swatch"
style="position: absolute; top:50; left: 32;" title="Red"></div><div
id="swatch16" class="swatch" style="position: absolute; top: 50; left:
56;" title="Purple"></div>    <div id="swatch17" class="swatch"
style="position: absolute; top: 50; left: 80;"
title="Fuchsia"></div>    <div id="swatch18" class="swatch"
style="position: absolute; top: 74; left: 8;"
title="Green"></div>    <div id="swatch19" class="swatch"
style="position: absolute; top: 74; left: 32;"
title="Lime"></div>    <div id="swatch20" class="swatch"
style="position: absolute; top: 74; left: 56;"
title="Olive"></div>    <div id="swatch21" class="swatch"
style="position: absolute; top: 74; left: 80;"
title="Yellow"></div>    <div id="swatch22" class="swatch"
style="position: absolute; top: 98; left: 8;"
title="Navy"></div>    <div id="swatch23" class="swatch"
style="position absolute; top: 98; left: 32;"
title="Blue"></div>    <div id="swatch24" class="swatch"
style="position absolute; top: 98; left: 56;"
title="Teal"></div>    <div id="swatch25" class="swatch"
style="position absolute; top: 98; left: 80;"
title="Aqua"></div>    <div id="swatch50" class="swatch"
style="position absolute    top: 26; left: 106;"
title="Black"></div>    <div id="swatch51" class="swatch"
style="position: absolute; top: 26; left: 130;"
title="Silver"></div>    <div id="swatch52" class="swatch"
style="position: absolute; top: 26; left: 154;"
title="Gray"></div>    <div id="swatch53" class="swatch"
style="position: absolute; top: 26; left: 178;"
title="White"></div>    <div id="swatch54" class="swatch"
style="position: absolute; top: 50; left: 106;"
title="Maroon"></div>    <div id="swatch55" class="swatch"
style="position: absolute; top: 50; left: 130;"
title="Red"></div>    <div id="swatch56" class="swatch"
style="position: absolute; top: 50; left: 154;"
title="Purple"></div>    <div id="swatch57" class="swatch"
style="position: absolute; top: 50; left: 178;"
title="Fuchsia"></div>    <div id="swatch58" class="swatch"
style="position: absolute; top: 74; left: 106;"
title="Green"></div>    <div id="swatch59" class="swatch"
style="position: absolute; top: 74; left: 130;"
title="Lime"></div>    <div id="swatch60" class="swatch"
style="position: absolute; top: 74; left: 154;"
title="Olive"></div>    <div id="swatch61" class="swatch"
style="position: absolute; top: 74; left: 178;"
title="Yellow"></div>    <div id="swatch62" class="swatch"
style="position: absolute; top: 98; left: 106;"
title="Navy"></div>    <div id="swatch63" class="swatch"
style="position: absolute; top: 98; left: 130;"
title="Blue"></div>    <div id="swatch64" class="swatch"
style="position: absolute; top: 98; left: 154;"
title="Teal"></div>    <div id="swatch65" class="swatch"
style="position: absolute; top: 96; left: 178,"
title="Aqua"></div>    </div>
      <div id= "modalDialog" style="display:none"></div>
      <div id="popupMenuList" class="smallList" style="width: 100;
height: 1; "></div>
      <script language= "JavaScript">
        includeProgressDialog.style.display = "none";
      </script>
      <iframe id="resource0" src=" " style="display:
none; "></iframe>
      <iframe id="resource1" src=" " style="display:
none; "></iframe>
      <iframe id="resource2" src=" " style="display:
none; "></iframe>
      <iframe id="resource3" src=" " style="display:
none; "></iframe>
      <iframe id="saveFrame" src="/save_frame.html"
style="display:none; "></iframe>
      <iframe id="macroFrame" src="/macro_frame" style="display:
none; "></iframe>
      <iframe id="bugFrame" src=" " style="display:
none; "></iframe>
      <iframe name="postFrame" src=" " style="display:
none; "></iframe>
```

-continued

```
        <form id="postForm" method="POST"></form>
    </body>
</html>
```

What is claimed is:

1. A method of displaying a web-based spreadsheet comprising:
sending a request to a server to retrieve the web-based spreadsheet;
receiving at least part of a web page in response to the request;
executing one or more user-defined macros, comprising one or more instructions of a programming language, in the received web page to display the web-based spreadsheet, the web-based spreadsheet comprising cells, the one or more user-defined macros comprising a first user-defined macro that is expressly referenced in a first formulas of a first cell;
executing information in the received web page to allow information to be entered into a second cell of the web-based spreadsheet; and
executing information in the received web page to allow information to be entered into a second cell of the web-based spreadsheet; and
executing information in the received web page to update a third cell dependent on the second cell.

2. The method of claim 1, wherein said sending the request includes sending a request from a client to the server.

3. The method of claim 1, wherein the information in the received web page and the programming language are Javascript.

4. The method of claim 1, wherein said second cell of the web-based spreadsheet comprises a second formula expressly referencing a second user-defined macro of the one or more user-defined macros, to retrieve live data that is updated periodically as the spreadsheet is being displayed, the second user-defined macro comprising one or more instructions of the programming language, and
wherein said executing information in the received web page to allow information to be entered into at least one second cell comprises invoking the second user-defined macro.

5. The method of claim 4, wherein the live data is stock quotation information.

6. The method of claim 5, wherein the stock quotation information is obtained from the server.

7. The method of claim 5, wherein the stock quotation information is obtained from a third party.

8. The method of claim 5, wherein the stock quotation information also includes historical information of a stock.

9. The method of claim 4, wherein the live data is currency conversion information.

10. The method of claim 9, wherein the currency conversion information is obtained from the server.

11. The method of claim 9, wherein the currency conversion information is obtained from a third party.

12. The method of claim 1, wherein at least one other cell of the web-based spreadsheet contains a link to another web page.

13. The method of claim 1, wherein at least one other cell of the web-based spreadsheet contains an image obtained from an address on the World Wide Web.

14. The method of claim 13, further comprising: allowing the user to expand the size of the other cell to view more of the image.

15. The method of claim 1, wherein at least one other cell of the web-based spreadsheet contains an image obtained from a data processing device connected to the user via a network.

16. The method of claim 2, where the client is connected to the server via World Wide Web.

17. A method of allowing a user to design a web-based spreadsheet, comprising:
executing information in the received web page to allow the user to create a user-defined macro comprising Javascript instructions, the user-defined macro having a macro name;
executing information in the received web page to allow the user to enter information into the cells of the web-base spreadsheet, the user entering a formula expressly referencing the macro name in at least one cell;
sending a number or rows and columns of the web based spreadsheet, the user-defined macro, and the information entered by the user to a server for storage on the server; and
sending a request to the server to retrieve the web-based spreadsheet.

18. The method of claim 17, further comprising e-mailing a link to the spreadsheet, including:
allowing the user to click on an "e-mail this page" button; and
allowing the user to enter a recipient's address.

19. The method of claim 17, further comprising embedding the spreadsheet in a web page to create an embedded HTML web page, comprising:
displaying an HTML code including a spreadsheet ID of the spreadsheet; and
allowing the user to copy the HTML code and paste it into the web page's HTML.

20. The method of claim 19, wherein the embedded HTML web page comprises "JavaScript include" tags.

21. The method of claim 17, wherein the spreadsheet is displayed on a client system.

22. The method of claim 21, wherein JavaScript Dynamic HTML is downloaded to the client system, the JavaScript including functionality, format and content of the spreadsheet web page.

23. The method of claim 17, wherein the information in the received web page and the user-defined macro are Javascript.

24. The method of claim 17, wherein at least one cell of the web-based spreadsheet contains live data that is updated periodically as the spreadsheet is being displayed.

25. The method of claim 24, wherein the live data is stock quotation information.

26. The method of claim 25, wherein the stock quotation information is obtained from the server.

27. The method of claim 25, wherein the stock quotation information is obtained from a third party.

28. The method of claim 27, wherein the stock quotation information also includes historical information for a stock.

29. The method of claim 28, wherein the live data is currency conversion information.

30. The method of claim 29, wherein the currency conversion information is obtained from the server.

31. The method of claim 29, wherein the currency conversion information is obtained from a third party.

32. The method of claim 17, wherein at least one other cell of the web-based spreadsheet contains a link to a web page.

33. The method of claim 17, wherein at least one other cell of the web-based spreadsheet contains an image obtained from an address on the World Wide Web.

34. The method of claim 33, further comprising: allowing the user to expand the size of the other cell to view more of the image.

35. The method of claim 17, wherein at lest one other cell of the web-based spreadsheet contains an image obtained from a data processing device connected to the user via a network.

36. The method of claim 21, where the client is connected to the server vial the World Wide Web.

37. A computer-implemented method performed by a server data processing system, comprising:
 receiving a request, from a client system, for a spreadsheet web page;
 reviewing parameters received with the request for the spreadsheet web page, said parameters include a spreadsheet mode and a data ID; and
 sending the requested spreadsheet web page to the client system, based on the parameters received, wherein said spreadsheet web page contains embedded data specific to the requested spreadsheet web page and capable of causing display of a spreadsheet, said spreadsheet web page comprising one or more user-defined macros comprising Javascript, the spreadsheet web page comprising cells, at least one cell of said cells comprising a formula expressly referencing at least one user-defined macro.

38. The method of claim 37, wherein before sending the spreadsheet web page, JavaScript data is embedded into the spreadsheet web page.

39. The method of claim 37, wherein the data ID identifies a file name.

40. The method of claim 37, wherein the server includes data for more than one spreadsheet web page.

41. A method of displaying a web-based spreadsheet comprising:
 sending a request to a server to retrieve the web-based spreadsheet;
 receiving at least part of a web page in response to the request;
 executing one or more user-defined macros in the received web page to display the web-based spreadsheet, said one or more user-defined macros comprising at least one of an initialization macro which is invoked when the spreadsheet web page is loaded and a first macro which is expressly referenced in a formula of at least one cell of the web-based spreadsheet;
 executing a second macro of said one or more user-defined macros in the received web page to allow information to be entered into a second cell of the web-based spreadsheet; and
 executing a third macro of said one or more user-defined macros in the received web page to update a third cell dependent on the second cell.

42. The method of claim 41, wherein said sending the request includes sending a request from a client to the server.

43. The method of claim 41, wherein the one or more user-defined macros in the received web page are Javascript.

44. The method of claim 41, wherein the second cell of the web-based spreadsheet contains live data that is updated periodically as the spreadsheet is being displayed.

45. The method of claim 44, wherein the live data is stock quotation information.

46. The method of claim 45, wherein the stock quotation information is obtained from the server.

47. The method of claim 45, wherein the stock quotation information is obtained from a third party.

48. The method of claim 45, wherein the stock quotation information also includes historical information of a stock.

49. The method of claim 44, wherein the live data is currency conversion information.

50. The method of claim 49, wherein the currency conversion information is obtained from the server.

51. The method of claim 49, wherein the currency conversion information is obtained from a third party.

52. The method of claim 41, wherein at least one other cell of the web-based spreadsheet contains a link to another web page.

53. The method of claim 41, wherein at least one other cell of the web-based spreadsheet contains an image obtained from an address on the World Wide Web.

54. The method of claim 53, further comprising: allowing the user to expand the size of the other cell to view more of the image.

55. The method of claim 41, wherein at least one other cell of the web-based spreadsheet contains an image obtained from a data processing device connected via a network.

56. The method of claim 42, where the client is connected to the server via World Wide Web.

57. An article of manufacture readable by a computer, tangibly embodying instruction executable by the computer to perform a method of displaying a web-based spreadsheet, said method comprising:
 sending a request to a server to retrieve the web-based spreadsheet;
 receiving at least part of a web page in response to the request;
 executing one or more user-defined macros, comprising one or more instructions of a programming language, in the received web page to display the web-based spreadsheet, the web-based spreadsheet comprising cells, the one or more user-defined macros comprising a first user-defined macro that is expressly referenced in a first formula of a first cell;
 executing information in the received web page to allow information to be entered into a second cell of the web-based spreadsheet; and
 executing information in the received web page to update a third cell dependent on the second cell.

58. The article of manufacture of claim 57 wherein the one or more user-defined macros comprise an initialization macro which is invoked when the web-based spreadsheet is loaded, the initialization macro comprising user specified Javascript instructions,
 wherein said executing said one or more user-defined macros also executes the initialization macro in the received web page.

59. The article of manufacture of claim 58 wherein the web-based spreadsheet comprises a user-defined global variable, accessible to the initialization macro and the one or more user-defined macros.

60. The article of manufacture of claim 57 wherein the programming language is Javascript.

61. The article of manufacture of claim 57 wherein the second cell of the web-based spreadsheet comprises a second formula expressly referencing a second user-defined macro of said one or more user-defined macros, to retrieve live data that is update periodically as the spreadsheet is being displayed, the second user-defined macro being Javascript, and
 wherein said executing information in the received webpage to allow information to be entered into the second cell comprises invoking the second user-defined macro.

62. The article of manufacture of claim 61, wherein the live data is stock quotation information.

63. The article of manufacture of claim 61, wherein the live data is currency conversion information.

64. The article of manufacture of claim 61 wherein the third cell of the web-based spreadsheet comprises a third formula expressly referencing a third user-defined macro and said one or more user-defined macros, the third user-defined macro being Javascript, and wherein said executing information in the received web page to update the third cell invokes the third user-defined macro.

* * * * *